US012014915B2

(12) United States Patent
Ramsey et al.

(10) Patent No.: US 12,014,915 B2
(45) Date of Patent: Jun. 18, 2024

(54) ION TRAPS WITH Y-DIRECTIONAL ION MANIPULATION FOR MASS SPECTROMETRY AND RELATED MASS SPECTROMETRY SYSTEMS AND METHODS

(71) Applicant: The University of North Carolina at Chapel Hill, Chapel Hill, NC (US)

(72) Inventors: John Michael Ramsey, Chapel Hill, NC (US); Andrew Hampton, Auburn, AL (US); Kevin Schultze, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 17/188,215

(22) Filed: Mar. 1, 2021

(65) Prior Publication Data

US 2021/0343519 A1 Nov. 4, 2021

Related U.S. Application Data

(63) Continuation of application No. 16/363,219, filed on Mar. 25, 2019, now Pat. No. 10,937,640, which is a (Continued)

(51) Int. Cl.
*H01J 49/06* (2006.01)
*H01J 49/00* (2006.01)
(Continued)

(52) U.S. Cl.
CPC ........ *H01J 49/065* (2013.01); *H01J 49/0027* (2013.01); *H01J 49/022* (2013.01); *H01J 49/424* (2013.01)

(58) Field of Classification Search
CPC .. H01J 49/00; H01J 49/02; H01J 49/06; H01J 49/065; H01J 49/067; H01J 49/26;
(Continued)

(56) References Cited

U.S. PATENT DOCUMENTS 2,939,952 A 6/1960 Wolfgang et al.
5,051,582 A 9/1991 Bahns et al.
(Continued)

FOREIGN PATENT DOCUMENTS

WO 2011086430 A1 7/2011
WO 2014143101 A1 9/2014

OTHER PUBLICATIONS

Alberici et al., Ambient mass spectrometry: bringing MS into the 'real world,' Anal. Bioanal. Chem. 398(1): 265-294 (2010).
(Continued)

*Primary Examiner* — Jason L McCormack
(74) *Attorney, Agent, or Firm* — Myers Bigel, P.A.

(57) ABSTRACT

A miniature electrode apparatus is disclosed for trapping charged particles, the apparatus includes, along a longitudinal direction, a first end cap electrode, a central electrode having an aperture, and a second end cap electrode. The aperture is elongated in the lateral plane and extends through the central electrode along the longitudinal direction and the central electrode surrounds the aperture in a lateral plane perpendicular to the longitudinal direction to define a transverse cavity for trapping charged particles. Electric fields can be applied in a y-direction of the lateral plane across one or more planes perpendicular to the longitudinal axis to translocate and/or manipulate ion trajectories.

34 Claims, 34 Drawing Sheets

Related U.S. Application Data continuation of application No. 15/692,306, filed on Aug. 31, 2017, now Pat. No. 10,242,857.

(51) Int. Cl.
*H01J 49/02* (2006.01)
*H01J 49/42* (2006.01)

(58) Field of Classification Search
CPC .. H01J 49/4235; H01J 49/424; H01J 49/0027; H01J 49/022
USPC ......................... 250/281, 282, 283, 292, 293
See application file for complete search history.

(56) References Cited

U.S. PATENT DOCUMENTS 5,118,950 A 6/1992 Bahns et al.
5,206,506 A 4/1993 Kirchner
5,248,883 A 9/1993 Brewer et al.
5,596,193 A 1/1997 Chutjian et al.
5,613,294 A 3/1997 Ferran
5,793,091 A 8/1998 Devoe
5,811,820 A 9/1998 Kirchner et al.
5,859,433 A 1/1999 Franzen
5,866,901 A 2/1999 Penn et al.
6,157,031 A 12/2000 Prestage
6,452,326 B1 9/2002 Ge et al.
6,469,298 B1 10/2002 Ramsey et al.
6,483,109 B1 11/2002 Reinhold et al.
6,521,898 B2 2/2003 Chutjian et al.
6,545,268 B1 4/2003 Verentchikov et al.
6,762,406 B2 7/2004 Cooks et al.
6,822,225 B2 11/2004 Xu et al.
6,838,666 B2 1/2005 Ouyang et al.
6,870,158 B1 3/2005 Blain
6,933,498 B1 8/2005 Whitten et al.
7,081,623 B2 7/2006 Pai et al.
7,514,674 B2 4/2009 Glish et al.
7,560,688 B2 7/2009 Clowers et al.
7,772,546 B2 8/2010 Jackson
7,973,277 B2 7/2011 Rafferty
8,101,908 B2 1/2012 Senko
8,384,022 B1* 2/2013 Remes ................ H01J 49/0009 250/252.1
8,878,127 B2 11/2014 Ramsey et al.
9,373,492 B2 6/2016 Ramsey
9,406,492 B1 8/2016 Ramsey et al.
2002/0195559 A1 12/2002 Miseki
2003/0089846 A1 5/2003 Cooks et al.
2003/0155507 A1* 8/2003 Hashimoto ......... H01J 49/0059 250/282
2004/0135080 A1 7/2004 Ouyang et al.
2005/0196720 A1 9/2005 Ostler et al.
2005/0253064 A1* 11/2005 Loboda ................. H01J 49/401 250/282
2006/0219888 A1 10/2006 Jachowski et al.
2007/0023646 A1* 2/2007 Li ....................... H01J 49/4225 250/288
2007/0158543 A1 7/2007 Clowers et al.
2008/0017794 A1* 1/2008 Verbeck .................. H01J 49/26 250/292
2008/0067361 A1 3/2008 Senko et al.
2009/0134321 A1 5/2009 Hoyes
2009/0146054 A1 6/2009 Rafferty
2009/0278043 A1 11/2009 Satake et al.
2009/0294655 A1 12/2009 Ding et al.
2010/0084549 A1 4/2010 Ermakov et al.
2011/0147581 A1 6/2011 Chen et al.
2011/0192969 A1 8/2011 Verentchikov
2011/0248160 A1 10/2011 Belov
2011/0284737 A1 11/2011 Makarov et al.
2011/0290995 A1 12/2011 Kumph
2012/0256083 A1 10/2012 Kovtoun
2013/0240724 A1 9/2013 Guna
2015/0170898 A1 6/2015 Jiang et al.
2015/0255265 A1* 9/2015 Xu ...................... H01J 49/0031 250/282

OTHER PUBLICATIONS

Albrieux et al., Ion trajectory simulations in a high-pressure cylindrical ion trap, European J. Mass Spectrom., 16(5): 557-565 (2010).
Amini et al., Micro-Fabricated Chip Traps for Ions, in Atom Chips (eds. J. Reichel and V. Vuletić), Wiley-VCH Verlag GmbH & Go KGaA, Weinheim, Germany (2011).
Austin et al., Halo Ion Trap Mass Spectrometer, Anal. Chem., 79(7): 2927-2932 (2007).
Austin et al., Simulations of Ion Trapping in a Micrometer-Sized Cylindrical Ion Trap, J. Am. Soc. Mass Spectrom. 17 (3): 430-441 (2006).
Badman et al., A Miniature Cylindrical Quadrupole Ion Trap: Simulation and Experiment, Anal. Chem. 70(23): 4896-4901 (1998).
Badman et al., A Parallel Miniature Cylindrical Ion Trap Array, Anal. Chem., 72(14): 3291-3297 (2000).
Badman et al., Miniature mass analyzers, J. Mass Spectrom, 35(6): 659-671 (2000).
Blain et al., Micro Mass Spectrometer on a Chip, Sandia Report SAND2005-6838 (2005).
Blain, Towards the Hand-held Mass Spectrometer: Design Considerations, Simulation, and Fabrication of Micrometer-Scaled Cylindrical Ion Traps, International Journal of Mass Spectrometry, 236:91-104 (2004).
Bonner et al., The Cylindrical Ion Trap. Part 1. General Introduction, International Journal of Mass Spectrometry and Ion Physics, 24(3): 255 269 (1977).
Brewer et al., Planar ion microtraps, Phys. Rev. A 46(11): R6781-R6784 (1992).
Chaudhary et al., Fabrication and testing of a miniature cylindrical ion trap mass spectrometer constructed from low temperature co-fired ceramics, International Journal of Mass Spectrometry, 251: 32-39 (2006).
Chen et al., A Micro Ionizer for Portable Mass Spectrometers using Double-gated Isolated Vertically Aligned Carbon Nanofiber Arrays, IEEE Trans. Electron Devices 58(7): 2149-2158 (2011).
Cheung, Kerry, Chip-Scale Quadrupole Mass Filters for a Micro-Gas Analyzer (Ph.D. Thesis), Massachusetts Institute of Technology, Jun. 2009, 188 pages.
Contreras et al., Hand-Portable Gas Chromatograph-Toroidal Ion Trap Mass Spectrometer (GC-TMS) for Detection of Hazardous Compounds, J Am Soc Mass Spectrom 19(10):1425-1434 (2008).
Cruz et al., Design, microfabrication, and analysis of micrometer-sized cylindrical ion trap arrays, Rev. Sci. Instrum., 78(1): 015107 (2007).
Devoe, Ralph G. "Elliptical ion traps and trap arrays for quantum computation" Physical Review A 58(2):910-914 (1998).
Extended European Search Report corresponding to European Patent Application No. 13877607.5 (7 pages) (dated Oct. 5, 2016).
Falconer et al., High Pressure Ion Detection for Miniaturized Mass Spectrometers, Presentation at 58th ASMS Conference 2010, Salt Lake City, UT, May 23, 2010.
Ferran et al., High-pressure effects in miniature arrays of quadrupole analyzers for residual gas analysis from 10-9 to 10-2 Torr, Journal of Vacuum Science & Technology A 14: 1258 (1996).
Fico et al., Circular Arrays of Polymer-Based Miniature Rectilinear Ion Traps, Analyst, 134(7): 1338-1347, 2009.
Gao et al., Design and Characterization of a Multisource Hand-Held Tandem Mass Spectrometer, Anal. Chem., 80(19): 7198-7205 (2008).
Gao et al., Handheld Rectilinear Ion Trap Mass Spectrometer, Anal. Chem. 78: 5994-6002 (2006).
Gao, Liang, Miniaturization of the Ion Trap Mass Spectrometer, Ph.D. Thesis, Purdue University, 153 pages (2009).
Goeringer et al., Theory of High-Resolution Mass Spectrometry Achieved via Resonance Ejection in the Qualdrupole Ion Trap, Anal. Chem. 64: 1434-1439 (1992).

(56) References Cited

OTHER PUBLICATIONS

Hadjar et al., High-efficiency cross-beam magnetic electron-impact source for improved miniature Mattauch-Herzog mass spectrometer performance, Rev. Sci. Instrum. 83: 064101 (2012).
Hager, A New Linear Ion Trap Mass Spectrometer, Rapid Commun. Mass Spectrom. 16(6): 512-526 (2002).
Harris et al., Ambient Sampling/Ionization Mass Spectrometry: Applications and Current Trends, Anal. Chem. 83: 4508-4538 (2011).
Harris et al., Transportable real-time single-particle ion trap mass spectrometer, Rev. Sci. Instrum. 76: 064102 (2005).
Hood, Development of a Novel Loeb-Eiber Mass Filter, M.S. Thesis, Ohio State University, 158 pages (2009).
Huang et al., Direct analysis of melamine in complex matrices using a handheld mass spectrometer, Analyst, 135: 705-711 (2010).
International Search Report and Written Opinion for PCT/US2013/042031, dated Mar. 6, 2014.
Kell et al., Ambient Mass Spectrometry with a Handheld Mass Spectrometer at High Pressure, Anal. Chem., 79: 7734-7739 (2007).
Knight, The Development of a Micro-Faraday Array for Ion Detection, International Journal of Mass Spectrometry, 215(1-3): 131-139 (2002).
Kornienko et al., Electron impact ionization in a microion trap mass spectrometer, Rev. Sci. Instrum., 70(10): 3907-3909 (1999).
Kornienko et al., Micro Ion Trap Mass Spectrometry, Rapid Commun. Mass Spectrom. 13: 50-53 (1999).
Lammert et al., Experimental Investigation into the Performance of Ion Traps Using Air Versus Helium as the Buffer Gas, Rapid Communications in Mass Spectrometry, 10(3): 361-371 (1996).
Lammert et al., Miniature Toroidal Radio Frequency Ion Trap Mass Analyzer, Journal of the American Society for Mass Spectrometry, 17(7): 916-922 (2006).
Lammert, Design, Optimization and Initial Performance of a Toroidal FR Ion Trap Mass Spectrometer, International Journal of Mass Spectrometry, 212(1-3): 25-40 (2001).
Lee et al. "Simulation of Duty Cycle-Based Trapping and Ejection of Massive Ions Using Linear Digital Quadrupoles: the Enabling Technology for High Resolution Time-of-Flight Mass Spectrometry in the Ultra High Mass Range" Int J Mass Spec 304:36-40 (2011).
Li et al., Ion Trap Array Mass Analyzer: Structure and Performance, Anal. Chem. 81: 4840-4846 (2009).
Londry et al. "Mass Selective Axial Ion Ejection from a Linear Quadrupole Ion Trap" Journal of the American Society for Mass Spectrometry 14(10):1130-1147 (2003).
Maas et al., Miniature Monolithic Rectilinear Ion Trap Arrays by Stereolithography on Printed Circuit Board, Journal of Microelectromechanical Systems, 19(4): 951-960 (2010).
Maas et al., RF Planar Ion Trap for Chemical Sensing; Microwave Symposium Digest (MTT), IEEE MTT-S International Conference, 4 pages (2011).
March, Raymond E., An Introduction to Quadrupole Ion Trap Mass Spectrometry, J. Mass Spectrom., 32: 351-369 (1997).
March, Raymond E., Quadrupole Ion Trap Mass Spectrometer, Encyclopedia of Analytical Chemistry, pp. 11848-11872 (2000).
Misharin et al., Development and characterization of a field deployable ion trap mass spectrometer with atmospheric pressure interface, Anal. Chem., 84(22): 10105-10112 (2012).
Moxom et al, Double resonance ejection in a micro trap mass spectrometer, Rapid Commun. Mass Spectrom., 16: 755-760 (2002).
Moxom et al., Analysis of Volatile Organic Compounds in Air with a Micro Ion Trap Mass Analyzer, Anal. Chem., 75: 6739-6743 (2003).
Moxom et al., Sample pressure effects in a micro ion trap mass spectrometer, Rapid Commun. Mass Spectrom., 18: 721-723 (2004).
Orient et al., Miniature, high-resolution, quadrupole mass-spectrometer array, Rev. Sci. Instrum., 68: 1393-1397 (1997).
Ouyang et al., Handheld Miniature Ion Trap Mass Spectrometers, Anal. Chem., 81(7): 2421-2425 (2009).
Ouyang et al., Quadrupole Ion Traps and Trap Arrays: Geometry, Material, Scale Performance, European Journal of Mass Spectrometry, 13(1): 13-18 (2007).
Ouyang et al., Rectilinear Ion Trap: Concepts, Calculations, and Analytical Performance of a New Mass Analyzer, Anal. Chem., 76: 4595-4605 (2004).
Patterson et al., Miniature Cylindrical Ion Trap Mass Spectrometer, Anal. Chem., 74(24): 6145-6153 (2002).
Pau et al., Microfabricated Quadrupole Ion Trap for Mass Spectrometer Applications, Phys. Rev. Lett. 96: 120801 (2006).
Pau et al., Planar Geometry for Trapping and Separating Ions and Charged Particles, Anal. Chem., 79: 6857-6861, 2007.
Peng et al., Coaxial Ion Trap Mass Spectrometer: Concentric Toroidal and Quadrupolar Trapping Regions, Anal. Chem., 83(14): 5578-5584 (2011).
Peng et al., New Approaches to Miniaturizing Ion Trap Mass Analyzers, Trends Anal. Chem., 30(10): 1560-1567 (2011).
Schultze, Kevin "Advanced System Components for the Development of a Handheld Ion Trap Mass Spectrometer" Dissertation submitted to the University of North Carolina at Chapel Hill (179 pages) (Dated 2014; Embargoed until Dec. 2016).
Schwartz et al., A Two-Dimensional Quadrupole Ion Trap Mass Spectrometer, Journal of the American Society for Mass Spectrometry, 13(6): 659-669 (2002).
Shiea, Jentaie, Ionization methods for miniature mass spectrometers, Presentation at PITTCON, 2012, Orlando, FL, Mar. 14, 2012.
Sokol et al., Miniature mass spectrometer equipped with electrospray and desorption electrospray ionization for direct analysis of organics from solids and solutions, Int. J. Mass Spectrom., 306: 187-195 (2011).
Song et al., Novel Linear Ion Trap Mass Analyzer Composed of Four Planar Electrodes, Journal of the American Society for Mass Spectrometry, 17(4): 631-639 (2006).
Song, Qingyu, Development of Mass Spectrometers using Rectilinear Ion Trap Analyzers, Ph.D. Thesis, Purdue University, 216 pages, 2008.
Syms, R.R.A., Advances in microfabricated mass spectrometers, Anal. Bioanal. Chem., 393: 427-429 (2009).
Taylor et al., A Simplified Toroidal Ion Trap Mass Analyzer, International Journal of Mass Spectrometry, 321-322: 25-32 (2012).
Teloy et al. "Integral Cross Sections for Ion-Molecule Reactions. I. The Guided Beam Technique" Chemical Physics 4:417-427 (1974).
Telrandhe, Mangesh, Fabrication and testing of a cylindrical ion trap microarray for tunable mass spectrometers, Graduate Thesis and Dissertation, University of South Florida, 86 pages (2004).
Van Amerom et al., Microfabrication of Cylindrical Ion Trap Mass Spectrometer Arrays for Handheld Chemical Analyzers, Chem. Eng. Comm., 195: 98-114 (2008).
Wang et al. "Increasing the Trapping Mass Range to m/z = 109—A Major Step Toward High Resolution Mass Analysis of Intact RNA, DNA and Viruses" International Journal of Mass Spectrometry 328-329:28-35 (2012).
Wells et al., A Quadrupole Ion Trap with Cylindrical Geometry Operated in the Mass-Selective Instability Mode, Anal. Chem., 70(3): 438-444 (1998).
Whitten et al., High-pressure ion trap mass spectrometry, Rapid Commu. Mass Spectrom. 18: 1749-1752 (2004).
Wilcox et al. "Improved Ion Extraction from a Linear Octopole Ion Trap: SIMION Analysis and Experimental Demonstration" Journal of the American Society for Mass Spectrometry 13:1304-1312 (2002).
Wolfe et al., RF amplifier optimization for improved resolution I microscale cylindrical ion traps, Presentation at 59th ASMS Conference 2011, Denver, CO, Jun. 5, 2011.
Xu et al., Ion Trap Mass Analysis at High Pressure: A Theoretical View, J. Am. Soc. Mass Spectrom, 20: 2144-2153 (2009).
Xu et al., Nondestructive Ion Trap Mass Analysis at High Pressure, Anal. Chem. 83(3): 685-689 (2011).
Yang et al., Development of a Palm Portable Mass Spectrometer, Journal of the American Society for Mass Spectrometry, 19(10): 1442-1448 (2008).

(56) References Cited

OTHER PUBLICATIONS

Yu et al. "Miniature Paul-Straubel ion trap with well-defined deep potential well" Proceedings of the National Academy of Sciences USA 86:5672 (1989).
Zhang et al., Paul Trap Mass Analyzer Consisting of Opposing Microfabricated Electrode Pairs, Anal. Chem., 81: 5241-5248 (2009).

* cited by examiner

ION TRAPS WITH Y-DIRECTIONAL ION MANIPULATION FOR MASS SPECTROMETRY AND RELATED MASS SPECTROMETRY SYSTEMS AND METHODS

RELATED APPLICATIONS

This application is a continuation of U.S. application Ser. No. 16/363,219, filed Mar. 25, 2019, which is a continuation of U.S. application Ser. No. 15/692,306, filed Aug. 31, 2017, now U.S. Pat. No. 10,242,857, issued Mar. 26, 2019, the contents of each of which is hereby incorporated by reference as if recited in its entirety herein.

STATEMENT REGARDING FEDERALLY SPONSORED RESEARCH OR DEVELOPMENT

This invention was made with government support under HDTRA1-15-C-0014 awarded by the Department of Defense. The government has certain rights in the invention.

BACKGROUND

Mass spectrometry (MS) is among the most informative of analytical techniques. Due to its combination of speed, selectivity, and sensitivity MS has wide ranging applications in areas such as trace elemental analysis, biomolecule characterization in highly complex samples, and isotope ratio determination. However, the large size, weight, and power consumption (SWaP) found in some MS systems generally limits analyses to the laboratory setting.

Much of the SWaP and complexity in MS operation lies in the vacuum systems necessary to attain the high vacuums needed for most mass analyzers ($10^{-5}$-$10^{-9}$ torr). Accordingly, one approach to SWaP reduction is the ability to perform MS at high pressure (HPMS). Ion traps, which may be operated at pressures greater than $10^{-4}$ torr, can be used as mass analyzers in miniature mass spectrometry systems. However, in some cases, increasing pressures in an ion trap significantly above a few millitorr has a deleterious effect on resolution and signal intensity. The increasing number of collisions with the buffer gas at higher pressures inhibits the ability of the electric field to control the ion trajectories. Increasing the operating frequency (typically a radio frequency or "RF" field) of the trap yields fewer neutral collisions per cycle, reducing the negative effects of high pressure operation but may require a corresponding decrease in trap dimensions to reduce the RF voltage amplitude.

As disclosed in U.S. Pat. No. 8,878,127, Stretched Length Ion Traps (SLITs), like all linear ion traps (LITs), can spatially confine ions into a linear ion cloud, along the length of which ions can move freely and may be particularly suitable for HPMS. The contents of U.S. Pat. No. 8,878,127 are hereby incorporated by reference as if recited in full herein.

SUMMARY

Certain embodiments of the invention directionally control and/or manipulate ions along a y-dimension of a miniaturized trap having a trapping cavity that is elongated in the y-dimension.

In some embodiments of the invention, the ion trap is configured so that ion ejection primarily occurs from a single point or region (i.e., a portion of length of the SLIT in the y-dimension) to reduce or prevent inconsistent conditions at detection, thereby improving resolution.

Embodiments of the invention are directed to methods of transporting ions between an ion source and an ion detector. The methods include: providing an ion trap positioned between the ion source and the ion detector and comprising a ring electrode defining an ion trap aperture. The ring electrode has a longitudinal length extending in a longitudinal direction between the ion source and the ion detector, and the ion trap aperture has a transverse length extending in a first direction orthogonal to the longitudinal direction and a transverse width extending in a second direction orthogonal to the longitudinal direction and the first direction. The method also includes introducing ions into the ion trap aperture at a first location along the first direction; generating an electric field directed along the first direction within or proximate to the ion trap aperture to transport at least some of the ions to a second location along the first direction within the ion trap aperture; and ejecting at least some of the ions at the second location from the ion trap aperture. The transverse length is larger than the longitudinal length and the transverse width.

The methods can include providing at least one supplemental electrode having a transverse extent extending in the first direction and residing above or below or above and below the ion trap aperture adjacent at least one of an injection side or an ejection side of the ion trap aperture. The electric field can be generated by applying voltage to the at least one supplemental electrode.

The ring electrode can have a half thickness, $z_r$, that can have values that range between $0<z_r<z_0$, with a z position of the supplemental electrode, $z_s$, in the longitudinal direction in the ion trap in a range $z_r<z_s<z_0$.

A range for a ratio of $z_0$ to $x_0$ can be about 1.1-1.3 and a $z_r$ to $z_0$ ratio can be in a range of about 0.14-0.70.

A $z_s$ to $z_0$ ratio can be in the range $z_r/z_0<z_s/z_0<1$, optionally $z_s$ can be closer in value to $z_r$ than $z_0$.

The generated electric field can be applied independent of an axial RF input to the ring electrode and extends across at least one of an ion injection side or an ion ejection side of the ion trap aperture.

The generating the electric field can be carried out to controllably vary the generated electric field in a time-dependent manner during at least one of a single scan or between successive scans.

The longitudinal length can be between 0.001 mm and 10 mm.

The ion trap can include an ion source in fluid communication with the ring electrode. The ion source can be offset from the ion detector in the first direction.

The at least one supplemental electrode can include at least one ejection side supplemental electrode extending in the first direction and residing above or below or above and below and adjacent the ejection side of the at least one ion trap aperture facing the detector.

The at least one supplemental electrode can include at least one injection side supplemental electrode extending in the first direction and residing above or below or above and below and adjacent the at least one ion trap aperture, facing the ion source. The generating the electric field can be carried out by applying voltage to the at least one supplemental electrode The provided ion trap can include first and second endcap electrodes with the ring electrode therebetween and at least one injection side supplemental electrode extending in the first direction and the second direction in at least one x-y plane and residing above or below or above and below the injection side of the at least one ion trap aperture between the ring electrode and the first endcap electrode. The ion trap can also include at least one ejection side supplemental electrode extending in the first direction and the second direction in at least one x-y plane of the at least one ion trap aperture between the ring electrode and the second endcap electrode. The generating the electric field can be carried out by applying voltage to the at least one injection side supplemental electrode and the at least one ejection side supplemental electrode.

The generating the electric field can be carried out by applying voltages to the at least one supplemental electrode on the ejection side and the at least one supplemental electrode on the injection side independently.

The transverse width can vary at positions along the first direction, optionally the transverse width is tapered in the first direction and has a first end portion that merges into a more narrow end portion along the y-dimension.

The generated electrical field can have a positive polarity relative to a DC potential of an endcap electrode adjacent the ring electrode.

The generated electrical field can have a negative polarity relative to a DC potential of an endcap electrode adjacent the ring electrode.

The ion trap can have a plurality of supplemental electrodes residing in parallel x-y planes adjacent the at least one ion trap aperture.

The ion trap can include a plurality of supplemental electrodes and resides either only an injection side, only on an ejection side, or on both an injection and ejection side of the ring electrode. The generating the electrical field can be carried out by applying voltages to the plurality of supplemental electrodes.

The mass spectrometer can include first and second endcap electrodes, one on each side of the ring electrode. The at least one supplemental electrode can include at least one supplemental electrode that extends between the first endcap electrode and/or the second endcap electrode and adjacent the ring electrode for a transverse length in the first direction that can be between 10%-50% of the transverse length of the ion trap aperture and that can have a lesser maximal extent in the second direction and the longitudinal direction relative to the ring electrode.

The ion trap can include at least one printed circuit board with at least one open aperture with a perimeter that is elongate in a direction corresponding to the first direction and comprises facing long side edges and opposing short side edges. The at least one open aperture of the at least one printed circuit board can be aligned with and adjacent the at least one ion trap aperture. The printed circuit board can be configured so that it does not occlude the at least one ion trap aperture. The at least one printed circuit board can have at least one supplemental electrode residing adjacent one or both of the long side edges of the at least one open elongate aperture. The method can include supplying DC power from a DC power supply coupled to the at least one supplemental electrode to generate the electrical field.

Other embodiments are directed to a mass spectrometry system. The system includes: an ion source; an ion detector; and an ion trap positioned between the ion source and the ion detector and comprising a ring electrode defining an ion trap aperture that extends through the ion trap in a longitudinal direction. The ring electrode has a longitudinal length $z_0$ in the longitudinal direction. The ion trap aperture has a transverse length $y_0$ extending in a first direction orthogonal to the longitudinal direction and a transverse width $2x_0$ extending in a second direction orthogonal to the longitudinal direction and to the first direction. The transverse width $2x_0$ varies at positions along the first direction and $y_0$ is larger than $z_0$ and 2x.

The ion trap aperture with the transverse width $2x_0$ that varies at positions along the first direction can have a tapered elongate shape and has a first end portion that has a first radius of curvature that tapers in a medial segment to merge into a second more narrow end portion with a second radius of curvature along the first direction, with the second radius of curvature being smaller that the first radius of curvature.

The ion trap can also include at least one supplemental electrode extending at a location between at least one of the injection side or the ejection side of the ring electrode at a longitudinal direction location $z_s$, The ring electrode has a half thickness, $z_r$, that can have values that range between $0<z_r<z_0$, and $z_s$ can be in a range $z_r<z_s<z_0$.

A range for a ratio of $z_0$ to $x_0$ can be about 1.1-1.3. A $z_r$ to $z_0$ ratio can be in a range of about 0.14-0.70.

A $z_s$ to $z_0$ ratio can be in the range $z_r/z_0<z_s/z_0<1$, optionally $z_s$ can be closer in value to $z_r$ than $z_0$.

The system can also include a power supply coupled to at least one supplemental electrode configured to generate an electric field that is applied independent of an axial RF input to the ring electrode.

Still other embodiments are directed to a mass spectrometer that includes: an ion source; an ion trap in fluid communication with the ion source and having a first end cap electrode and a second endcap electrode with a ring electrode therebetween; and an ion detector in communication with the ion trap. The ring electrode has a longitudinal length extending in a longitudinal direction between the ion source and the ion detector, and the ion trap aperture has a transverse length extending in a first direction orthogonal to the longitudinal direction and a transverse width extending in a second direction orthogonal to the longitudinal direction and the first direction. The ion trap also includes: at least one supplemental electrode residing on at least one of an ejection side or an injection side of the at least one ion trap aperture and having a transverse length in the first direction and residing adjacent and above or below or above and below the at least one ion trap aperture; and a direct current (DC) power supply coupled to the at least one supplemental electrode to provide an electrical field in the first direction to thereby spatially manipulate ions along the first direction in the ion trap.

The mass spectrometer can include a control circuit that is coupled to the DC power supply and automatically controllably varies DC voltage applied to the at least one supplemental electrode in a time-dependent manner during at least one of a single scan or between successive scans to thereby preferentially translocate ions trapped in the ion trap in a first direction.

The at least one supplemental electrode can reside at a longitudinal direction location $z_s$. The ring electrode has a half thickness, $z_r$, that can have values that range between $0<z_r<z_0$, and $z_s$ can be in a range $z_r<z_s<z_0$.

A range for a ratio of $z_0$ to $x_0$ can be about 1.1-1.3, and a $z_r$ to $z_0$ ratio can be in a range of about 0.14-0.70.

A $z_s$ to $z_0$ ratio can be in the range $z_r/z_0<z_s/z_0<1$, optionally $z_s$ can be closer in value to $z_r$ than $z_0$.

The DC power supply that is coupled to the at least one supplemental electrode can be configured to generate the electric field independent of an axial RF input to the ring electrode.

The ion source can be offset from the detector in the y-dimension.

The at least one supplemental electrode can include at least one ejection side supplemental electrode extending in the first direction.

The at least one supplemental electrode can include at least one injection side supplemental electrode extending in the first direction and residing above or below or above and below and adjacent the at least one ion trap aperture.

The at least one supplemental electrode can include: at least one injection side planar supplemental electrode extending in the first direction in a plane defined by the first and second directions above or below or above and below the injection side of the at least one ion trap aperture; and at least one ejection side supplemental electrode extending in the first direction in a plane defined by the first and second directions and residing above or below or above and below the ejection side of the at least one ion trap aperture.

The at least one ion trap aperture can be tapered in the first direction and can have a first transverse end portion with a first radius of curvature that merges into a second more narrow end portion with a second radius of curvature.

The at least one supplemental electrode can include a plurality of supplemental electrodes residing in parallel planes to each other and in a parallel plane to the first and second directions of the ring electrode while residing adjacent and above or below or above and below and adjacent the at least one ion trap aperture.

The at least one supplemental electrode can include at least one supplemental electrode that extends between the first endcap electrode and/or the second endcap electrode and adjacent the ring electrode for a transverse length in the first direction that can be between 10%-50% of the transverse length of the at least one trap aperture and that can have a lesser maximal transverse height and longitudinal extent than the ring electrode.

The mass spectrometer may include at least one printed circuit board with at least one open aperture with a perimeter that is elongate in a direction corresponding to the y-axis and comprises inner facing long side edges and short side edges. The at least one open aperture of the at least one printed circuit board can be aligned with and adjacent the at least one ion trap aperture and the printed circuit board does not occlude the at least one ion trap aperture. The at least one printed circuit board can have at least one supplemental electrode residing adjacent one or both of the long side edges of the at least one open elongate aperture as the at least one supplemental electrode. The DC power supply can be configured to apply an electrical field using the supplemental electrodes.

Yet other embodiments are directed to methods of transporting ions between an ion source and an ion detector. The methods include: providing an ion trap positioned between the ion source and the ion detector and comprising a ring electrode defining an ion trap aperture. The ring electrode has a longitudinal length extending in a longitudinal direction between the ion source and the ion detector and the ion trap aperture has a transverse length extending in a first direction orthogonal to the longitudinal direction and a transverse width extending in a second direction orthogonal to the longitudinal direction and the first direction. The method also includes: introducing ions into the ion trap aperture at a first location along the first direction; transporting at least some of the ions to a second location along the first direction within the ion trap aperture; and ejecting at least some of the ions at the second location from the ion trap aperture. The transverse width varies at positions along the first direction and the transverse length is larger than the longitudinal length and a maximum value of the transverse width.

The ion trap aperture with the transverse width that varies at positions along the first direction can have a tapered elongate shape and has a first end portion that has a first radius of curvature that tapers in a medial segment to merge into a second more narrow end portion with a second radius of curvature along the first direction, with the second radius of curvature being smaller that the first radius of curvature.

In some HPMS systems, the detector and ionization source are aligned along a common line of sight. Certain embodiments of the invention can inject and eject ions from distinctly different portions of the SLIT to avoid overloading a detector, such as a Faraday cup detector, with excess charge during ion accumulation.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION

Figure 1A:
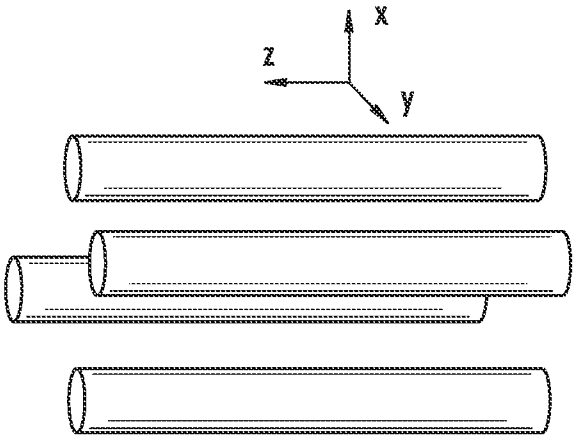
FIG. 1A is an example of a ring electrode of a Linear Ion Trap (LIT).

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. In the drawings, the thickness of lines, layers, features, components and/or regions may be exaggerated for clarity. The abbreviations "Fig." and "FIG" are used interchangeably with the word "Figure" in the drawings and specification.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when a feature, such as a layer, region or substrate, is referred to as being "on" another feature or element, it can be directly on the other feature or element or intervening features and/or elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected, attached or coupled to the other element or intervening elements may be present. In contrast, when a feature or element is referred to as being "directly connected", "directly attached" or "directly coupled" to another element, there are no intervening elements present. Although described or shown with respect to one embodiment, the features so described or shown can apply to other embodiments.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. Well-known functions or constructions may not be described in detail for brevity and/or clarity.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedure, Section 2111.03

The term "about" means that the stated number can vary from that value by +/−10%.

The term "analyte" refers to a molecule or chemical(s) in a sample undergoing analysis. The analyte can comprise chemicals associated with any industrial products, processes or environments or environmental hazards, toxins such as toxic industrial chemicals or toxic industrial materials, organic compounds, and the like. Moreover, analytes can include biomolecules found in living systems or manufactured such as biopharmaceuticals.

The term "buffer gas" refers to any gas or gas mixture that has neutral atoms/molecules such as air, nitrogen, helium, hydrogen, argon, and methane, by way of example.

The term "mass resonance scan time" refers to mass selective ejection of ions from the ion trap with associated integral signal acquisition time.

The term "mass" is often inferred to mean mass-to-charge ratio and its meaning can be determined from context. When this term is used when referring to mass spectra or mass spectral measurements, it is implied to mean mass-to-charge ratio measurements of ions.

The term "microscale" with respect to ion trap mass analyzers refers to miniature sized ion traps with a critical dimension that is in the millimeter to submillimeter range, typically with associated apertures in one or more electrodes of the ion trap having a critical dimension between about 0.001 mm to about 5 mm, and any sub-range thereof.

The term "miniature SLIT" refers to a cylindrical ion trap ("CIT") with an elongated transverse ion trap aperture having a critical dimension that is in the millimeter to submillimeter range, typically with associated apertures in one or more electrodes of the ion trap having a critical dimension between about 0.001 mm to about 5 mm, and any sub-range thereof. The SLIT can have a single elongate (in the y-dimension) aperture as the trapping region or a plurality of elongate apertures such that the shape of the stretched length aperture can take on different geometries.

The term "high resolution" refers to mass spectra that can be reliably resolved to less than 1 Th, e.g., having line widths less than 1 Th (FWHM). "Th" is a Thomson unit of mass to charge ratio. High resolution operation may allow the use of monoisotopic mass to identify the substance under analysis. The term "high detector sensitivity" refers to detectors for which a lower limit of detection is from 1-100 charges per second.

The term "high pressure" refers to an operational (gas) background pressure in a vacuum chamber holding a mass analyzer at or above about 50 mTorr, such as between about 50 mTorr to about 100 Torr. In some embodiments, the vacuum chamber pressure with a mass analyzer is between about 50 mTorr and about 10 Torr, or between about 50 mTorr to about 1 Torr or about 2 Torr, e.g., at or under 5 Torr. In some embodiments, the high pressure can be about 50 mTorr, about 60 mTorr, about 70 mTorr, about 80 mTorr, about 90 mTorr, about 100 mTorr, about 150 mTorr, about 200 mTorr, about 250 mTorr, about 300 mTorr, about 350 mTorr, about 400 mTorr, about 450 mTorr, about 500 mTorr, about 600 mTorr, about 700 mTorr, about 800 mTorr, about 900 mTorr, about 1000 mTorr, about 1500 Torr or about 2000 Torr.

The term "translocate" and derivatives thereof means forcing ions, by generating an electrical field (applying an electrical potential) in the trapping region of an ion trap to alter their normal y-axis spatial distribution so that trapped ions are distributed about different selected y-axis positions in the trap, normally to one lateral end portion or the other. Translocation can optionally be carried out to push ions to predominantly eject from an ejection side of the ion trap. Conventionally, in the SLIT, there is no electric field along the y-axis so the ions can distribute nominally uniformly along this axis. Embodiments of the present invention apply electrical potentials to create an electric field along the y-axis to push the trapped ions to different y-axis positions, normally to one end of the trap or the other.

Figure 1B:
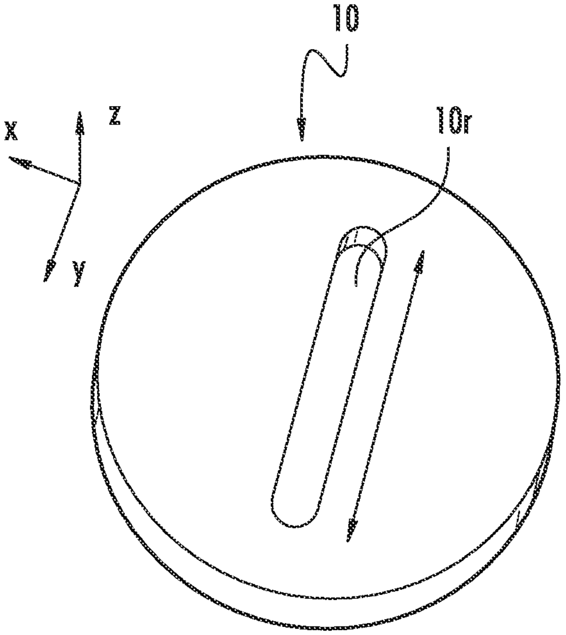
FIG. 1B is an example of a ring electrode of a Stretched Length Ion Trap (SLIT).

Generally stated, certain embodiments of the invention provide SLITs and/or electrode assemblies that can spatially manipulate ions to preferentially travel from one location to another location in the y-dimension and may be configured to alter an ion ejection location in the y-dimension of the SLIT. FIGS. 1A and 1B are schematic diagrams of electrodes used in ion trapping experiments to produce a linear quadrupole potential. FIG. 1A illustrates geometry and coordinate axis of a LIT while FIG. 1B illustrates the coordinate axis and an example geometry of an electrode 10 with a trapping region **10*r*** of a SLIT that extends in a y-dimension.

Figure 2:
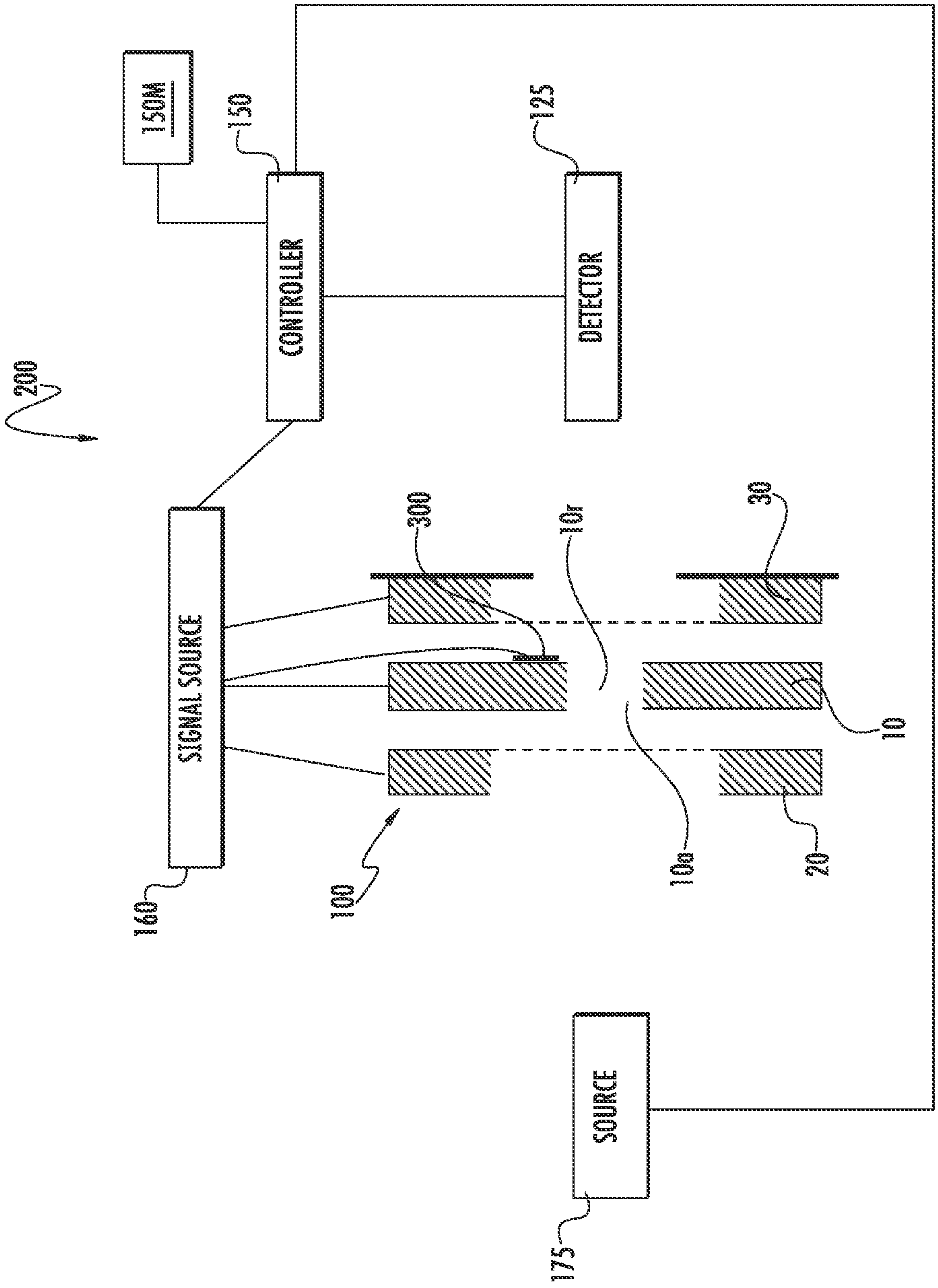
FIG. 2 is a schematic illustration of a mass spectrometer according to certain embodiments of the present invention.
Figure 4:
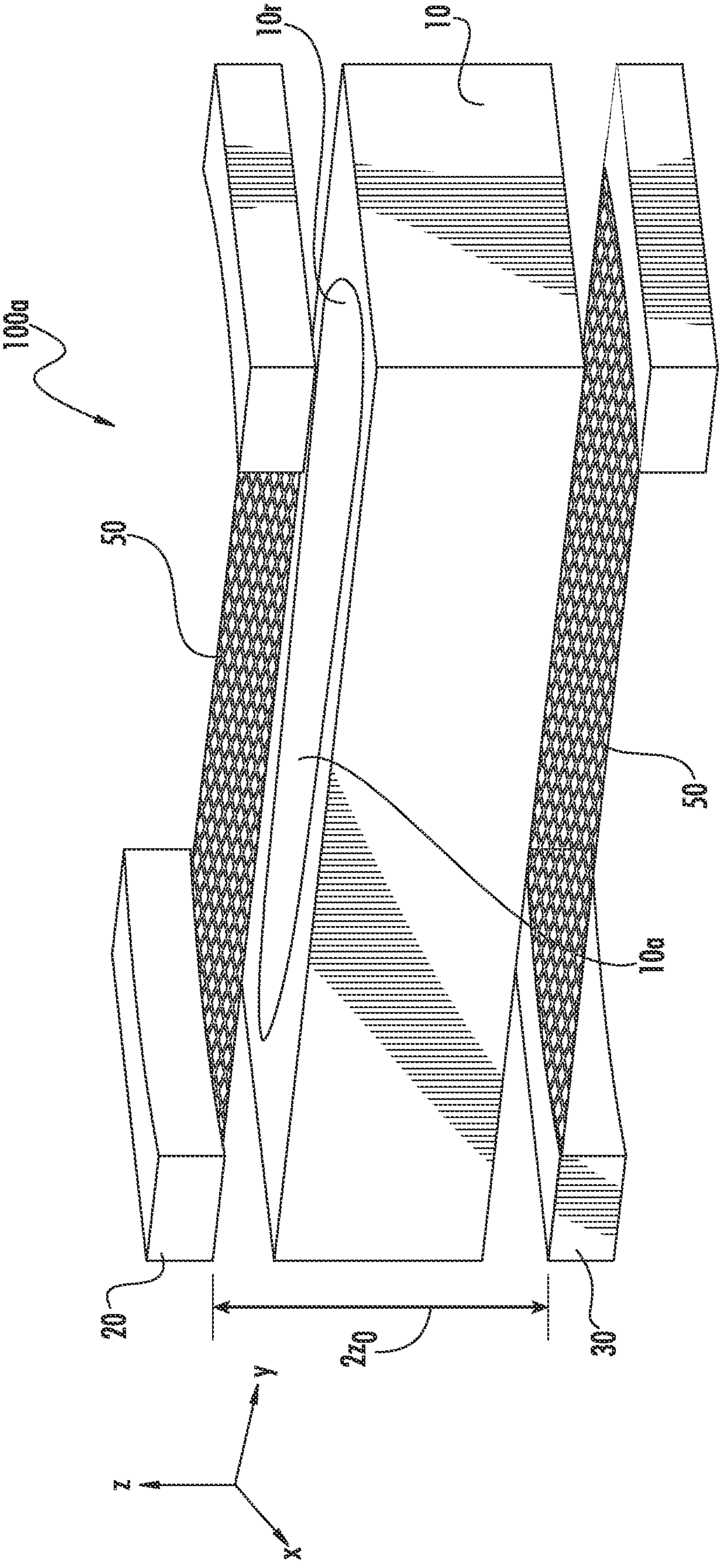
FIG. 4 is an enlarged side perspective view of an example of an electrode assembly of a SLIT according to certain embodiments of the present invention.

FIG. 2 schematically illustrates a mass spectrometer (MS) apparatus 200. In some embodiments, the MS apparatus 200 includes a stretched length ion trap (SLIT) 100. As is well known, apparatus 200 typically includes three fundamental components: an ion source 175, a mass analyzer (here a SLIT) 100 and a detector 125. The SLIT 100 includes a ring electrode 10 and endcap electrodes 20, 30 that can be implemented as a miniaturized electrode assembly 100*a* (FIG. 4). The ring electrode 10 includes at least one ion trapping region 10*r* with an elongate aperture 10*a* that is relatively small in size along two dimensions, the x and z dimension, but stretched or elongated along a third dimension, the y-dimension as shown in FIG. 4.

As shown in FIG. 4, the z direction refers to the longitudinal or axial direction between the opposing endcap electrodes 20, 30, on opposing sides of the ring electrode 10, which can also be interchangeably referred to as a "central" electrode. The term "central electrode" refers to the ring electrode 10 between the end cap electrodes 20, 30, but does not require that the ring electrode 10 be centered between the endcap electrodes 20, 30 along the z direction.

FIG. 2 also illustrates that the MS apparatus 200 can include at least one supplementary electrode 300 adjacent an aperture 10*a* of the ring electrode 10 and that extends at least partially in the y dimension along a perimeter of the aperture 10*a*. The supplementary electrode 300 is electrically isolated from the ring electrode 10 and can be independently activated to generate desired electrical potentials along the y-axis.

The MS apparatus 200 can also include one or more signal sources 160 (e.g., one or more power supplies to apply voltages) and a controller 150. The controller 150 can include one or more digital signal processors and can be configured to direct the synchronization of the different cooperating components of the MS apparatus 200.

As shown in FIG. 4, ring electrode 10 can be part of an electrode assembly 100*a* with endcap electrodes 20, 30 sandwiching the ring electrode 10. The endcap electrodes 20, 30 may have conductive mesh portions 50 covering at least a portion (or all) of the at least one elongate aperture 10*a* of the trapping region 10*r*.

The ring and end cap electrodes 10, 20, 30 may be made of any suitable conductive material such as a metal (e.g., copper, gold, silver, stainless steel) or a doped semiconductor material such as highly doped n or p type silicon. The electrodes may be formed using any suitable fabrication technique including, for example, milling, etching (e.g., wet etching), and laser cutting.

In various embodiments, the aperture 10*a* may take any elongated shape. For example, in some embodiments, the aperture 10*a* has a major dimension $y_0$ (corresponding to the largest straight-line distance traversing the aperture in the lateral (i.e., x-y) plane and a minor dimension corresponding to the largest straight-line distance traversing the aperture in the lateral plane perpendicular to the major dimension. In the example shown in FIG. 3, the value of $x_0$ is related to the value of $y_0$. In the example shown in FIG. 4, for example, the major dimension corresponds to the length $y_0$, while the minor dimension corresponds to the distance $2x_0$. Note that by convention, $x_0$ is defined herein as the half width of the aperture 10*a*, while $y_0$ is the full length of the aperture 10*a*.

In some embodiments, the ratio of the major dimension to the minor dimension, $(y_0/2x_0)$ for the aperture 10*a*, such as at a maximal or minimal transverse height location, a mid-section and/or one or both ends spaced apart in the transverse length or $y_0$ dimension (i.e., the narrow end 10*n* and the wider end 10*w* where a tapered aperture is used is greater than 1.0, 1.5, 2.0, 3.0, 4.0, 5.0, 6.0, 7.0, 8.0, 9.0, 10.0, 20.0, 30.0, 40.0, 50.0, 100.0, 150, 200, or more. For example, in some embodiments, the ratio $(y_0/2x_0)$ is in the range of 1.1-1000, or any subrange thereof. In some embodiments, the ratio of $z_0$ to $x_0$ is greater than one, e.g., in the range of 1.1-1.3.

The electrode assembly 100*a* (FIG. 4, for example) may be miniaturized, e.g., to allow charge particle trapping operation at relative high frequency. For example, in some embodiments, the minor dimension $2x_0$ of the aperture 10*a* is less than 50 mm, 10 mm, 5 mm, 4, mm, 3 mm, 2 mm, 1.0 mm, 0.1 mm, 0.01 mm, 0.05 mm, or 0.001. For example, in some embodiments, the minor dimension $2x_0$ is in the range of 0.001 mm-50 mm, or any subrange thereof. In some embodiments, the minor dimension is sufficiently small so that the electrode assembly 100*a* operates to trap approximately a line or plane of charged particles extending along the major dimension $y_0$.

In some embodiments, the transverse cavity defined by the laterally elongated aperture 10*a* in the central electrode 10 has an axial dimension $2z_0$ (FIG. 4, and longitudinal in the orientation shown in FIG. 3) of less than about 50 mm (e.g., less than about 10 mm, less than about 5 mm, less than about 4, mm, less than about 3 mm, less than about 2 mm, less than about 1.0 mm, less than about 0.1 mm, less than about 0.01 mm, less than about 0.005 mm, or less than about 0.001 mm). Note that $z_0$ is defined as the half length of the cavity, e.g., as shown, the half-length along the longitudinal direction of the aperture 10*a* plus the distance from the aperture 10*a* to the end cap electrode 20, 30. In some embodiments, the major dimension $y_0$ and the minor dimension $2x_0$ are sufficiently small that the electrode apparatus operates to trap only a single charged particle along the longitudinal dimension.

Figure 18A:
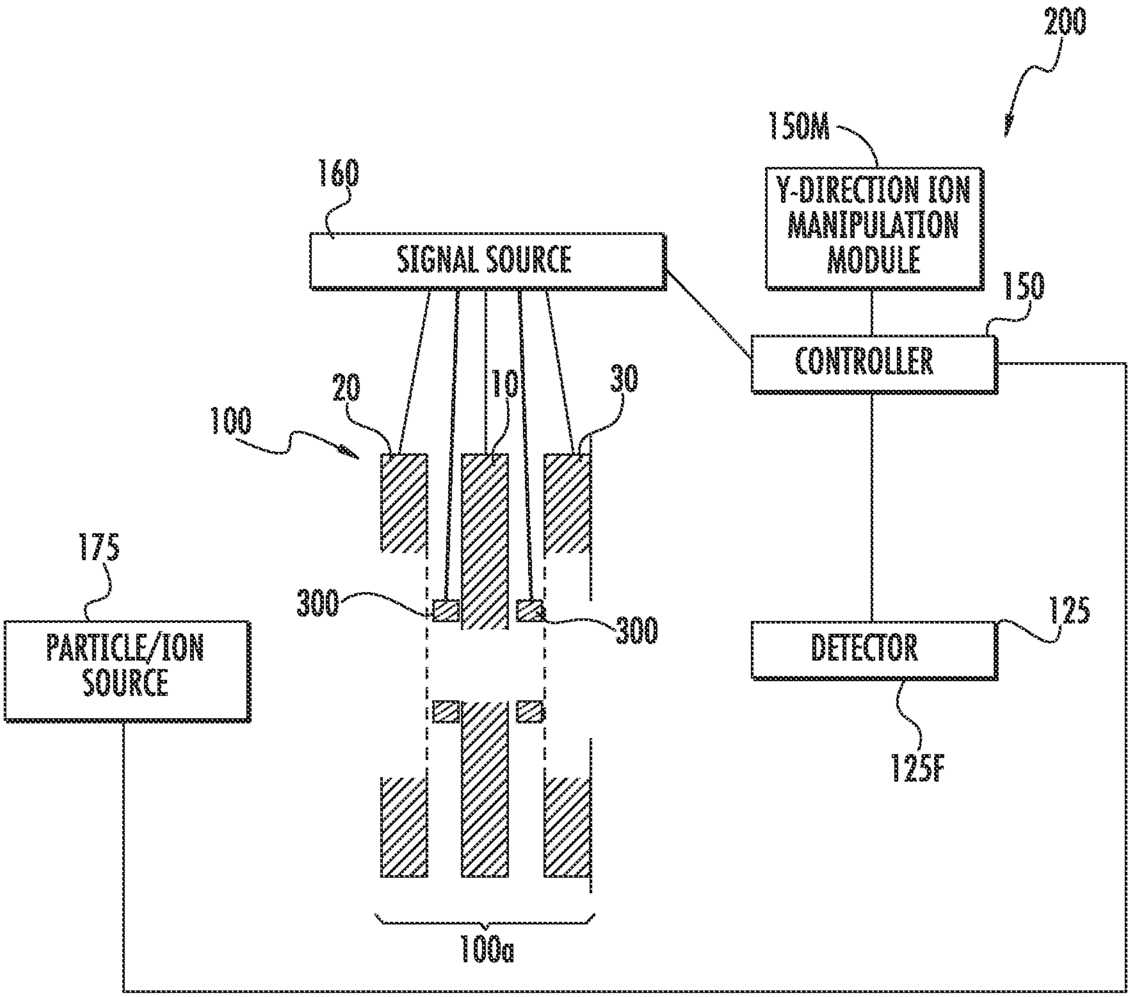
FIG. 18A is another schematic diagram of a mass spectrometer according to certain embodiments of the present invention.
Figure 18B:
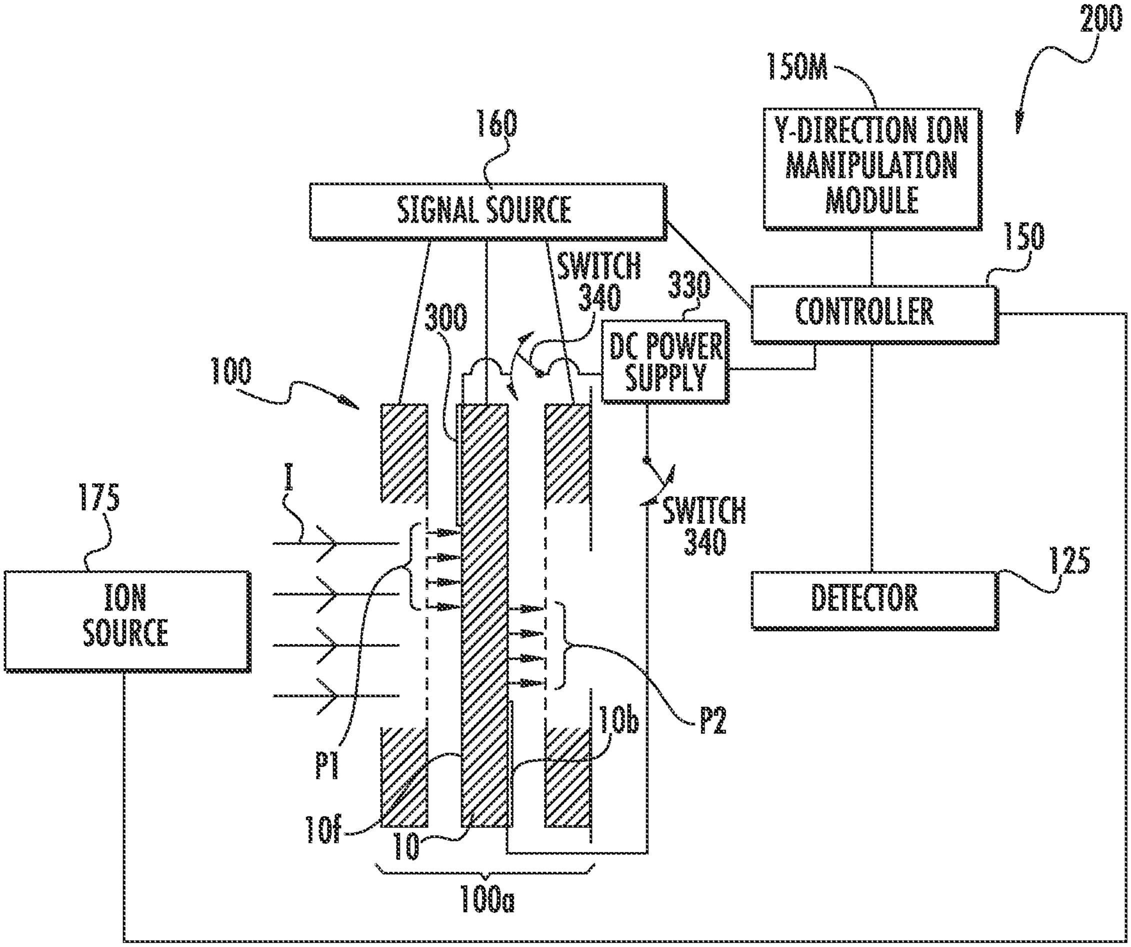
FIG. 18B is a schematic diagram of the mass spectrometer shown in FIG. 18A with arrows indicating examples of ion manipulation in the ion trap according to certain embodiments of the present invention.

As shown by the arrows in FIG. 18B, embodiments of the invention are configured to selectively inject ions in a first y-dimension region/location P1 in ring electrode 10, and to eject the ions from a second, different y-dimension region/location P2 of the ring electrode 10. This injection/ejection location differential can reduce an overabundance of charge arriving at the detector during ion accumulation. Much of this charge can escape the ion trap 100 and, depending on the trap 100 to detector 125 geometry, undesirably impact the detector 125. This overabundance of charge can be especially detrimental for a Faraday cup detector, where the response time and sensitivity are a function of the amplification circuitry.

In some embodiments, adjustment of the locations of injection and ejection along the y direction can improve MS operational time efficiency, as the detector generates a maximum output signal that is not properly correlated to ion abundance when experiencing an overabundance of charge and may require some time, on the order of a few milliseconds, to return to a baseline response. This increases the time period for the scan function and may reduce sensitivity by reducing the ability of the MS apparatus to sufficiently average scans. Spatially controlling ion injection and ejection locations along the transverse length (y-dimension) of an elongate trapping region 10*r* of a SLIT 100 can allow the detector 125 (FIG. 2) to be offset in the x-y plane from the location of the ionization region, preventing or inhibiting excess charge accumulation during ionization from saturating the detector 125.

Figure 3:
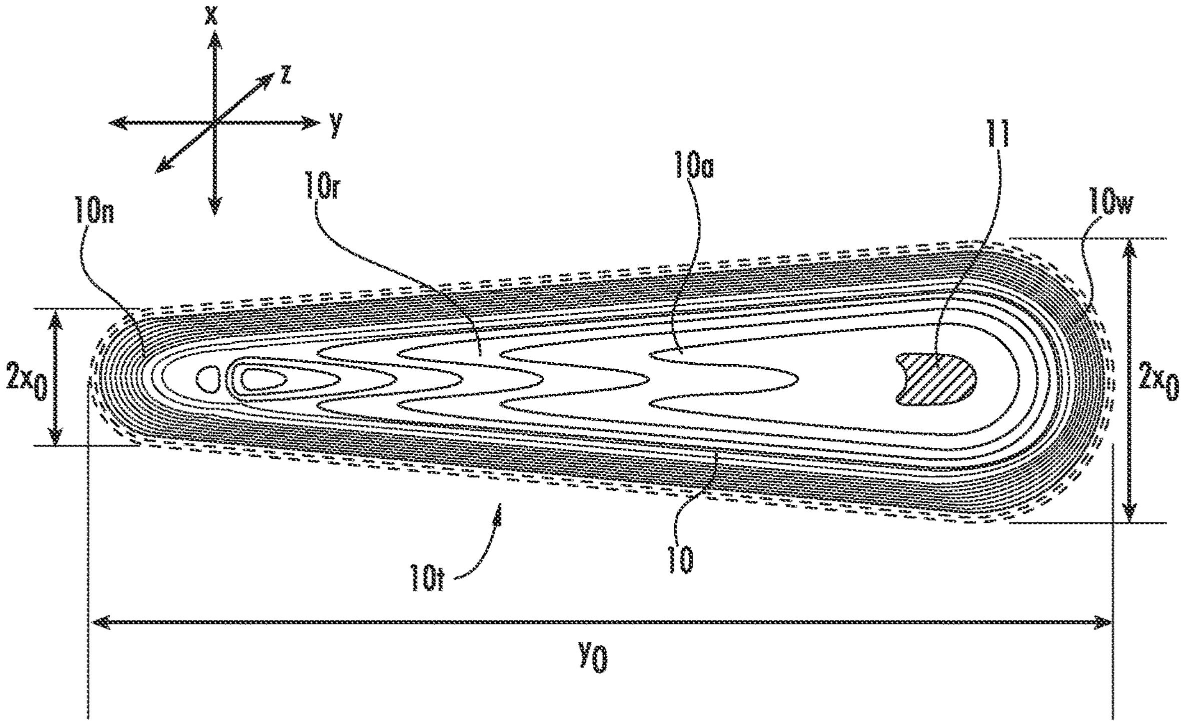
FIG. 3 is an enlarged schematic illustration of an example of a tapered SLIT with isopotential contour lines that result when a voltage is applied to the ring electrode according to certain embodiments of the present invention.

Referring to FIG. 3, in some embodiments, the SLIT ring electrode 10 can include at least one tapered aperture 10*t* (tapered in the x-dimension as a function of position along the y-dimension) as the trapping region aperture 10*a*. As shown, the aperture 10*a* has a first (narrow) end portion 10*n* that tapers to a second wider end portion 10*w* along the y-dimension (the coordinate directions are shown in FIGS. 1B and 4, for example) which can affect electrical potentials within the trap.

As shown in FIG. 3, isopotential lines from DC (direct current) voltage applied to the ring electrode 10 of the ion trap 100 can influence or control where ions locate in the x-y plane, and converge and/or travel along the y-dimension. The shaded valley 11 adjacent to the wider end portion 10w is a valley potential where positively charged ions locate when a positive potential is applied to the ring electrode 10. When a negative potential is applied to ring electrode 10, this valley 11 is a least negative zone for positively charged ions. Thus, selective application of positive and negative electrical potentials can spatially drive ions in the y-dimension.

The spatial profile of ions upon ejection from SLITs has been previously investigated. See, Schultze, K., *Advanced System Components for the Development of a Handheld Ion Trap Mass Spectrometer*. Dissertation, University of North Carolina at Chapel Hill, 2014, the contents of which are hereby incorporated by reference herein (embargoed until the end of 2016). It was found that ions rapidly sampled the entire length of the trap, though they would become axially unstable and eject at local "hot spots" related to an increase in local contributions from higher order fields created by geometrical variations. The location of these "hot spots" was difficult to predict from simple observation of the electrodes.

As pressures increase to HPMS conditions, however, the effects of these "hot spots" were reduced, likely due to collisions inhibiting the resonant amplification of ion trajectories due to the higher order fields hypothesized to be present at these points. Because of this "smoothing" effect, under the conditions desired for a portable device at 1 Torr of air buffer gas, the ejection profile was generally uniform along the length of the SLIT. At low pressures, ions preferentially ejected from the smaller end of the tapered trap, where their experienced $q_z$ value was increased due to the reduced trap dimensions; qz is a dimensionless trapping parameter defined in part by trap dimensions and does not represent space charge. Thus, ions that were rapidly sampling the full length of the trap would first become unstable in the smaller portion of the trap and eject. These experiments, however, used traditional operating conditions with no DC potential on the ring electrode. The rf amplitude can still vary in a mass selective instability scan, so space-charge can be ignored.

Applying a DC potential to a tapered ring electrode creates an electric potential gradient (i.e., electric field) (FIG. 3) along a transverse length in the y direction of the SLIT ring electrode 10. Thus, rather than relying on ions to randomly sample the full y-length of the trapping region 10r, the applied electric field can be configured to drive ions to a specific location in a y-dimension of the trapping region 10r. A positive potential on the ring electrode 10 can drive positively charged, trapped ions to the wider end portion of the trap 10w, where they can be furthest away from the surrounding perimeter wall of the ring electrode 10. A negative potential, in contrast, can pull the ions towards the narrow end portion 10n. Stability diagrams indicate, however, that there is a limit to the applied negative potential (on the order of several volts); if the applied negative potential is larger than this limit, the trapped ions will be neutralized on ring electrode 10.

In some embodiments, if not properly configured or used with an appropriate DC potential, the tapered skew of the trap—rather than simply leading to selective ejection from one location—can lead to ejection at different locations along the length of the trap due to different voltages at the locations. When scanning voltages, this can cause multiple masses to be ejected at the same time, contributing to a loss in mass spectral resolution.

Figure 5:
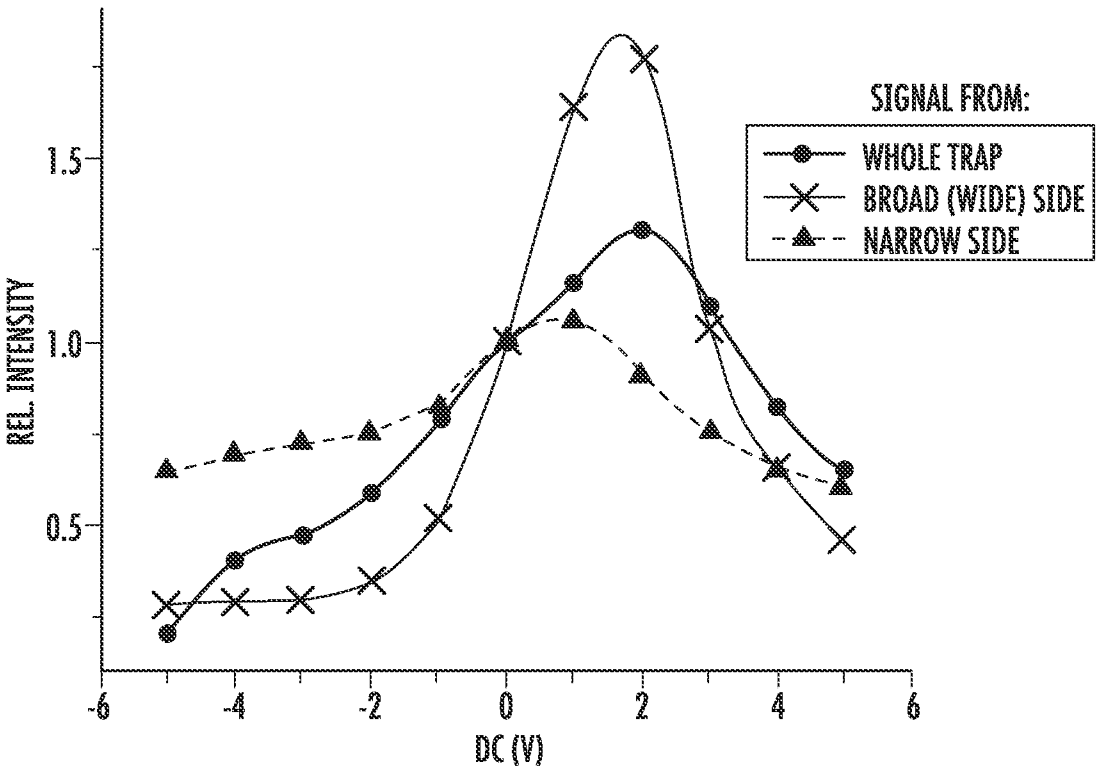
FIG. 5 is a graph of relative signal intensity versus voltage (DC) from a tapered SLIT with varied DC voltage on the ring electrode according to certain embodiments of the present invention.

To determine the effect on the SLIT ejection location of various DC potentials applied to the ring electrode, three experiments (FIG. 5) were performed where the ion intensity was measured from the entire SLIT, from the right-hand side or "broad/wide" side 10w of the SLIT, and from the left-hand or "narrow" portion 10n of the SLIT. Ion currents were measured by placing conductive copper tape, in electrical contact with the endcap, over the respective areas where signal was undesired such that all signal would be from uncovered portions of the trap. For these experiments, the SLIT had a 10% taper of the xo-dimension along the y-axis/yo-dimension with a radius of curvature of one end being 10% larger than the other, with symmetry maintained across the (transverse) length/height plane. The combination of the geometry of the SLIT and the applied voltage created the potential gradient shown in FIG. 3. With a positive potential applied, an electrical potential valley 11 was created on the broad side 10w of the trap (the deepest region of which is shaded in FIG. 3), causing ions to pool there. A negative potential would have created an opposite field, causing ion migration toward the narrow side 10n. For these experiments, the DC values were held constant throughout the scan function. For comparison purposes, each measured response was normalized to the signal with 0 volts applied. The solid circle line in FIG. 5 shows the signal from the whole tapered SLIT. As the whole trap is being sampled, signals higher than 1 indicate improved trapping while signals below 1 indicate the opposite. The maximum signal was observed with 2 V DC on the ring electrode. This was consistent with the experimental stability diagrams for straight-edged trapping regions 10r of SLITs (FIG. 1B). Also, as expected, overall signal decreased with increasing negative applied voltage.

In FIG. 5, the "x" marked line corresponds to the mass spectral intensity from the broad/wide side 10w of the SLIT ring electrode 10 when a blocking electrode was placed between the detector and the narrow half of the SLIT. If the applied field had no effect on ejection location, the measured signal would be expected to mimic the signal acquired from the entire trap (solid circle line). As expected, the relative signal intensity increased, and achieved a maximum value at approximately 2 V DC applied potential. Part of this increase was due to an increase in total number of ions trapped as a whole, but the relative gain was significantly stronger than that observed from the entire SLIT. This indicated that the trapped ions shifted their ejection location more towards the broad side 10w of the trap rather than the narrow side 10n. The triangle marked line was generated with a blocking electrode between the wide half of the SLIT and the detector, thus representing the intensity of ions ejected from the narrow side 10n. The expected signal intensity increase after applying a positive potential was again observed due to increased trapping, though it occurred at 1 V compared to 2 V DC as in the entire trap and broad side signals. Based on the broad side ejection results, this was expected since the majority of ions should be on the broad side when positive DC potentials are applied. Compared to the entire trap signal, the relative gains in intensity were weaker over a range of positive voltages, indicating a lower proportion of the ions ejecting from the narrow side. While the signal decreased slightly with a few negative volts DC, the relative signal was higher than the broad side signal, indicating a higher proportion of ions were located on the narrow side.

These results agreed with expected outcomes for ions moving towards the narrow end of the tapered SLIT with negative applied DC potential, and towards the broader end with positive applied DC potential.

Figure 6:
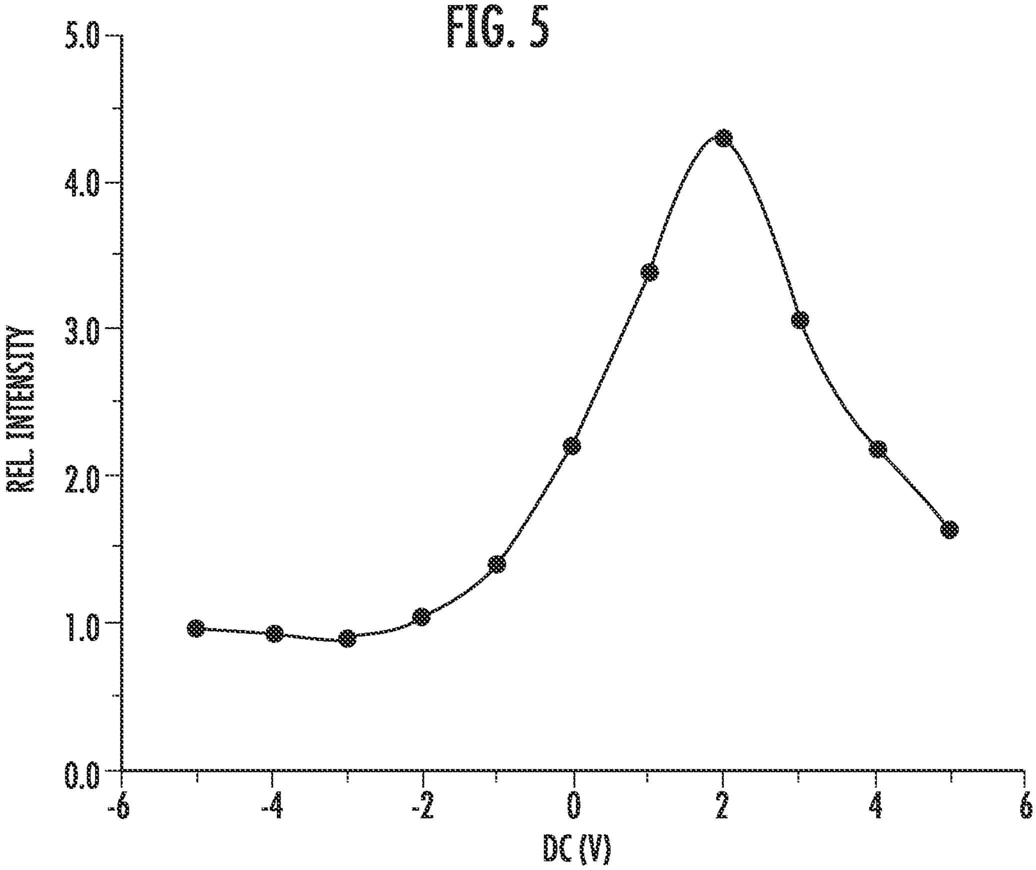
FIG. 6 is a graph of a ratio of relative signal intensity measured from a broad side of the SLIT to the narrow side of the SLIT according to certain embodiments of the present invention.

FIG. 6 shows the measured signal from the broad and narrow sides plotted as a ratio of the intensity of ions ejected from the broad side 10*w* to the intensity of ions ejected from the narrow side 10*n* of the SLIT ring electrode 10. Even at 0 V, the broader side of the trap 10*w* has a factor of ~2.2x more ions ejected. The wider side 10*w* was larger in volume, storing significantly more ions even with no applied DC voltage. The ratio of signal intensities grew with small positive DC voltages applied and shrank with small negative DC voltages applied. Beyond about 3 V in either direction, however, the ratios tend to fall off the expected trend, but this was likely due to a drop in the overall signal affecting the results.

An expected loss in resolution from non-parallelism within the trap was present with the tapered SLIT aperture 10*t* (FIG. 3), but the high pressures tended to cause a more significant limitation for an optimum resolution. Degradation of resolution was frequently a byproduct of an observed alteration of mass spectral peak shape, normally fronting. This fronting behavior was likely the result of a small population of ions ejecting from the narrow portion of the SLIT first while the majority of ions ejected later in the scan from the broad portion of the SLIT. Furthermore, the signal was observed to be reduced in these experiments compared to the expected signal from a straight-edged (non-tapered) SLIT (FIG. 1B), despite the overall volume of the trap being increased by the introduction of the taper.

Preferential control over the ions' ejection location is possible. The largest ratio from FIG. 6 shows that there can be a ~4.5x relative population of ions (around 80% of the ions) on the wide end portion 10*w* of the trap compared to the narrow end portion 10*n* at 2 V. For negative applied voltages, the ratio of trapped ion was ~0.9 at −3 V, meaning that the slight majority of trapped ions were ejected from the narrow side portion 10*n*, despite the smaller volume.

Miniaturized ion traps 100 with electrode assemblies 100*a* can operate with reduced applied voltages while using high frequencies, which may be particularly advantageous. In some embodiments, forcing ions to the smallest portion (narrow end portion 10*n*) of the aperture 10*a* of the ring electrode 10 of the ion trap 100 for mass analysis using an applied electric field or fields may be preferred in some embodiments. In other embodiments, forcing ions to the wider side 10*w* of the ring electrode 10 of the trap using an applied electric field or fields can be desirable.

In some embodiments, a time dependent application of the electric field can be used to force a majority of the ions to move in the y-dimension from an injection location to a different ejection location along the y-dimension.

Figure 7:
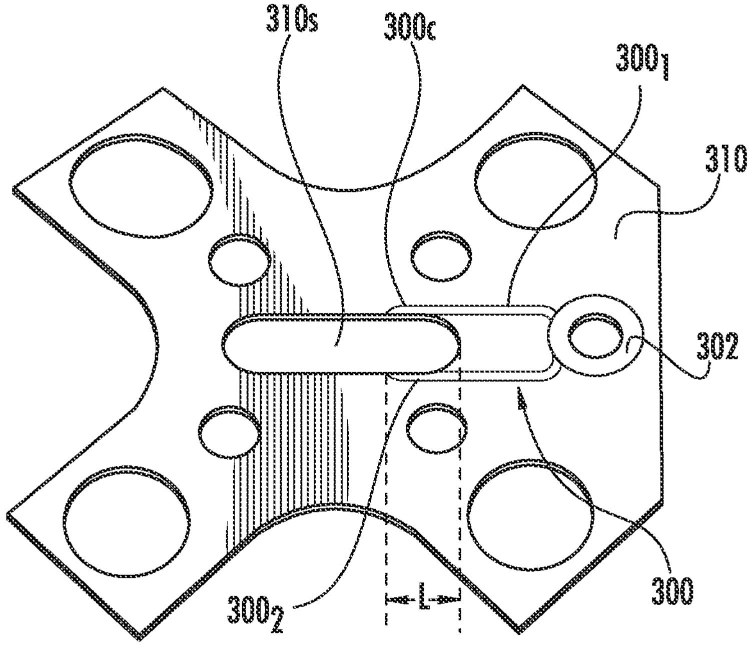
FIG. 7 is a top view of a printed circuit board that includes supplementary electrodes according to certain embodiments of the present invention.

Referring to FIG. 7, in some embodiments, ion location can be controlled using one or more supplemental electrodes 300 to introduce an electric field (i.e., electric potential gradient) along the y-axis of a SLIT ring electrode 10. Supplemental electrode 300 is sized and configured to reside adjacent at least one long side of a perimeter of an elongated aperture 310*s* that corresponds to the long side of the elongate aperture 10*a* of the trapping region 10*r*. The terms "supplemental electrode" and "supplementary electrode" are used interchangeably and refer to one or more electrically conductive or electrically resistive members or regions positioned between the ring electrode 10 and one or more of the endcap electrodes 20, 30 to create an electric field along the y-axis adjacent the elongate aperture 10*a* of the trapping region 10*r*.

The supplementary electrode(s) 300 can have voltages between +/−1 V to about +/−50V, such as, for example, up to +/−30 V, in some experiments, with lower voltages typically applied when the supplementary electrode is positioned closer to the trapping volume.

In some embodiments, there is no Z-axis DC electric field within the trapping volume, assuming perfect symmetry of the end cap electrodes 20, 30. With ideal z-axis symmetry of the electrodes, an ion would be expected to be equally likely to eject from either endcap. Once past the endcap, the ejected ion may be accelerated to a detector by a field (e.g., ~0-100 V for a Faraday detector; ~1-2 kV for an electron multiplier detector). During operation of the trap, an AC potential on the order of 100V-1000 V can be applied to the ring electrode.

As shown in FIG. 7, there are first and second linear supplemental electrodes $\mathbf{300}_1$, $\mathbf{300}_2$ residing about a length "L" of each long side of the trapping region 10*r* along the y-dimension. In some embodiments, the first and second supplemental electrodes $\mathbf{300}_1$, $\mathbf{300}_2$ can be electrically coupled to a voltage supply input or node 302, shown in FIG. 7 as a solder point of circuit board 310. The distance "L" is typically less than 50% of the overall length of a respective aperture 310*s* or 10*a* of the trapping region 10*r*, more typically between about 5% and about 30%, but other lengths may be used.

In some embodiments, the one or more supplemental electrodes 300 can extend across an entire y-dimension length of the elongate aperture 10*a*. In some embodiments, the one or more supplemental electrodes 300 can have constant or varying electrical conductivity or resistivity (at a normal operating temperature of the MS apparatus) over its transverse length (in the y-dimension) as a consequence of the electrode material or materials, coatings and the like.

Figure 8:
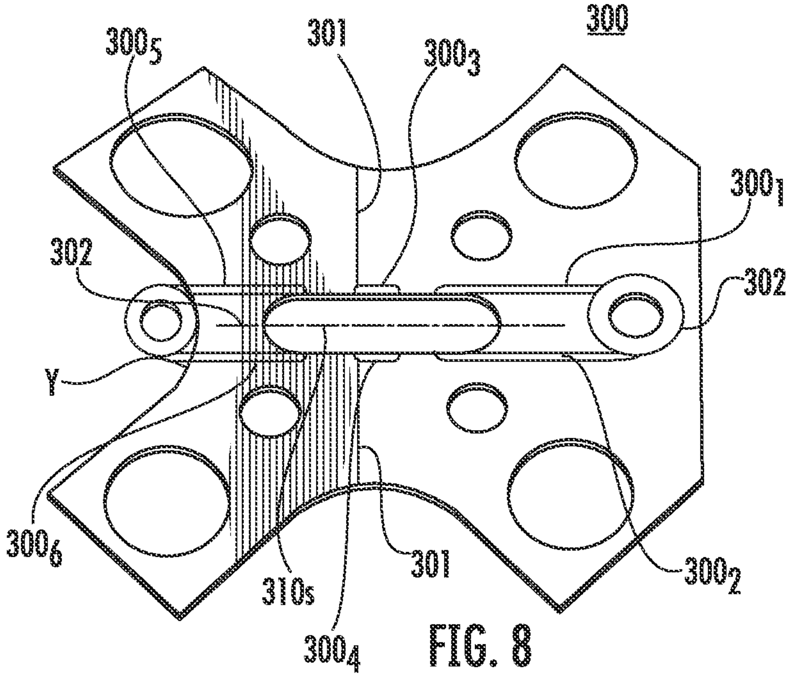
FIG. 8 is a top view of a printed circuit board that includes additional supplementary electrodes according to certain embodiments of the present invention.
Figure 9A:
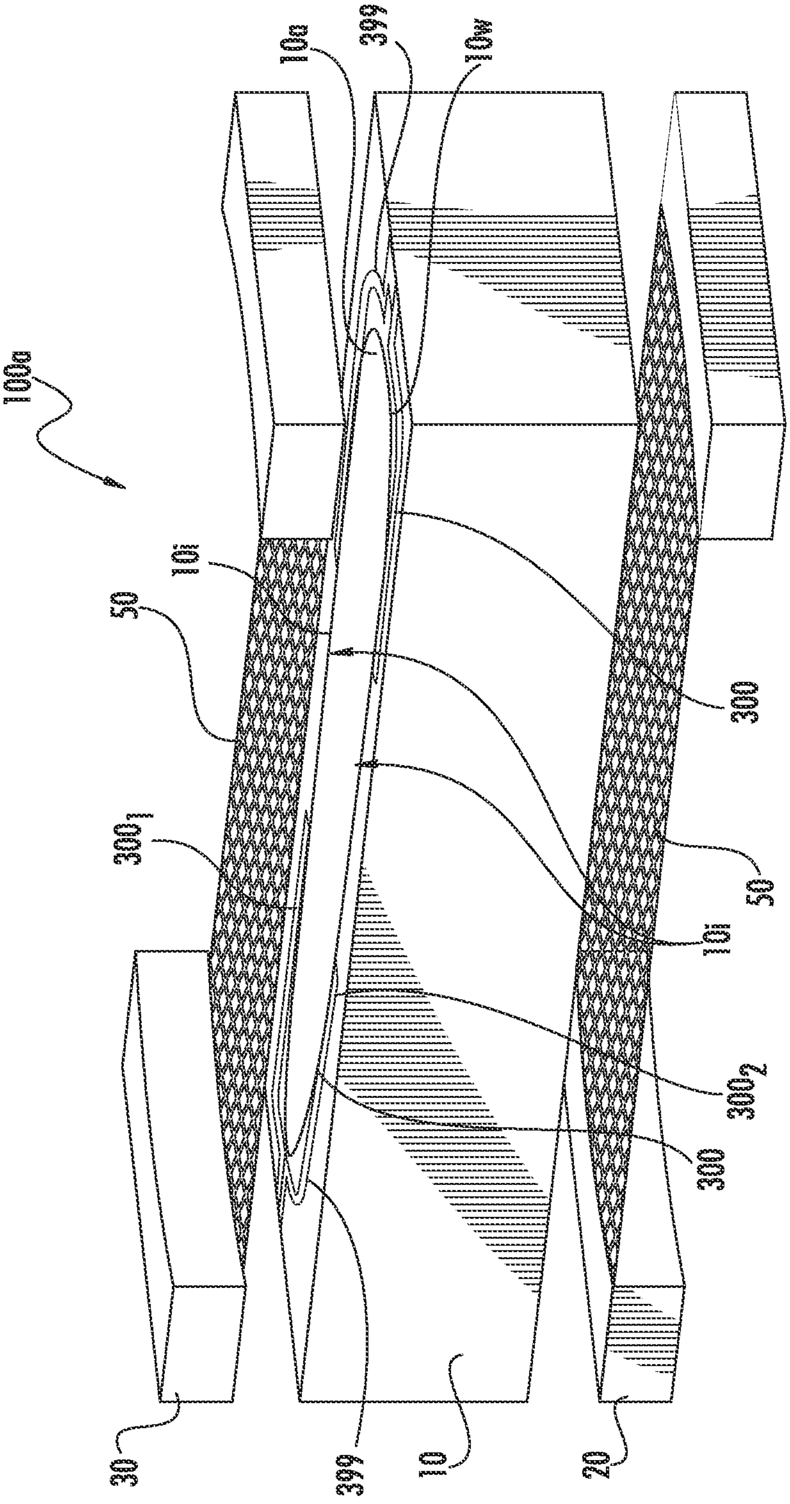
FIG. 9A is a side perspective view of an electrode assembly of a SLIT with supplementary electrodes according to certain embodiments of the present invention.

FIG. 8 illustrates other embodiments of supplemental electrodes 300, shown as supplemental electrodes $\mathbf{300}_1$, $\mathbf{300}_2$, $\mathbf{300}_3$, $\mathbf{300}_4$, $\mathbf{300}_5$, $\mathbf{300}_6$, one, some or all of which may be used for a particular electrode assembly 100*a* (FIG. 9A).

Figure 9B:
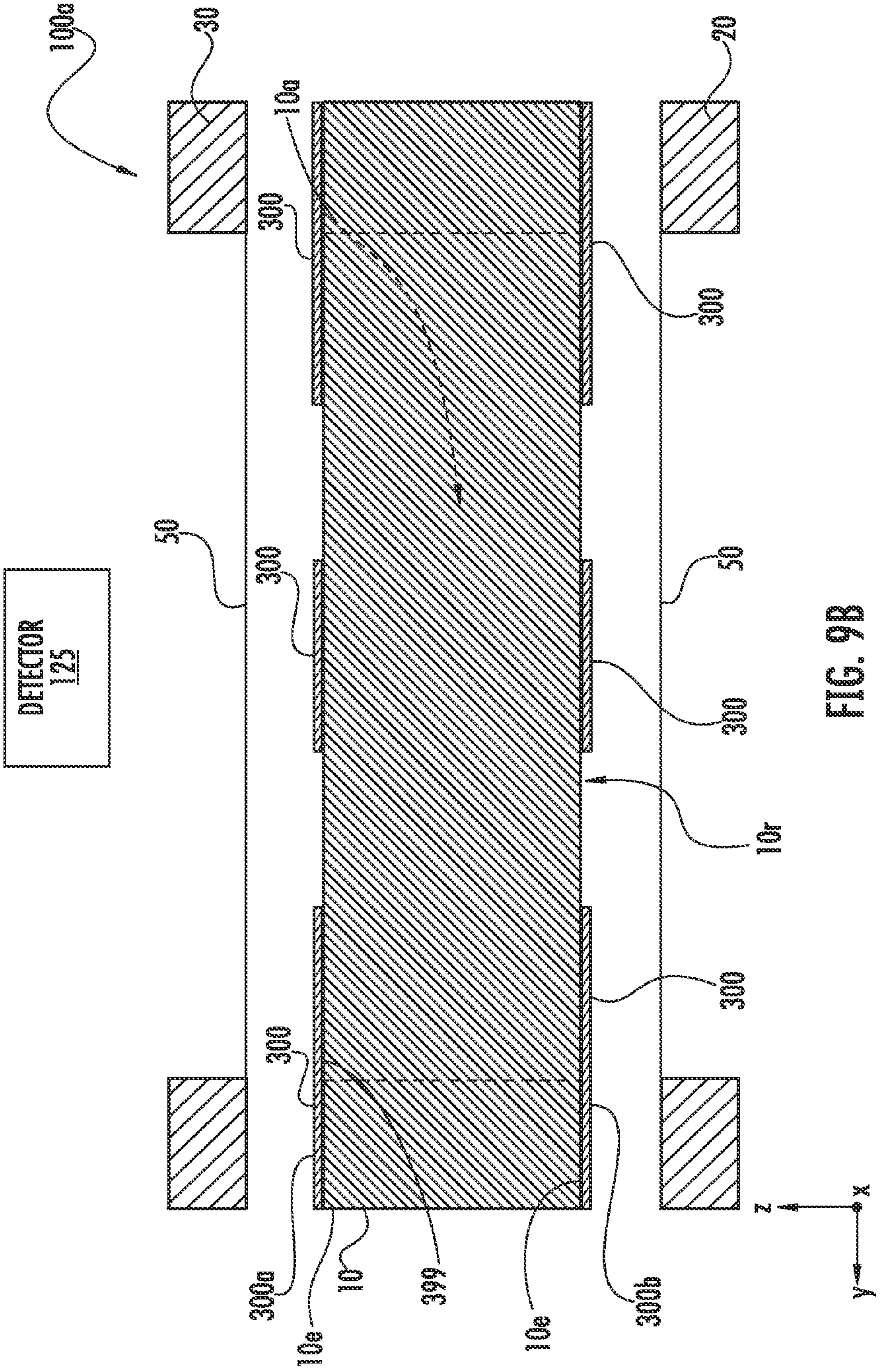
FIG. 9B is a side schematic view of an electrode assembly of a SLIT with supplementary electrodes in multiple planes according to certain embodiments of the present invention.
Figure 10A:
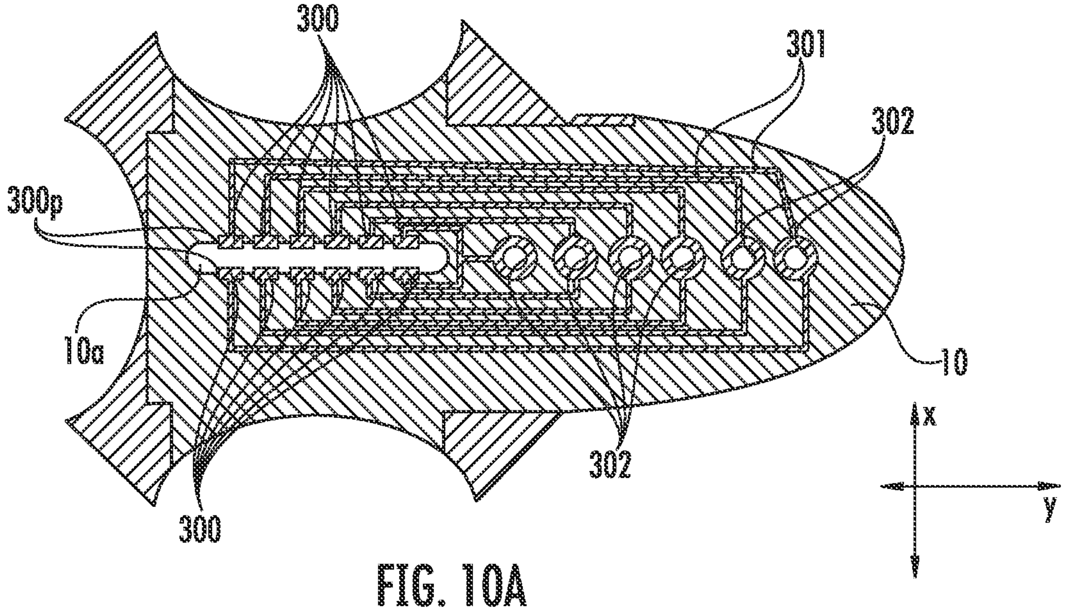
FIGS. 10A-10D are schematic diagrams showing examples of central ring electrodes with cooperating supplementary electrode configurations according to certain embodiments of the present invention.
Figure 10B:
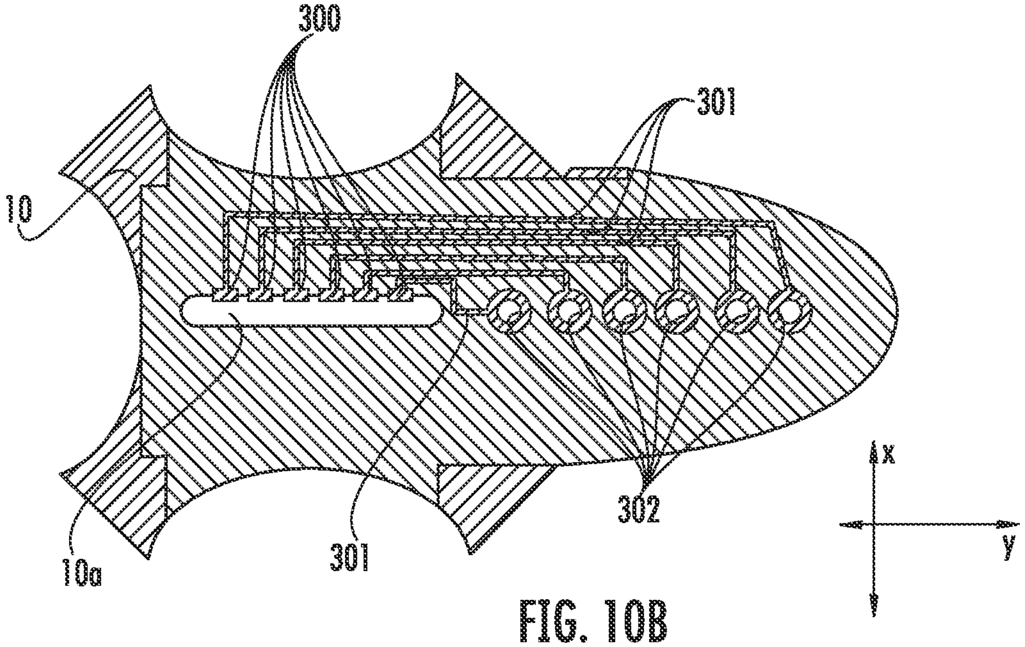

One or more supplemental electrodes 300 can reside adjacent a y-dimensional edge or end 10*e* of a SLIT aperture 10*a* (FIGS. 9A, 10B). Supplemental electrodes 300 can reside in a single plane (e.g., in a plane parallel to the x-y plane) on opposing long y-side edges of the ion trap aperture 10*a* (FIGS. 7, 10A). Supplemental electrodes 300 can reside in multiple planes (e.g., planes that are parallel to the x-y plane) that are spaced apart in the z-dimension on opposing transverse ends 10*e* of the central or ring electrode 10 (FIG. 9B). Thus, one or more supplemental electrodes 300 can be placed between the endcap electrode 20 and the ring electrode 10, and/or between the endcap electrode 30 and the ring electrode 10, and/or between each of the endcaps 20, 30 and a facing surface of the ring electrode 10. Thus, the one or more supplemental electrodes 300 can be positioned adjacent either long edge or both edges of aperture 10*a*, and/or adjacent either or both sides of the ring electrode 10, and all combinations thereof.

As shown in FIG. 8, the left side pair of supplemental electrodes $\mathbf{300}_5$, $\mathbf{300}_6$ and the right side pair of the supplemental electrodes $\mathbf{300}_1$, $\mathbf{300}_2$ can be formed by a continuous length of conductive material, such as a copper trace or wire, that is positioned on both sides of the aperture 10*a* in a single plane spaced apart across an x-dimension of the aperture 10*a*. Electrically conductive wires, traces or other connections 301 can provide electrical connections to the voltage input 302 and/or to one or more voltage supplies 160, 330 (FIGS. 18A, 18B) for applying voltages to the supplemental electrodes 300.

Supplemental electrodes 300 may be planar and be provided in one or multiple different (parallel) planes. For example, as shown in FIG. 9B, first and second supplemental electrodes 300*a*, 300*b* on opposing egress and ingress sides or faces can be co-planar and spaced apart a distance in the longitudinal or axial (i.e., z) direction.

Where different supplemental electrodes 300 are used and spaced apart in the y-dimension and/or z dimension, they can be activated independently, in groups or concurrently and/or selectively in a time dependent manner to control the directional movement of the ions about the y-dimension of the ion trap 10.

In some embodiments, a time dependent application of an electric field using one or more supplementary electrodes 300 can be used to force trapped ions to move in the y-dimension from an injection location in the x-y plane to a different ejection location in the x-y plane. Time dependent voltages applied to these one or more supplemental electrodes 300 can also be used to perform collision induced dissociation (CID) for tandem MS experiments.

FIG. 9A illustrates a cooperating pair of supplemental electrode(s) 300 on opposing long side regions of the aperture 10*a* including adjacent a transverse end 10*e* and can be placed between the ring electrode 10 and the endcap 30 that is closer to the detector 125. FIG. 9A also shows the supplemental electrode 300 adjacent at least one inner edge 101 (shown as two linear supplemental electrodes $\mathbf{300}_1$, $\mathbf{300}_2$, placed at two inner edges across from each other) of a wall 10*w* of the ring electrode 10 bounding each long side of the aperture 10*a*.

FIG. 9B illustrates that the supplemental electrodes 300 can be placed on both sides of the aperture 10*a* of the trapping region 10*r* of the SLIT. Referring to FIG. 9B, when supplemental electrodes 300 are placed on opposing sides of the ring electrode 10, the different side supplemental electrodes 300*a*, 300*b* can be spaced apart in the z-dimension a distance corresponding to or about equal to the thickness of the ring electrode 10 in the z-dimension. An electrically insulating gap and/or material 399 (optionally comprising a printed circuit board 310, FIGS. 7, 8) can reside between the supplemental electrode 300 and the facing surface of the ring electrode 10.

Figure 9C:
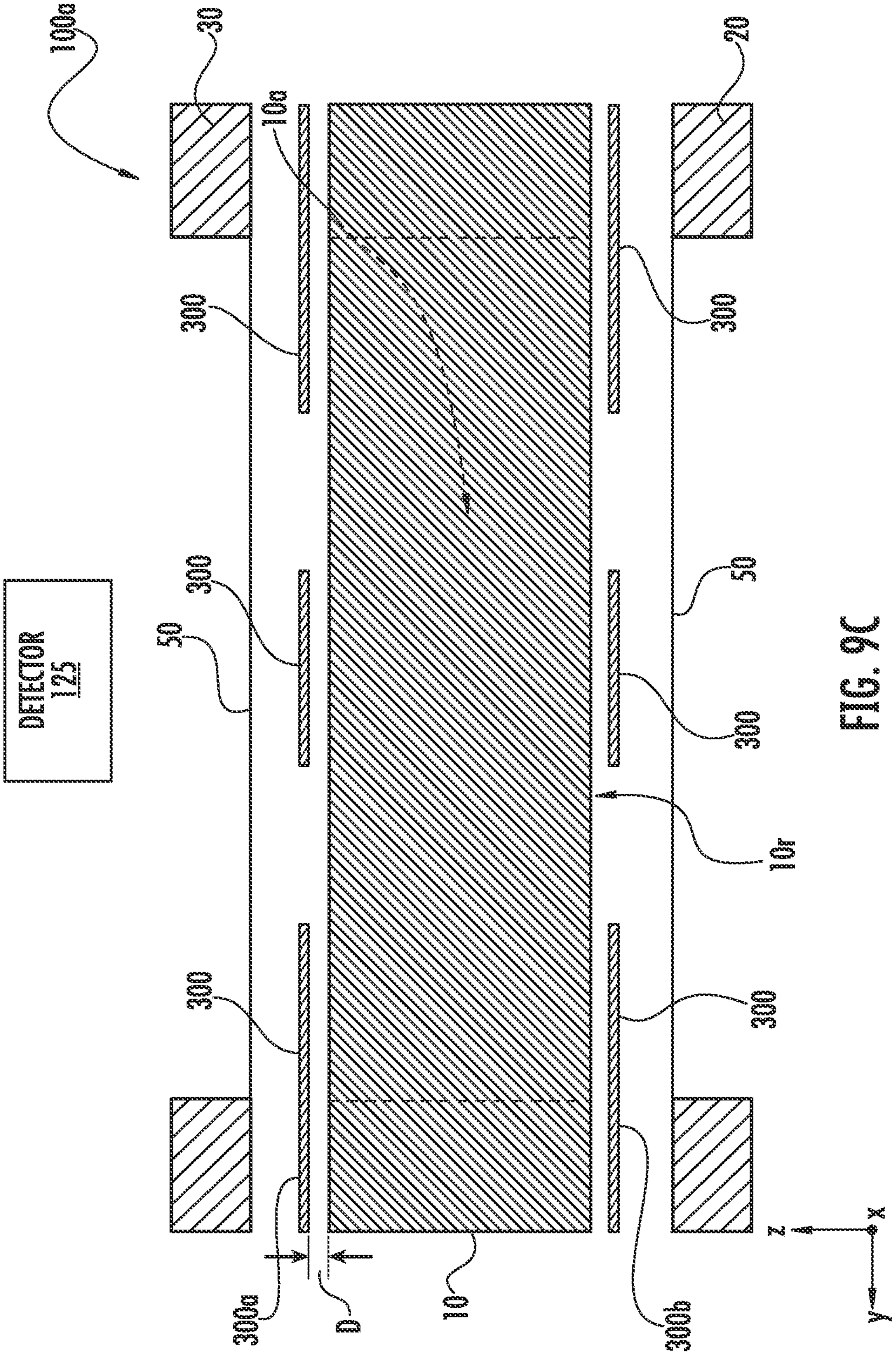
FIGS. 9C-9G are side schematic views of other embodiments of an electrode assembly of a SLIT according to certain embodiments of the present invention.

FIG. 9C shows the different side supplemental electrodes 300*a*, 300*b* closely spaced apart from the facing ring electrode surface a distance D between the ring electrode 10 and detector 125.

One or more of the supplemental electrodes 300 can be positioned between the ring electrode 10 and a respective endcap electrode 20 and/or 30 closely spaced apart from the ring electrode 10 a distance "D" in a z dimension as shown in FIGS. 9A-9F. This distance D can be a fraction of the ring electrode to facing endcap electrode 20 or 30 spacing, which may be about halfway between the ring electrode 10 and a facing surface of an adjacent endcap electrode 20 and/or 30. This closely spaced apart distance D can place the supplemental electrode 300 closer to the ingress or egress side of the ring electrode 10 or closer to the facing endcap electrode 20 and/or 30 than the ingress or egress side of the ring electrode 10. This distance D can be between 0.0001 mm and 100 mm, more typically between 0.01 mm and 10 mm, recognizing that it will not be larger than z0. That is, the upper bound of the distance D will depend on the size of the trap aperture 10*a* and can be some fraction of zo, such as between 10% to 95% of zo. The upper bound of the distance D can be some fraction of the ring electrode 10 to the facing endcap electrode 20 or 30 spacing, such as between 10% to 95% of that spacing, in some embodiments.

Where supplemental electrodes 300 are spaced apart in the z-dimension, they can be spaced apart on opposing injection and ejection ends or sides of the ring electrode 10 and be spaced apart in the z-dimension a distance D between 0.01 mm and 100 mm, typically between such as about 100 mm, about 50 mm, about 10 mm, about 5 mm, about 4 mm, about 3 mm, about 2 mm, about 1.0 mm, about 0.1 mm, about 0.01 mm, about 0.05 mm, or about 0.01 mm, for example, again subject to the maximal spacing is less than z0.

Figure 9D:
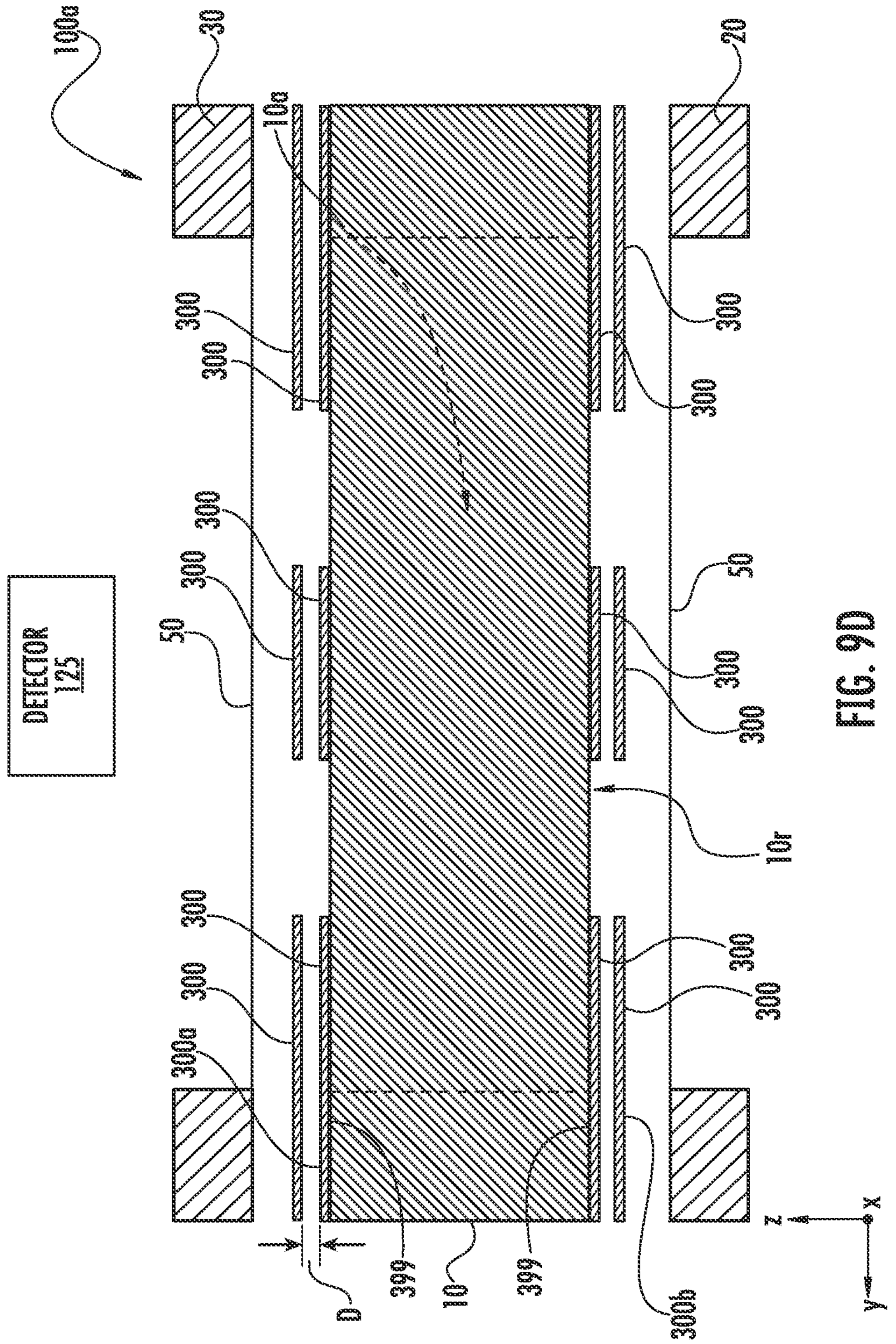

FIG. 9D illustrates that the supplemental electrodes 300 can be spaced apart in the z-direction on the same egress side of a respective ring electrode 10 between the ring electrode 10 and a facing endcap electrode 20 and/or 30, with at least one supplemental electrode 300 closer (and on the same side of the ring electrode) to the ejection side of the ring electrode 10 in the z-direction than at least one other supplemental electrode 300. This z-dimension/direction spacing D between supplemental electrodes 300 on the same side of the ring electrode 10 can be between 0.0001 mm to about 100 mm. A similar or different supplemental electrode 300 arrangement can be used for the ingress side of the ring electrode 10 (shown as similar in this example figure).

Figure 9E:
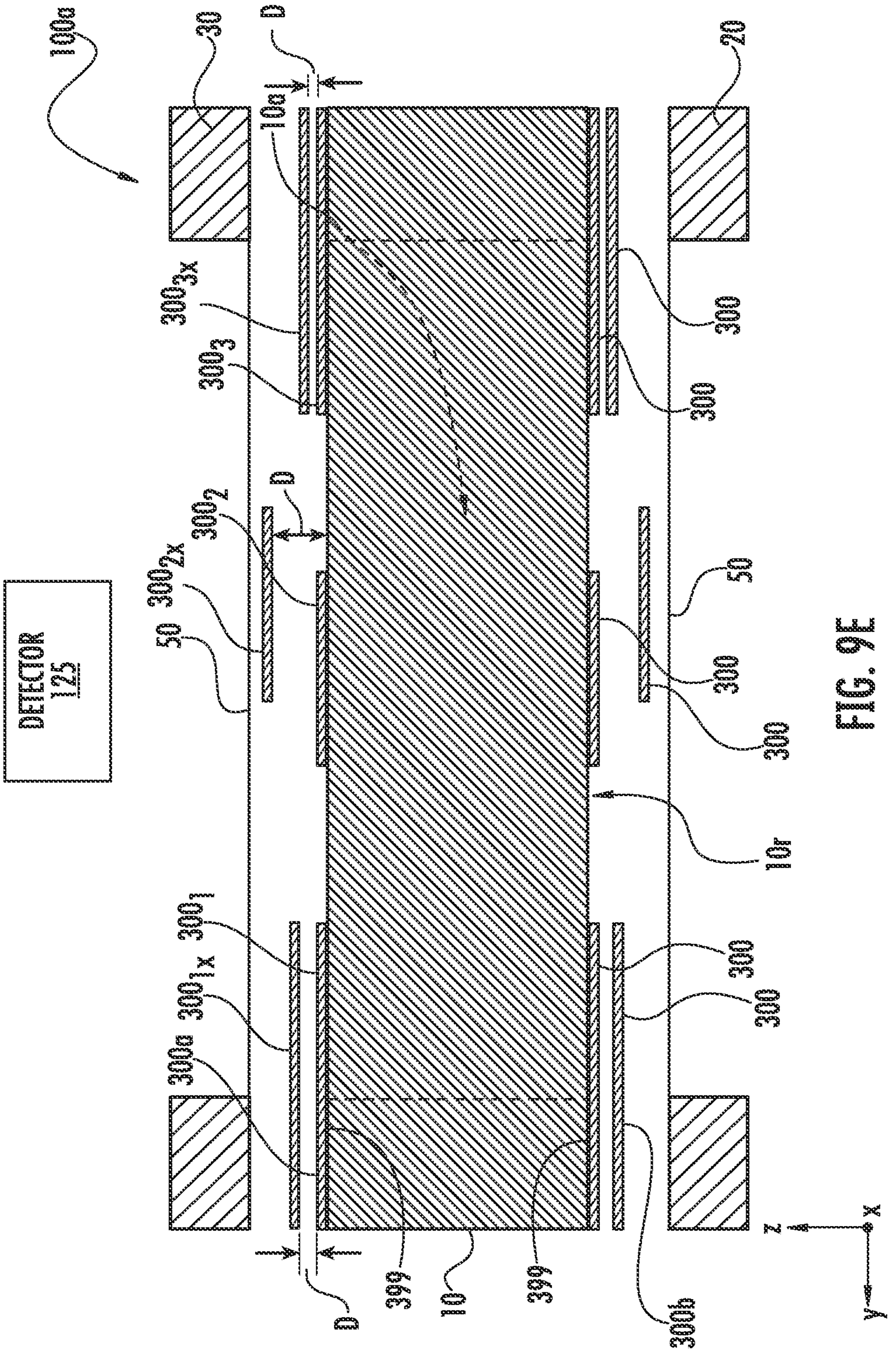
Figure 9F:
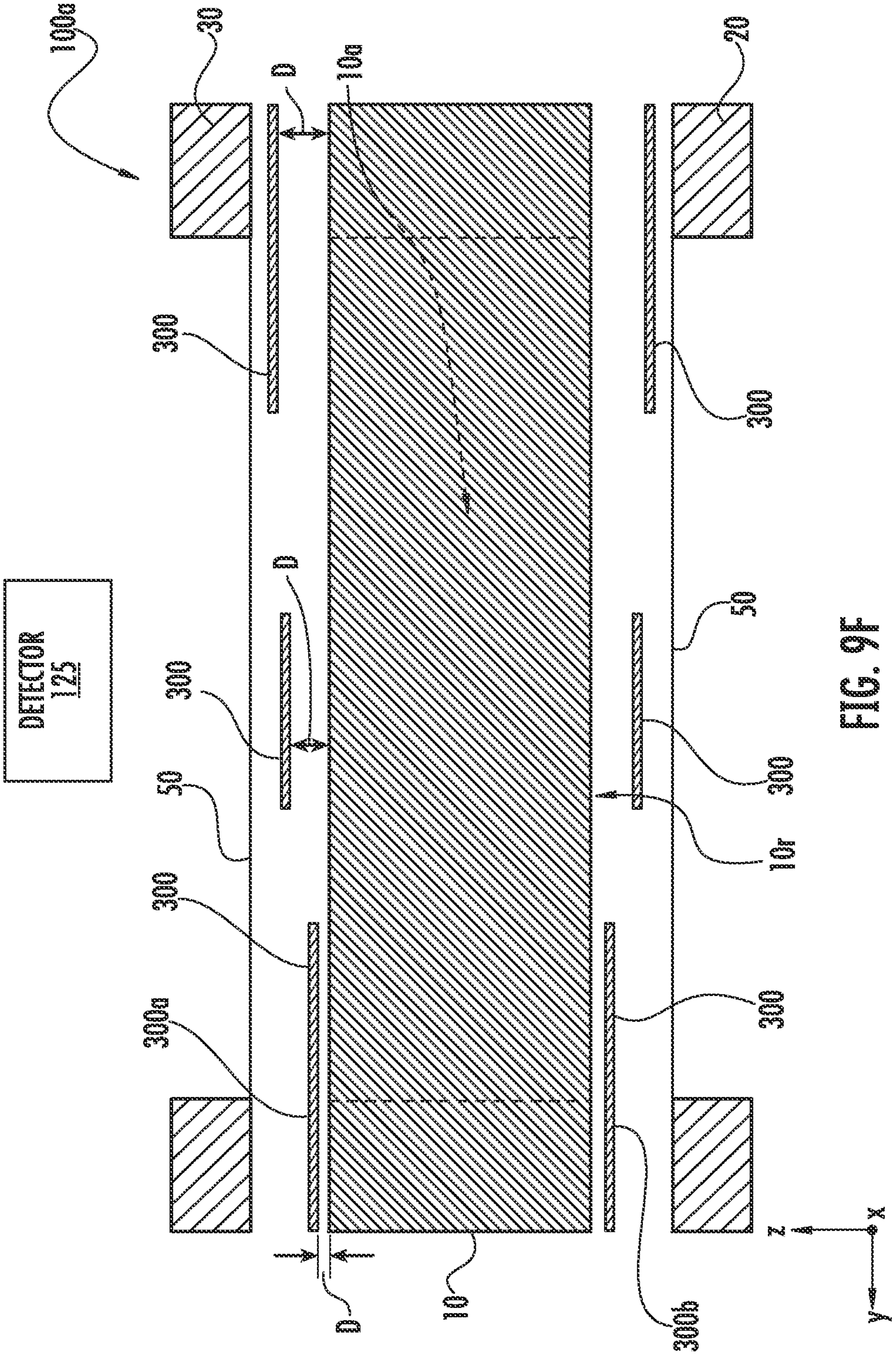
Figure 9G:
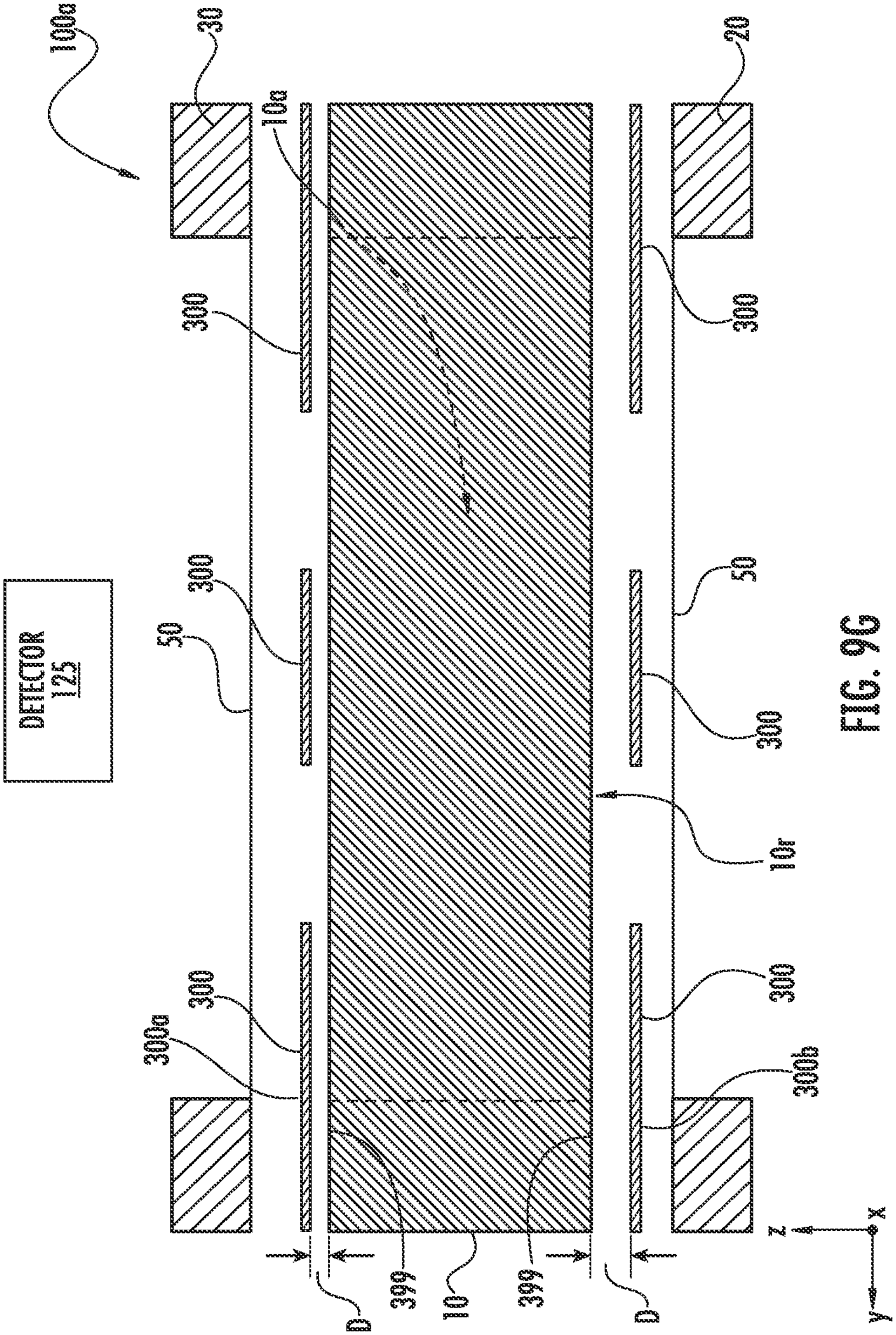

FIGS. 9E-9G illustrate an assembly 100*a* with multiple supplemental electrodes 300 on the same side of electrode 10 and having different D values. FIG. 9E illustrates that the assembly 100*a* can have stacked sets or pairs of supplemental electrodes, i.e., $\mathbf{300}_1$, $\mathbf{300}_{1x}$ and $\mathbf{300}_2$, $\mathbf{300}_{2x}$ and $\mathbf{300}_3$, $\mathbf{300}_{3x}$, and each pair can have a (x-y plane) separation distance D from the facing surface of the ring electrode 10 that is the same or different than another pair or set.

FIG. 9E also illustrates one or of the stacked sets, shown by way of example as the medial set $\mathbf{300}_2$, $\mathbf{300}_{2x}$, can have an asymmetric configuration where one end and/or a center thereof, in the transverse length direction, extends at a different transverse length position from the other $\mathbf{300}_{2x}$.

FIG. 9F illustrates the supplemental electrodes 300 spaced apart in the transverse length direction on the ejection side and on the ingress side can have different x-y plane locations, i.e., they can be spaced apart in the "z" dimension/longitudinal direction a common distance D or different distances D from one or more other supplemental electrodes 300 on the same side of the ring electrode 10.

FIG. 9G illustrates that supplemental electrodes 300 on each side of the ring electrode 10 can be positioned a common distance D from the facing side of the ring electrode but electrodes 300*a* on the ejection side of the ring electrode 10 can reside a different distance D than those on the ingress side 300*b*.

Figure 9H:
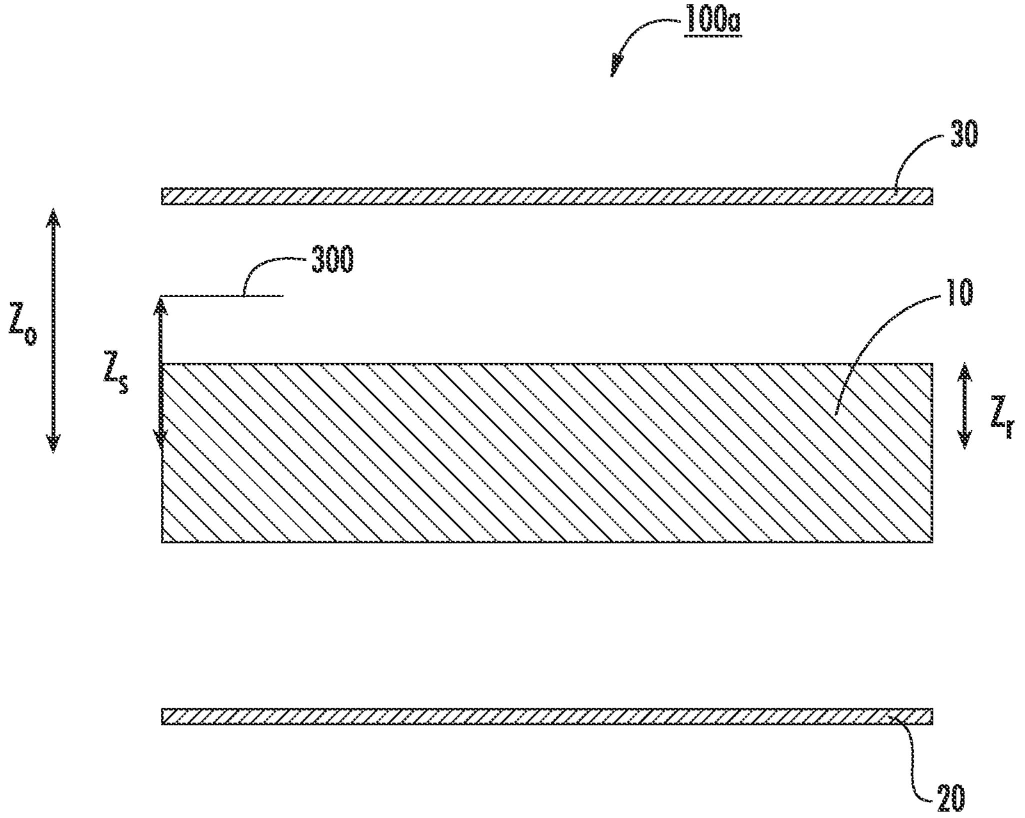
FIG. 9H is a schematic view of an assembly showing another exemplary way to calculate supplemental electrode spacing $z_s$ relative to $z_r$ and $z_0$ according to embodiments of the present invention.

FIG. 9H illustrates an assembly 100*a* with another parameterized methodology to define a supplemental electrode spacing $z_s$ based on $z_0$ and $z_r$, where $z_r$ is the half-thickness of the ring electrode 10. The at least one supplemental electrode 300 can be placed in any z position within the space between the ring electrode 10 and the facing endcap electrode 20 or 30. The supplemental electrode 300 must be electrically isolated from the ring 10 and endcap electrodes 20, 30 and thus spaced away from them by some distance with an electrically insulating material in between. The minimum spacing between the supplemental electrode 300 and one of the ion trap electrodes 20, 30 is estimated to be about ≈0.1 μm. The ring electrode half thickness, $z_r$, can have values that range between $0<z_r<z_0$ and the z position of the supplemental electrode, $z_s$, can correspondingly be in the range $z_r<z_s<z_0$. Given that, in some particular embodiments, a range for the ratio of $z_0$ to $x_0$ is about 1.1-1.3, $z_r$ to $z_0$ ratio can be in a range of about 0.14-0.70. The $z_s$ to $z_0$ ratio can be in the range $z_r/z_0<z_s/z_0<1$. In some embodiments, $z_s$ can be closer to that of $z_r$ than $z_0$, i.e., closer to the ring electrode 10, which may more effectively induce electric fields in the y direction for a given applied supplemental voltage. As discussed above, $z_0$ is defined as the half length of the cavity, e.g., as shown, the half-length along the longitudinal direction of the aperture 10*a* plus the distance from the aperture 10*a* to the end cap electrode 20, 30.

Depending on the z dimension or z-direction distance, y dimension, and/or the x-y plane distance of the one or more supplemental electrodes 300 from a respective long side of the elongate aperture 10*a* of the trapping region 10*r* of the ring electrode 10, larger or smaller potentials can be applied to the one or more supplemental electrodes 300 for applying suitable electric potential gradients along the $y_0$ dimension, a transverse length of the long side or sides of the elongated trap aperture 10*a*, i.e., along the y-axis. The supplemental electrode(s) 300 can be positioned so that potential applied to the electrode(s) 300 penetrate the field at the center of the trapping region of the ion trap 10*r*.

A negative potential can pull positive ions towards that portion of the trap, while a positive potential can repel the positive ions.

FIGS. 10A-10D illustrate examples of ring electrodes 10 with one or more cooperating supplemental electrodes 300. FIG. 10A illustrates a plurality of laterally spaced supplemental electrodes 300 with pairs of supplemental electrodes 300*p* aligned across the aperture 10*a* in the x-dimension. Each pair of supplemental electrodes 300*p* can be connected to a common voltage input 302 via corresponding electrical paths 301. Although shown as six pairs of supplemental electrodes 300*p* connected to a respective one of six voltage inputs 302, more or less supplemental electrodes 300 may be used. Also, multiple pairs or sets of supplemental electrodes 300 can be connected to the same voltage input 302. The voltage inputs 302 can be laterally spaced from the ring electrode aperture 10*a* on a single side of aperture 10*a*. Alternatively, in some other embodiments, the voltage inputs 302 can be positioned on both laterally opposed sides and/or above and/or below the aperture 10*a*, spaced in the x-dimension and/or the y-dimension from aperture 10*a*.

In some embodiments, one or more switches 340 can be positioned, for example, in the electrical path 301 or upstream of the voltage source inputs 302 can be used to turn on and off the electric potentials applied to the different ones or sets of electrodes 300 in a time sequence (FIG. 18B).

FIG. 10B illustrates that the supplemental electrodes 300 can reside along a single side of the aperture 10*a*, spaced apart in the y-dimension.

Figure 10C:
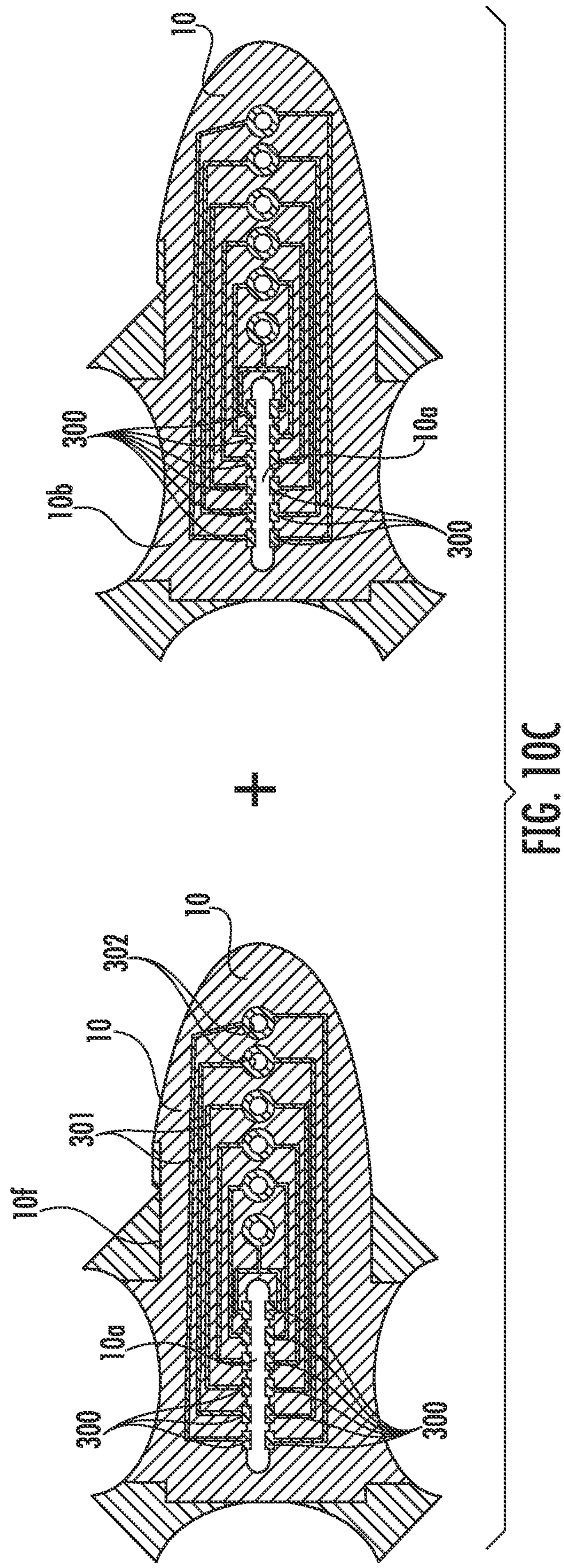

FIG. 10C illustrates that the supplemental electrodes 300 can reside adjacent each of the opposing front and back sides 10*f*, 10*b* of the ring electrode 10 and that the supplemental electrodes 300 may be in the arrangement discussed above with respect to FIG. 10A.

Figure 10D:
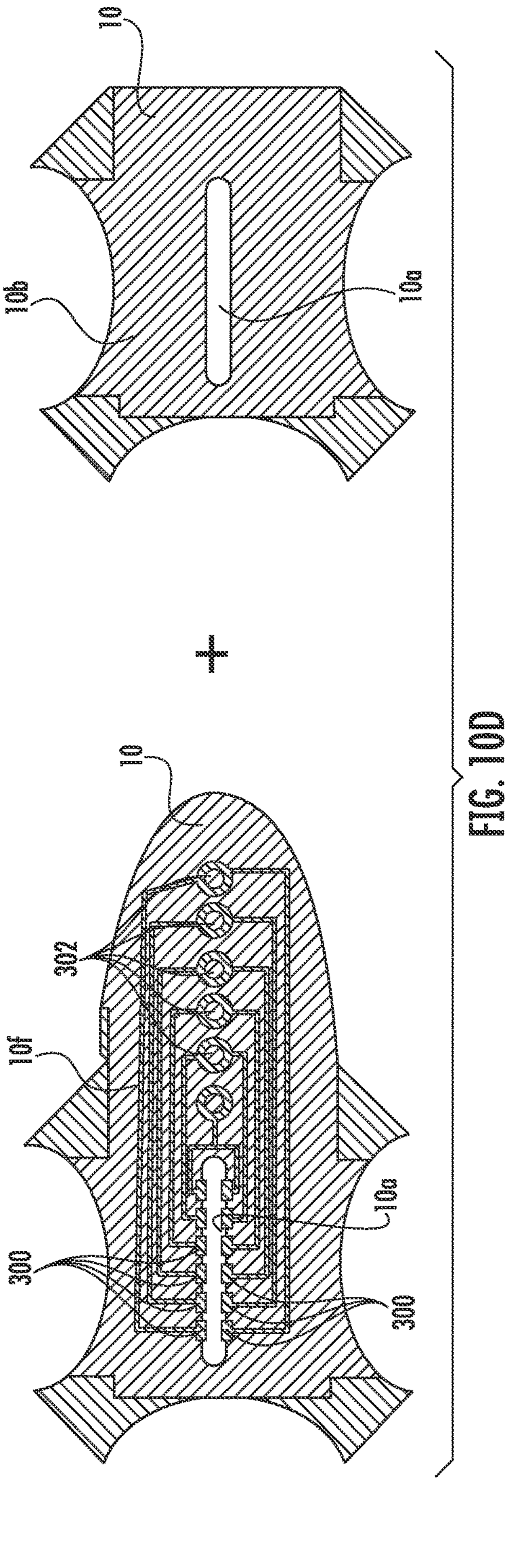

FIG. 10D illustrates that the supplemental electrodes 300 can reside adjacent only one of the opposing front and back sides 10*f*, 10*b* of the ring electrode 10 (and can have the arrangement discussed above with respect to FIG. 10A).

Figure 11:
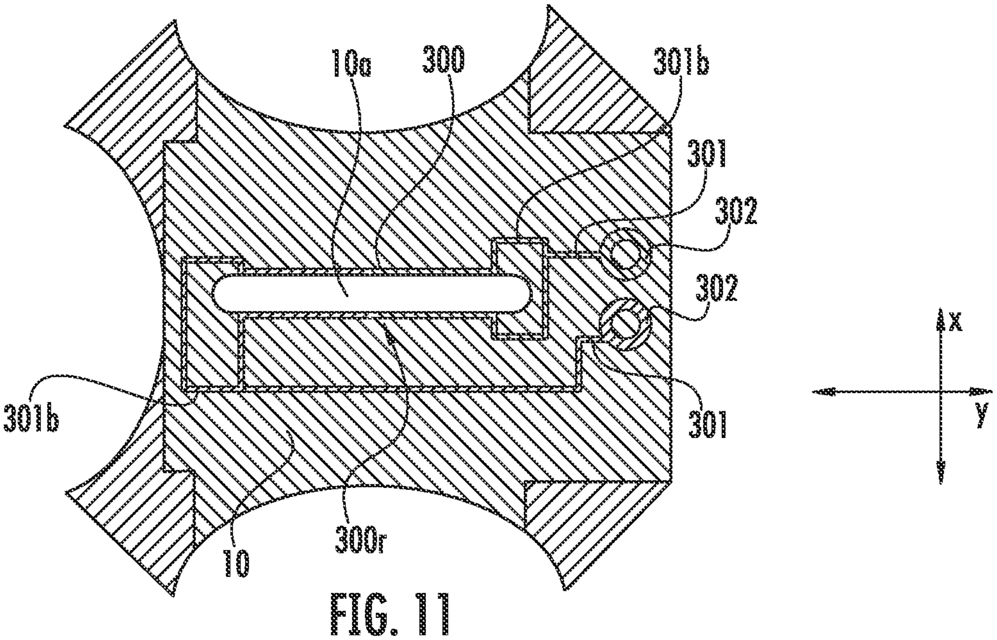
FIG. 11 is a schematic diagram of another embodiment of a central electrode with a cooperating supplementary electrode according to certain embodiments of the present invention.

As shown in FIG. 11, in some embodiments, the one or more supplemental electrodes 300 can include a carbon film, or the like, that can act as a resistor that generates a potential gradient along the y-dimension. The electrically-resistive carbon film can be electrically grounded and can be used as the one or more supplemental electrodes 300. First and second voltage inputs 302 can be used with first and second electrical paths 301 that connect to different locations of the one or more supplemental electrodes 300 to generate an electrical potential gradient across a length of the aperture 10*a* (in the y-dimension) via a resistive electrode 300*r*. The first and second voltage inputs can have the same or opposite polarity. As shown, each electrical path 301 can include branch 301*b* to connect to the electrode 300 on opposing sides of the aperture 10*a*, across the x-dimension.

Referring again to FIG. 7 and FIG. 8, a printed circuit board (PCB) 310 can be positioned adjacent to ring electrode 10 between endcap electrode 30 of the SLIT ion trap 100 and ring electrode 10. A slot 310*s* can be slightly (i.e., about 5 millimeters) larger in the x-dimension and/or the y-dimension than the ion trap aperture 10*a* in a paired ring electrode 10.

The face of the supplemental electrode(s) 300 is in the y-z plane. The supplemental electrode 300 can have a much less axial or z extent and y-extent than the ring electrode 10 and the endcap electrodes 20, 30. Typically, the z extent of the face of supplemental electrode(s) 300 is about the same or less than the thickness of the mesh 50, where used, or between 1 and 100 μm.

Non-limiting examples of voltages that can be applied by the supplemental electrode(s) 300 are between about +/−1 to +/−100 V.

A nonlinear variation in electric field along the y direction can be generated using electrode structures 300 such as shown in FIG. 10A and the like. That is, the electric field at any one point can be linear but across the transverse length does not have to be linear. One or more supplemental electrodes 300 spaced apart in a transverse length or y dimension of the ring electrode 10, over its respective transverse length, can be at a different potential and allow a staggered or potential gradient across the transverse length of the ion trap.

Referring to FIG. 7, in an exemplary embodiment, electrically conductive leads 300*c*, such as, for example, thin copper leads, can extend from the electrical supply node 302 and can be exposed at a long side edge of the slot 310*s* to act as the supplementary electrode(s) 300. The electrical supply node 302 can be circular and be a solder point to establish electrical connection to the supplementary electrodes, which are exposed to the trapping volume of the trapping region 10*r* of the SLIT 100. During fabrication, as part of the PCB construction, the conductive leads 300*c* for the exposed electrodes 300 can be covered with a solder mask that acts as an insulator. Although described as using copper for the supplemental electrodes 300, silver, gold or aluminum or alloys thereof or other materials with suitable conductivity can be used as will be appreciated by one of skill in the art. Also, as discussed above, carbon film electrodes or other electrically resistive materials may alternatively be used and electrically grounded to provide the electric field in the y-dimension.

Figure 12:
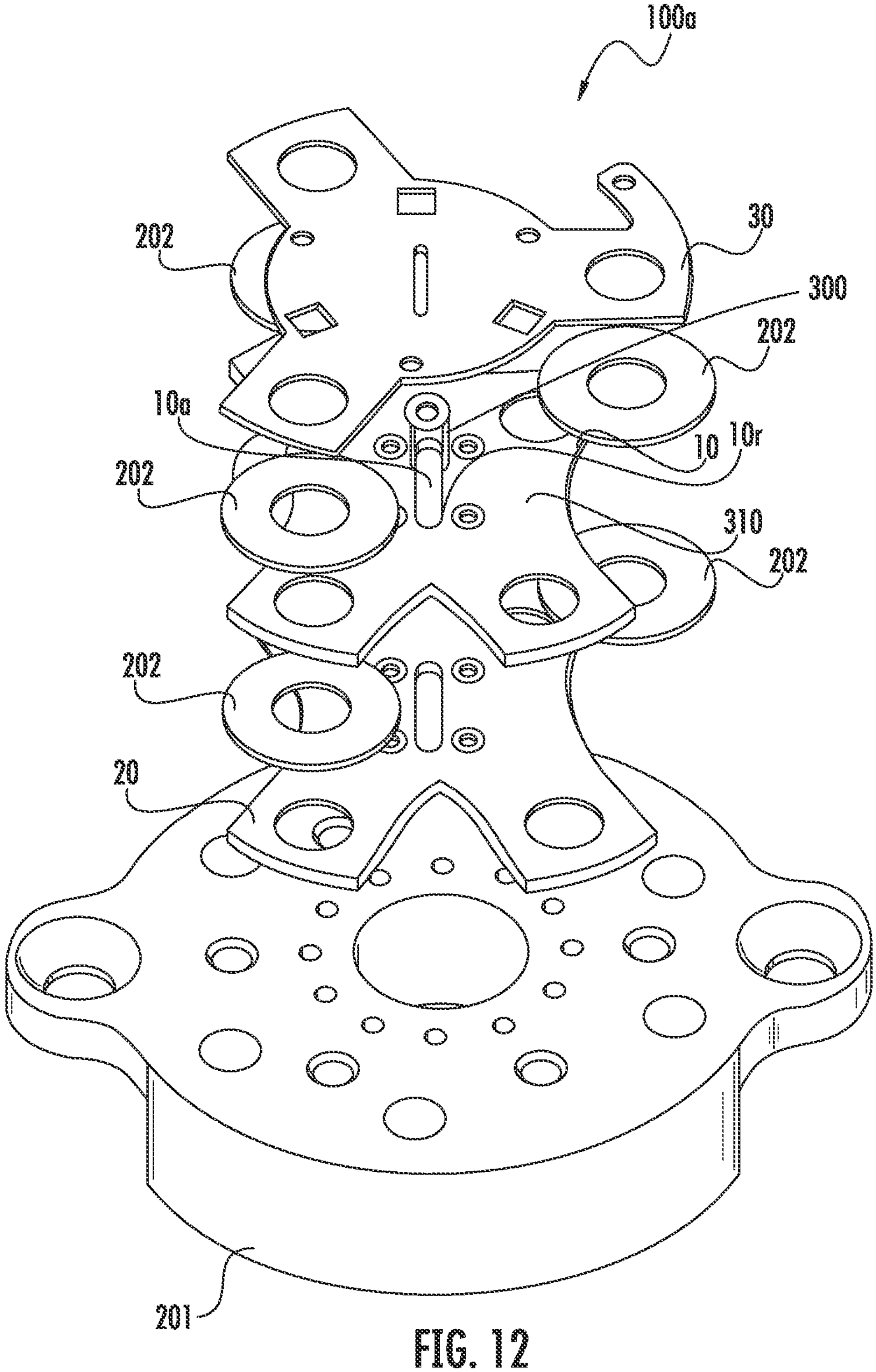
FIG. 12 is an exploded view of an example of a SLIT with supplementary electrodes according to certain embodiments of the present invention.

Referring to FIG. 12, the electrode assembly 100*a* can include first and second PCBs 310 that can be placed between the ring electrode 10 and each endcap electrode 20, 30, and can act as spacers, with the solder mask facing the endcaps. Applying a potential to the supplementary electrodes 300 will alter the electric fields that the trapped ions experience inside the ion trap of the ring electrode 10 and can be used to control ion location in the y-dimension. The electrode assembly 100*a* can be disposed on a support member 201.

Non-conductive spacers 202 can be provided to space apart the electrodes 30, 10, and 20. Any suitable non-conductive material may be used in the spacers 202, e.g. a polymer film such as a polyimide, polyamide, a Kapton® polyimide film, or polytetrafluoroethylene (PTFE) film, a synthetic fluoropolymer of tetrafluoroethylene, such as, for example, Teflon®, or insulating materials such as ceramics or mica. In other embodiments, the non-conductive material may be grown or deposited on one or more of the electrodes, e.g., using techniques known in the field of semiconductor processing, e.g., the growth of silicon oxide or silicon nitride films. Although six spacers 202 are shown, in various embodiments, any suitable number may be used. The sandwich structure made up of the electrodes 10, 20, 30 and 300 and the spacers 202 may be fastened to the support member 201 using any suitable attachment facility, e.g., one or more screws extending through the sandwich structure into the support member 201. In some embodiments, the screws may be disposed symmetrically about the longitudinal axis of the sandwich structure, and tightened with equal torque to maintain parallel alignment of the electrodes 10, 20, 30 and 300.

In some embodiments, the support member 201 may include one or more alignment features to aid in mounting the apparatus 100. For example, in some embodiments the support member 201 may include one or more holes for mounting guide posts. The electrodes 10, 20, 30 and PCB 310 with one or more supplemental electrodes 300 may then include guide holes that allow the electrodes to be slipped over the guide posts to maintain a desired alignment during assembly. In some embodiments, these guide posts may be removed after the electrodes are fastened to the support member 201.

By electrically connecting the upper and/or lower supplementary electrodes 300 together with the ring electrode 10, symmetry in the x-z plane can be preserved while an electrical gradient is created in the y-axis/dimension.

Experimental conditions where portions of the trap using the two PCBs 310 positioned as described above were blocked from the detector, as in the tapered SLIT experiments, were performed. For these experiments, a benchtop miniature mass spectrometer (obtained from 908 Devices, Inc., Boston, Mass.) with a Faraday cup detector was used for detection. Operational pressure was ~1 Torr of ambient air buffer gas, and the drive RF frequency was ~6 MHz. The DC potential applied to the supplementary electrodes 300 was generated by a standalone power supply and was held constant throughout the scan function.

Figure 13:
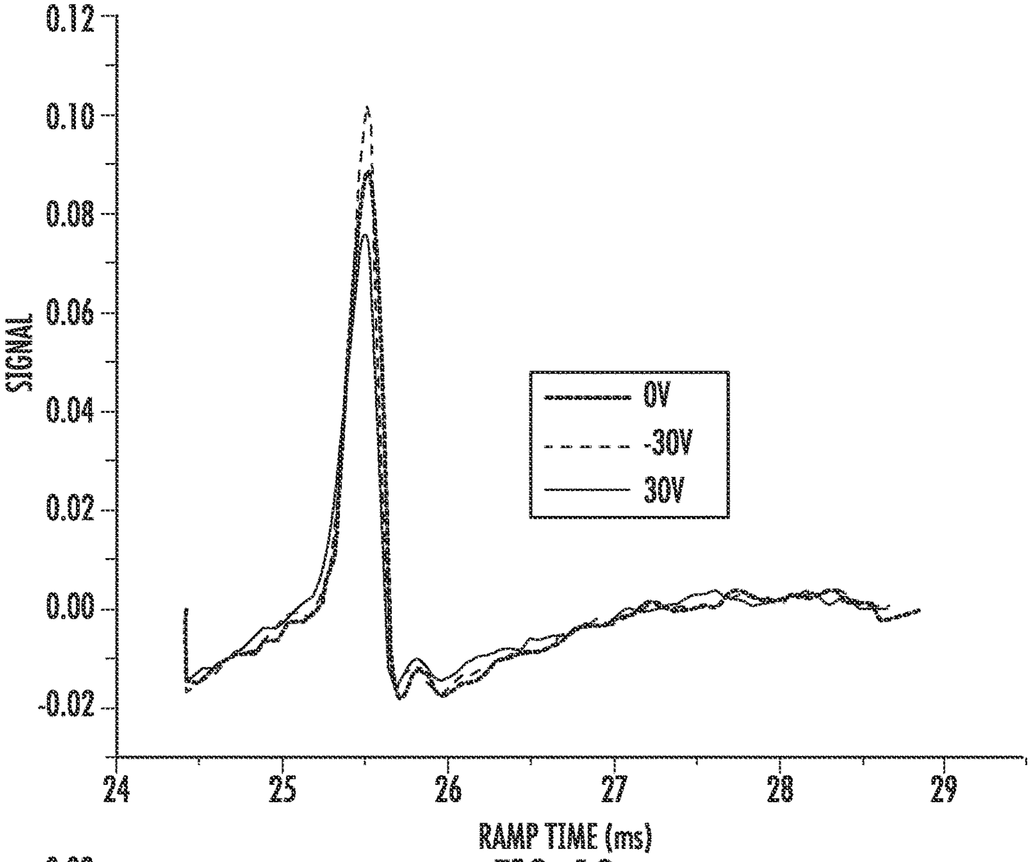
FIG. 13 is a graph of measured mass spectral signal intensity for N, N-dimethylaniline versus ramp time (ms) in a SLIT with supplementary electrodes for three voltage conditions applied to the supplementary electrodes according to certain embodiments of the present invention.

FIG. 13 shows the results of a control experiment where the signal intensity is derived from the entire length of the SLIT trap. Each trace shows the mass spectrum of N,N-dimethylaniline with 0 V DC (circle symbol line), −30 V DC (broken line), or 30 V DC (solid line) applied to the supplementary electrodes. There was a very slight variation in intensity based on voltage applied, with the signal intensity increasing as the voltage decreased.

Figure 14:
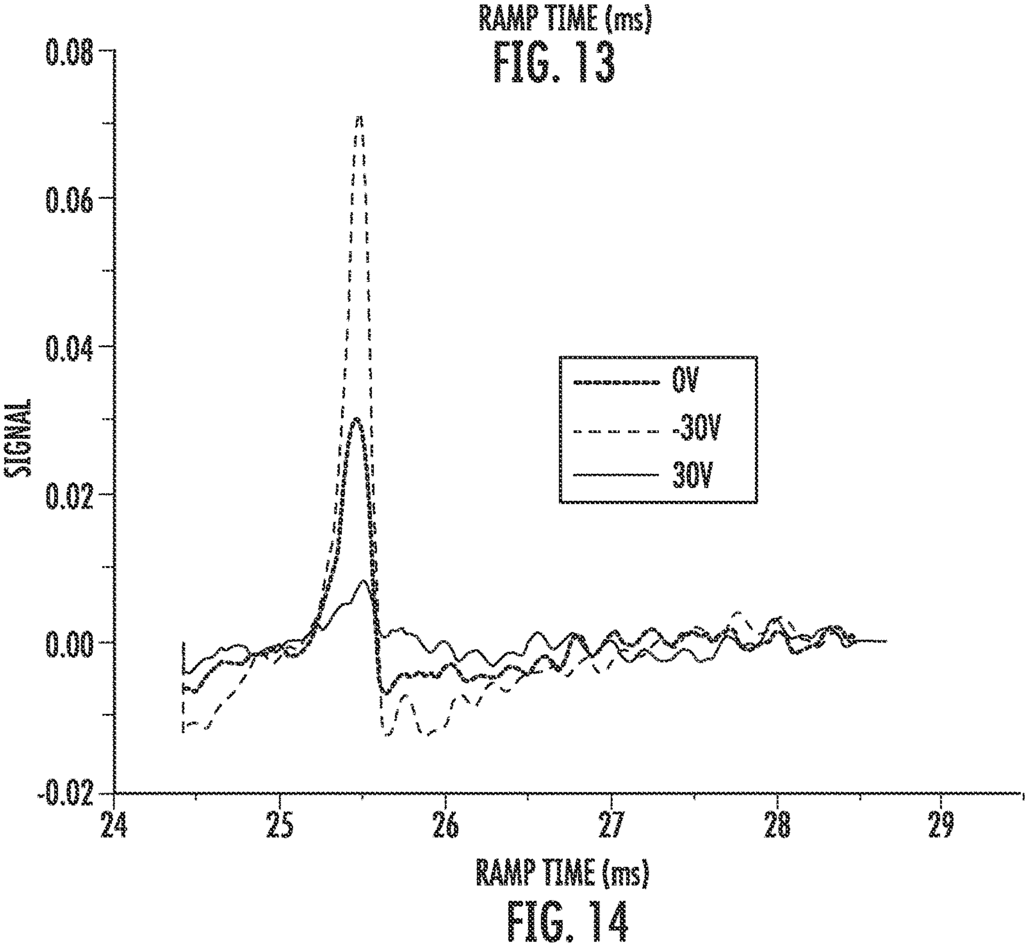
FIG. 14 is a graph of measured mass spectral signal intensity for N, N-dimethylaniline versus ramp time (ms) from a side of the SLIT of FIG. 13 with supplementary electrodes for three voltage conditions (DC potential) applied to the supplementary electrodes according to certain embodiments of the present invention.

A blocking electrode was placed between the detector and the half of the SLIT without any supplementary electrodes, and the same scan conditions were repeated. The only ions reaching the detector were presumed to be ejected from the side of the SLIT with the supplementary electrodes. The resulting MS data for the same three applied voltages is shown in FIG. 14. The signal intensity variation between the lines varied significantly. With −30 V applied on the supplemental electrodes, the signal was approximately double the intensity with 0 V applied. This result was consistent with ions being evenly dispersed along the y-axis with 0 V applied and only half reaching the detector due to the blocking electrode. With −30 V applied, the vast majority of ions were trapped near the supplementary electrodes so a large signal should have been detected. With 30 V applied, the ions should have accumulated on the half of the trap blocked from the detector, resulting in very little signal, as observed.

Figure 15:
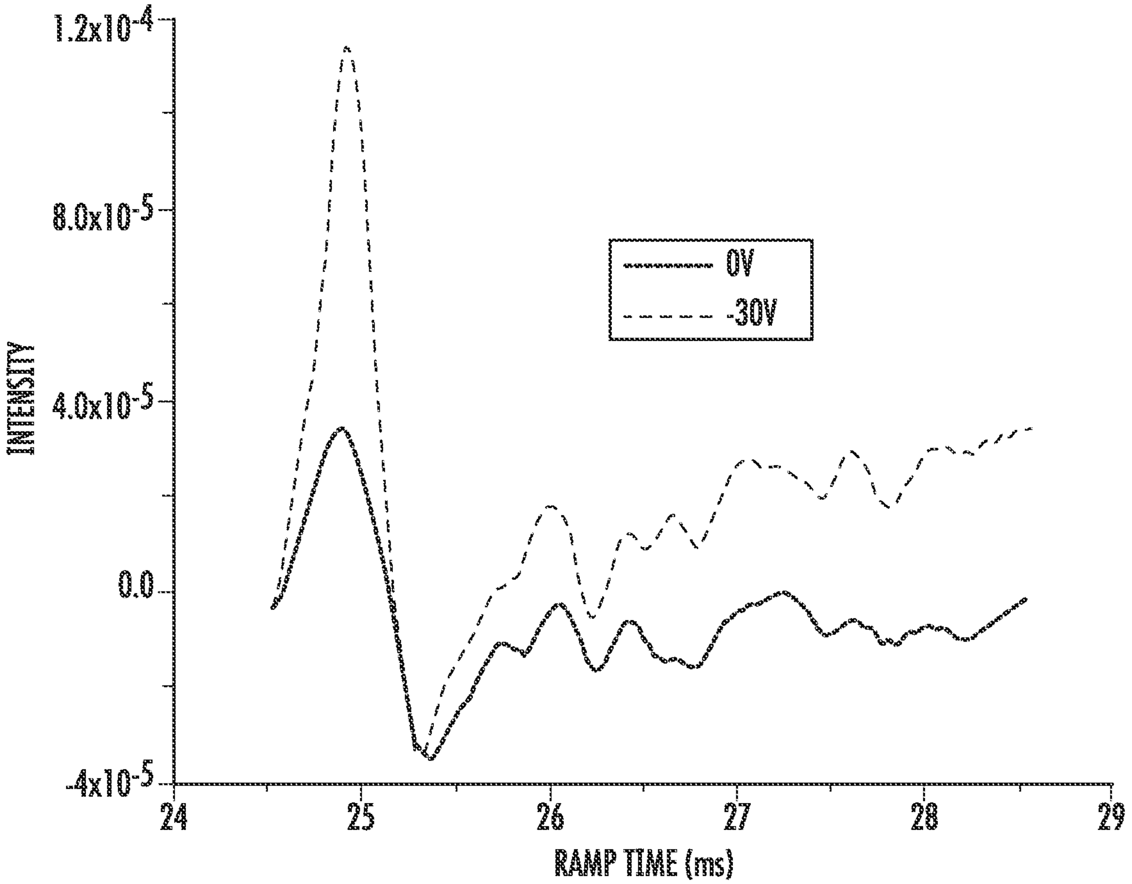
FIG. 15 is a graph of measured mass spectral signal intensity for N, N-dimethylaniline versus ramp time (ms) from the side of the SLIT with supplementary electrodes for voltage conditions (DC potential) applied to the supplementary electrodes with no line of sight between the ionization source and detector according to certain embodiments of the present invention.

Another experiment was performed to test injection and ejection of ions from different regions of the ion trap. A blocking electrode was placed between the detector and the portion of the SLIT with no supplemental electrodes. A second blocking electrode was placed between the ionization source and the portion of the SLIT with supplemental electrodes. Thus, there was no direct line of sight between the ionization source and the detector, meaning any generated ions must be transported to the side of the trap using supplementary electrodes to be successfully detected. FIG. 15 shows the signal intensities with 0 and −30 V applied to the supplementary electrodes. Even with no voltage applied to the supplemental electrodes (0 V, dotted line format), a small peak was observed, so ions appear to have been dispersed along the full width of the SLIT, despite being collected in a region with no direct path to the detector. With −30 V applied to the supplemental electrodes (dashed line), there was a significant gain in sensitivity due to the ions pooling at and ejecting from the region of the SLIT away from the detector-blocking electrode.

Accordingly, the use of supplemental electrodes successfully manipulated ions spatially in the y-dimension along a SLIT. While the observed mass spectra were not resolved along a mass-to-charge ratio axis, the full width at half maximum (FWHM) was measured to be near 0.4 ms in each experiment, indicating only a marginal impact on resolution and experimental complexity, while significant enhancements were observed in terms of ability to control the ejection profile. The supplemental electrodes 300 between the ring electrode 10 and endcap electrodes 20, 30 can largely preserve resolution and improve sensitivity.

It is contemplated that one or multiple planes of supplemental electrodes along the y-axis can be used to manipulate ions along this dimension during the course of a single scan function. The use of multiple planes of supplemental electrodes 300, parallel with the end surface of the injection and/or ejection side 10*f*, 10*b* (x-dimension) of the ring electrode 10 may allow for mixing of different species for controlled ion-ion reactions.

The mass analyzer 100 with the SLIT configuration can be configured with a single ion trap 10*a* or with multiple ion traps 10*a*.

FIGS. 16A-16H illustrate examples of ring electrodes 10 with different configurations of exemplary elongate apertures 10*a* for the ring electrode 10 ion trap(s), each defining a transverse cavity for trapping charged particles and some or all of which may have supplemental electrodes 300 according to some embodiments.

Figure 16A:
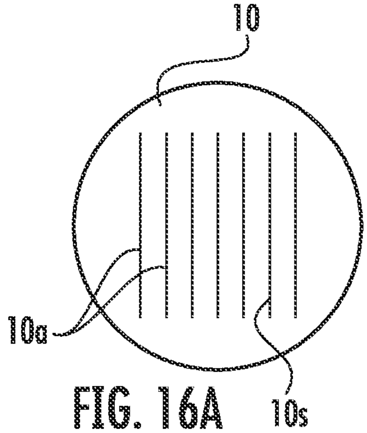
FIGS. 16A-16H are schematic diagrams of examples of ion trap configurations for a ring electrode of a SLIT according to certain embodiments of the present invention.
Figure 16B:
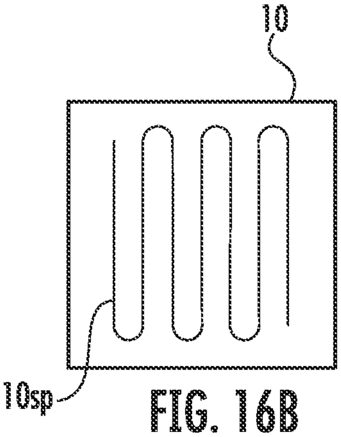
Figure 16C:
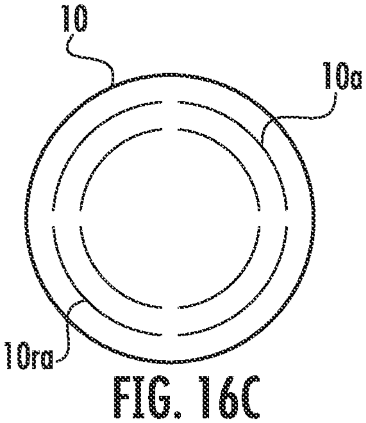
Figure 16D:
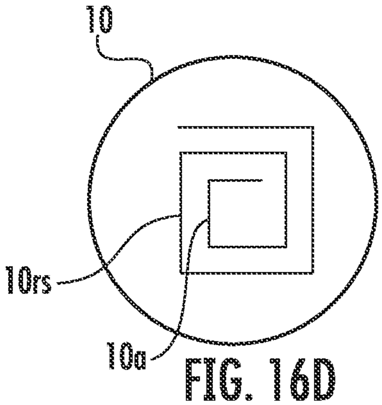
Figure 16E:
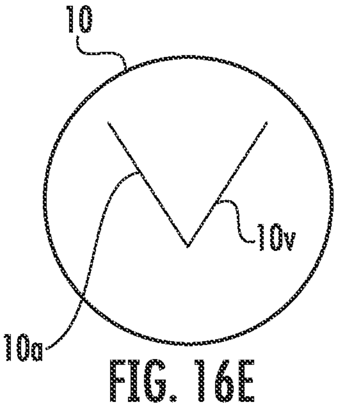
Figure 16F:
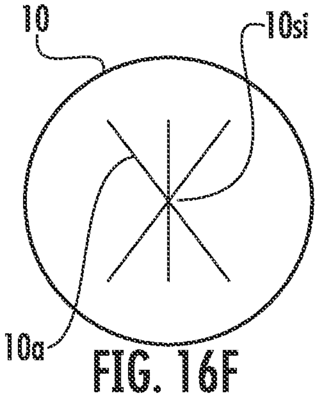
Figure 16G:
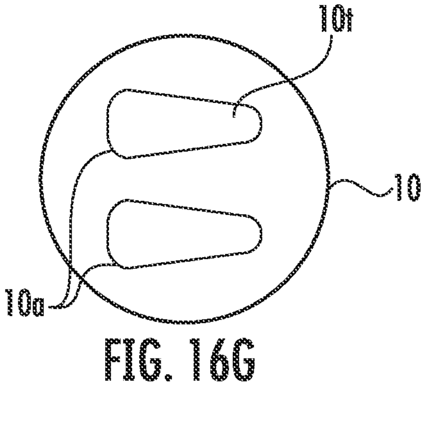
Figure 16H:
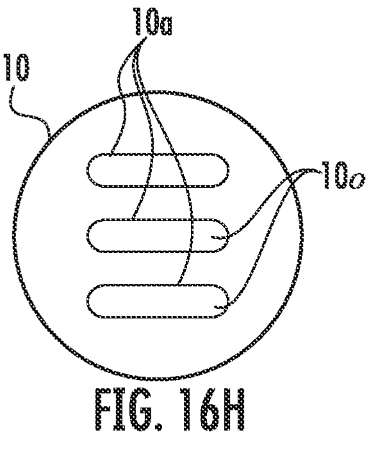

Note that in various embodiments, the slit shaped portions of the apertures 10*a* may have any suitable shape. For example, the longitudinal length, transverse length, and transverse width of the slits 10*s* may be substantially uniform. In some embodiments, one or more of the longitudinal length, transverse length, and transverse width vertical height, lateral length and lateral width of the slits 10*a* may vary spatially along a dimensional direction. FIG. 16A illustrates a plurality of parallel and linearly straight slits 10*s* that can be used as ion trapping cavities. FIG. 16B illustrates a serpentine shaped aperture 10*sp*. FIG. 16C illustrates arcuate shaped sets of concentric slits 10*ra* for the at least one aperture 10*a*. FIG. 16D illustrates a slit 10*rs* in the shape of a rectangular coil or spiral. FIG. 16E illustrates a "V"

shaped slit 10*v*. FIG. 16F illustrates intersecting straight slits 10*si* that intersect at a midpoint. FIG. 16G illustrates tapered slits 10*t*. FIG. 16H illustrates oblong or oval shaped slits 10*o*. Other ion trap aperture shapes and aperture array configurations may also be used.

Figure 17:
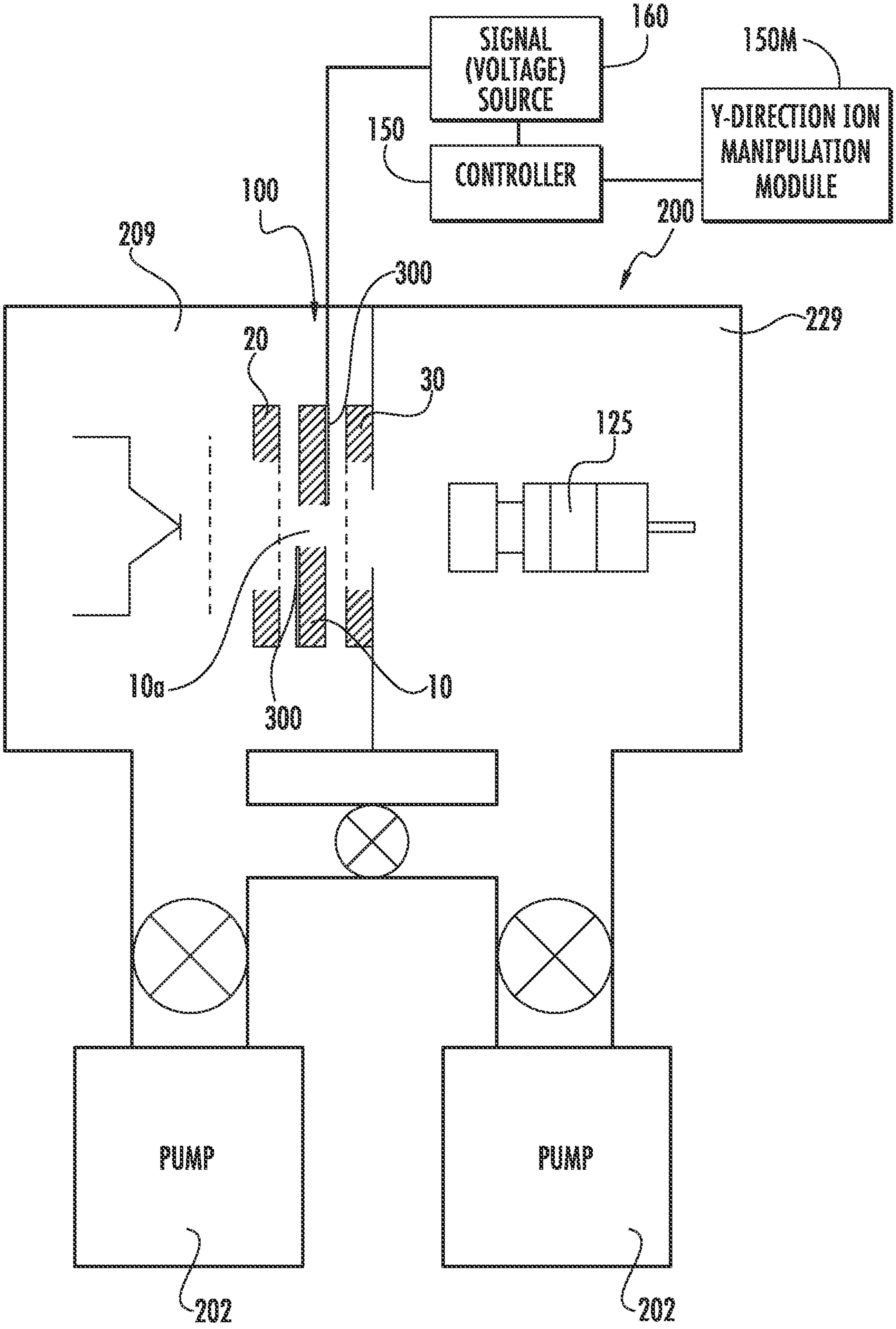
FIG. 17 is a schematic diagram of a high pressure mass spectrometer with at least one supplemental electrode according to certain embodiments of the present invention.

FIG. 17 illustrates a portable MS system 200 with one or more pumps 202 and a high pressure vacuum chamber 209 holding the mass analyzer 100 with one or more supplemental electrodes 300 and an adjacent chamber 229 holding the detector 125. The chamber 209 may be maintained at a selected background pressure. In some embodiments, the background pressure is greater than 5 mtorr, 10 mtorr, 100 mtorr, 1 torr, 10 torr, 100 torr, 500 torr, or 760 torr. For example, in some embodiments the background pressure is in the range of 100 mtorr to 1000 mtorr or any subrange thereof.

The pump(s) 202 can be any suitable pump, typically a small, lightweight pump or pumps. Examples of pumps include, for example only, a TPS Bench (SH110 and Turbo-V 81 M pumps) compact pumping system and/or a TPS compact (IDP-3 and TurboV 81M pumps) pumping system from Agilent Technologies, Santa Clara, Calif. Operational pressures at or above 50 mTorr can be easily achieved by mechanical displacement pumps such as rotary vane pumps, reciprocating piston pumps, or scroll pumps.

The detector 125 can include a Faraday cup detector 125F (FIG. 19B) in communication with an amplifier 7250 such as a differential amplifier (908 Devices, Boston, Mass.). The ion signal can be collected on Faraday cup detector 125F and amplified by the amplifier. One example of an amplifier is a A250CF CoolFET® Charge Sensitive Preamplifier (from Amptek, Inc., Bedford, Mass.). Other detector configurations and other amplifiers may also be used.

Ions can be accumulated for a defined time for a respective scan, such as between about 1-30 milliseconds, typically between about 1-10 milliseconds, before analysis, in some embodiments. Successive scans can be averaged for each analysis, typically between 20-1000 individual scans.

FIG. 18A and FIG. 18B are schematic diagrams of a mass spectrometry apparatus 200. The mass spectrometry apparatus 200 includes a mass analyzer 100 with a miniature electrode assembly 100*a* for trapping charged particles that includes at least one supplemental electrode 300, typically coupled to either the signal source 160 (FIG. 18A) or a different DC power supply 330 (FIG. 18B).

As shown by the arrows in FIG. 18B, ions I can enter an injection side 10*f* of the ring electrode 10 at a first position or region P1 along the y-dimension and be ejected from a second, different position or region P2 along the y-dimension. Ejection can be initiated by applying an electrical field from the supplemental electrode(s) 300 to eject from the ejection side 10*b* (facing the detector 125) of the ring electrode 10.

The electrode assembly 100*a* produces an electromagnetic field in response to applied voltage signals. The electromagnetic field can extend into an ion trapping region 10*r* located within transverse cavity 10*a*. For example, in some embodiments, the signal source operates as a power supply coupled to the electrodes 10, 20, 30 to provide an oscillating field between the ring (central) electrode 10 and the end cap electrodes 20, 30. In some embodiments the field oscillates at RF frequencies, e.g., in the range of a 1 MHz to 10 GHz or any subrange thereof. Note that for operation at high pressure, high frequencies are desirable, such that the period of one oscillation of the trapping field is much shorter that an average time for a trapped particle to collide with a particle in the background gas.

A controller 150 can be coupled to the electrical signal source 160 and the DC power supply 330 and configured to modulate the signal source to provide mass selective ejection of ions from the trapping region along with a time dependent electrical field for the spatial localization and/or directional ion transport in the y-dimension.

Figure 23A:
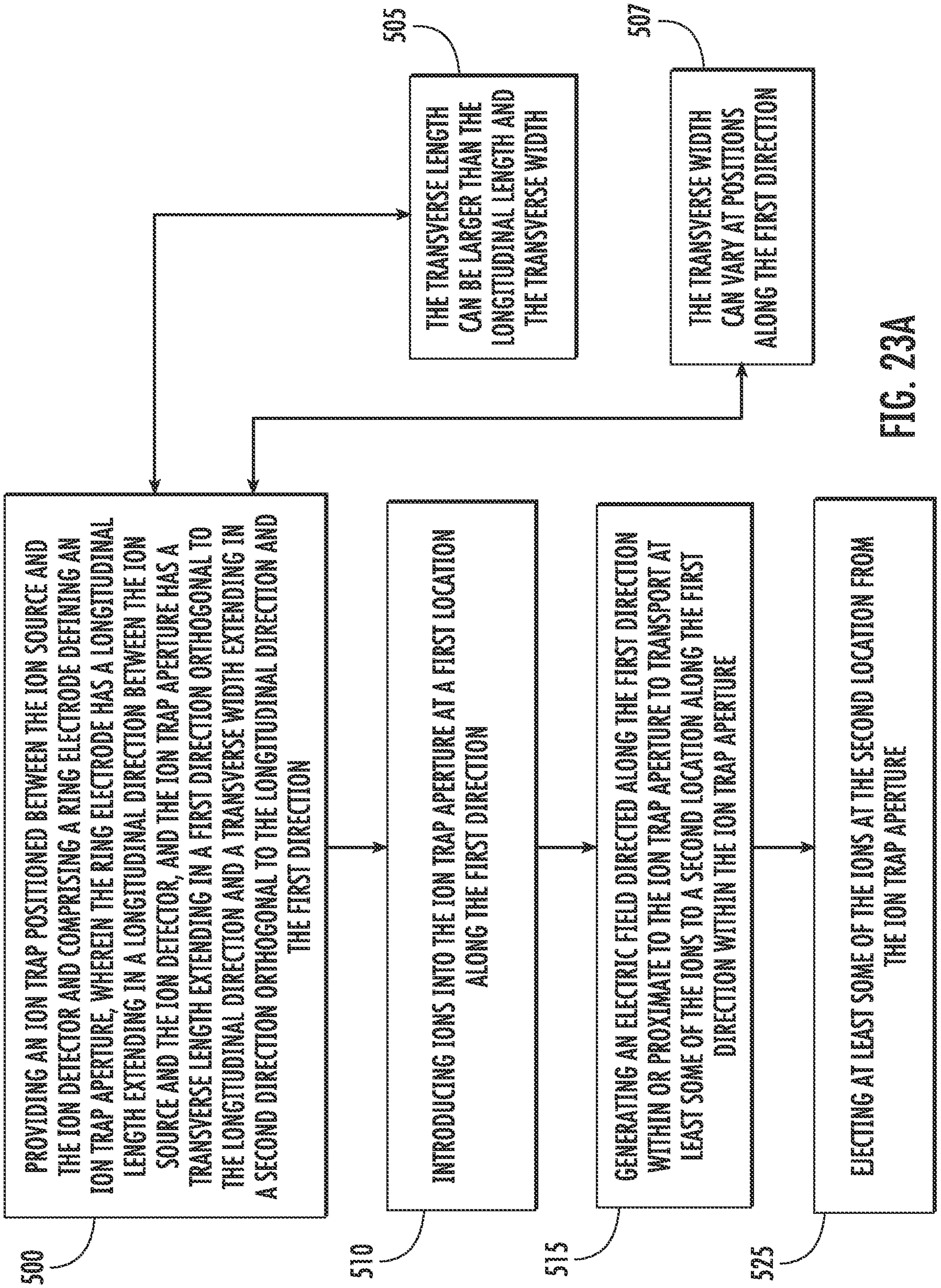
FIG. 23A is a schematic diagram showing examples of actions or steps that can be carried out by a mass spectrometer according to certain embodiments of the present invention.

As shown in FIGS. 17, 18A and 18B, for example, the controller 150 can include or be coupled to a Y-Direction Ion Manipulation Module 150M that can include at least one processor that can electronically control the timing and/or output of components, e.g., apply voltages to the SLIT with the supplemental electrode(s) 300 for generating y-dimension translocation and detect ions, etc. and/or for certain actions in the diagram shown in FIG. 23A and/or 23B and/or for directing time varying operational states of one or more supplemental electrodes 300, optionally using a defined timing diagram, such as shown in one of FIGS. 20A, 20B, 21A, 21B, for example.

The DC power supply 330 can be a separate power supply from that coupled to the detector 125 or other internal components such as electrodes 10, 20, 30 (FIG. 18A) or may be the same DC power supply connected via electrical paths optionally comprising switches 340 and the like to the supplemental electrode(s) 300.

In various embodiments, any suitable technique for achieving mass selective ejection may be used. For example, in some embodiments, a RF potential applied to the trap 10*r* is ramped so that the orbit of ions with a mass a>b are stable while ions with mass b become unstable and are ejected on the longitudinal axis (e.g., through one of the end cap electrodes) onto the detector 125. In certain embodiments, other techniques may be used, including applying a secondary axial RF signal across the endcap electrodes so as to create a dipolar electric field within the traps. This dipolar field can eject ions when their secular frequency becomes equal to the axial RF frequency.

The system 100 includes an ion source 175 configured to inject or form ions to be trapped in the trapping region. In various embodiments any suitable source may be used. For example, in some embodiments an electron source is used to direct electrons into the aperture 10*a* of the trap of the ring electrode 10 (e.g., through the end cap electrode 20). These electrons can ionize analyte species in the transverse cavity of the trap 10*a*, forming ions, which are in turn trapped within the trapping region 10*r* of the electrode structure. The ion source 175 may be operatively coupled to the controller, e.g., to turn the source on and off as desired during operation. In various embodiments, any suitable detector 125 may be used. For high pressure applications, it may be advantageous to use a detector capable of operation at high background pressure, e.g., a Faraday cup type detector 125F. For lower pressure applications, other types of detectors may be used, e.g., an electron multiplier detector. The detector 125 may be operatively couple to the controller 150, e.g., to transmit a signal to the controller 150 to generate a mass spectrum.

In some embodiments featuring an elongated trapping region, ions may be preferentially ejected from a localized portion (along the y-dimension) of the trapping region using an applied electric field and/or electrical potential gradient (e.g., one or both lateral end portions, or a central portion). Accordingly, in some embodiments, ions can be injected into a first spatial region within the aperture 10*a* having a length $l_1$ in the y-dimension, and ejected from a second spatial region spaced from the first region and having a length $l_2$ in the y-dimension that is smaller than $l_1$ In some embodiments, ions can be injected in a first portion of the trapping region and ions can be ejected from a second portion of the trapping region having a volume that is smaller than that of the first portion.

According to embodiments of the invention, spatially localized ejection may be advantageous. For example, in some embodiments, the resolution of the acquired mass spectrum may be improved and/or reset periods of a detector following ion saturation can be avoided or reduced using localized ejection.

In various embodiments, the MS system 200 may be implemented as a portable unit, e.g., a hand held unit. The system 200 may be used to obtain mass spectra from any suitable analyte, including, for example, inorganic compounds, organic compounds, biological compounds, explosives, environmental contaminates, and hazardous materials.

In some embodiments, the system 200 may be implemented as a monitoring unit to be positioned within a selected area to monitor for a selected condition (e.g., the presence or level of one or more selected target materials). In some embodiments, the system 200 may include a data transmission device (e.g., a wired or wireless communication device) that can be used to communicate the detection of the selected condition.

Figure 19A:
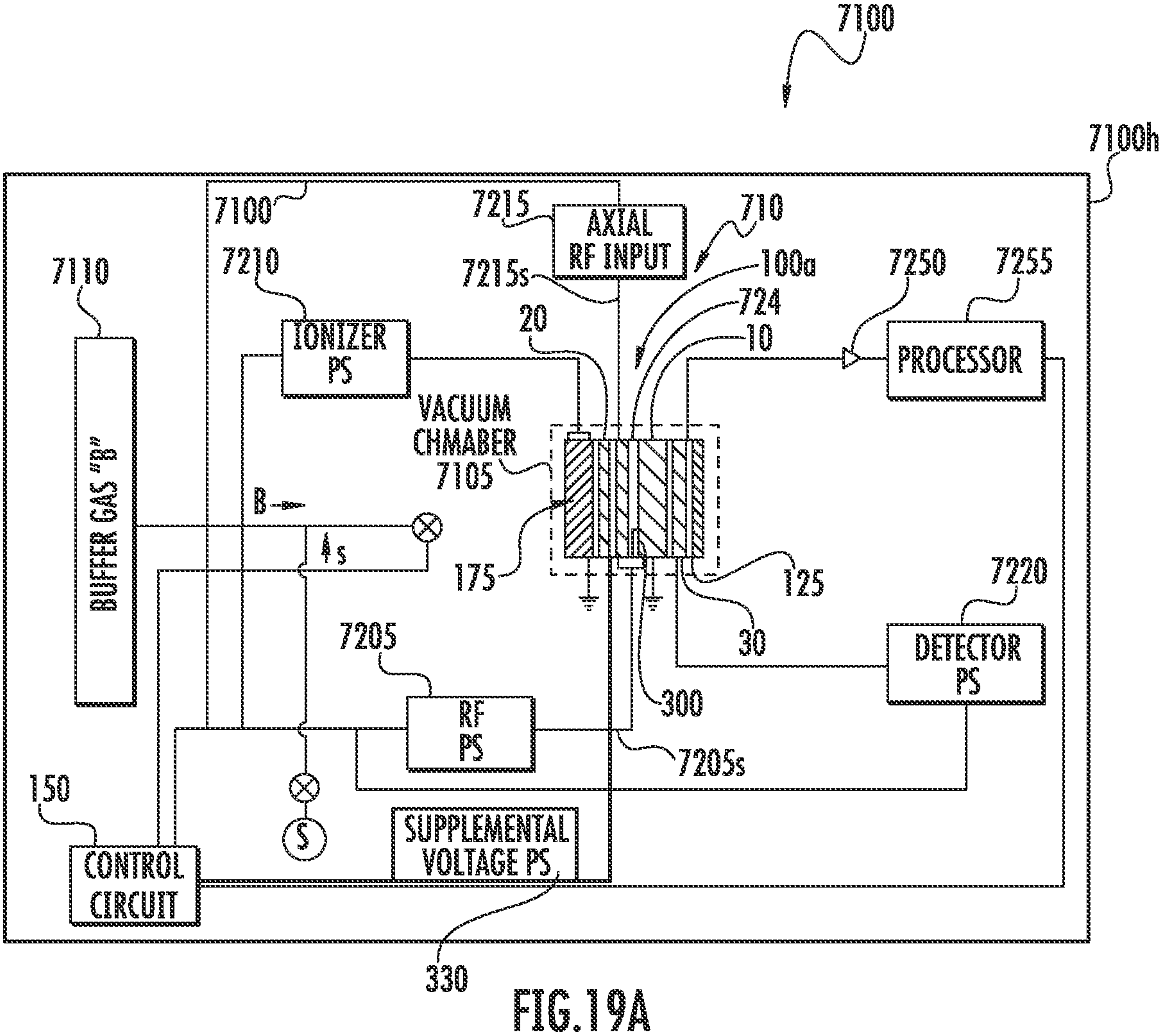
FIG. 19A is a schematic diagram of an example of a mass spectrometry apparatus according to certain embodiments of the present invention.

FIG. 19A illustrates a mass spectrometry system 7100 (e.g. a portable system), with a housing 7100*h* that encloses a mass spectrometry assembly 710, typically inside a vacuum chamber 7105 (shown by the broken line around the assembly 710). The housing 7100*h* can releasably attach a canister 7110 (or other source) of pressurized buffer gas "B" that connects to a flow path into the vacuum chamber 7105. The housing 7100*h* can hold a control circuit 150 and various power supplies 7205, 7210, 7215, 7220, 330 that connect to conductors to carry out the ionization, ion manipulation in a y-dimension, mass analysis and detection. The housing 7100*h* can hold one or more amplifiers including an output amplifier 7250 that connects to a processor 7255 for generating the mass spectra output. The system 7100 can be portable and lightweight, typically between about 1-20 pounds inclusive of the buffer gas supply 7110, where used. The housing 7100*h* can be configured as a handheld housing, such as a game controller, notebook, or smart phone and may optionally have a pistol grip that optionally holds the control circuit 150. However, other configurations of the housing may be used as well as other arrangements of the control circuit. The housing 7100*h* can hold a display screen and can have a User Interface such as a Graphical User Interface.

The system 7100 may also be configured to communicate with a smartphone or other pervasive computing device to transfer data or for control of operation, e.g., with a secure APP or other wireless programmable communication protocol.

The system 7100 can be configured to operate at pressures at or greater than about 100 mTorr up to atmospheric pressure.

In some embodiments, the mass spectrometer 7100 is configured so that the ion source (ionizer) 175, ion trap mass analyzer 100 (of any of the types described herein) and detector 125 operate at near isobaric conditions and at a pressure that is greater than 100 mTorr. The term "near isobaric conditions" include those in which the pressure between any two adjacent chambers differs by no more than a factor of 100, but typically no more than a factor of 10.

Figure 19B:
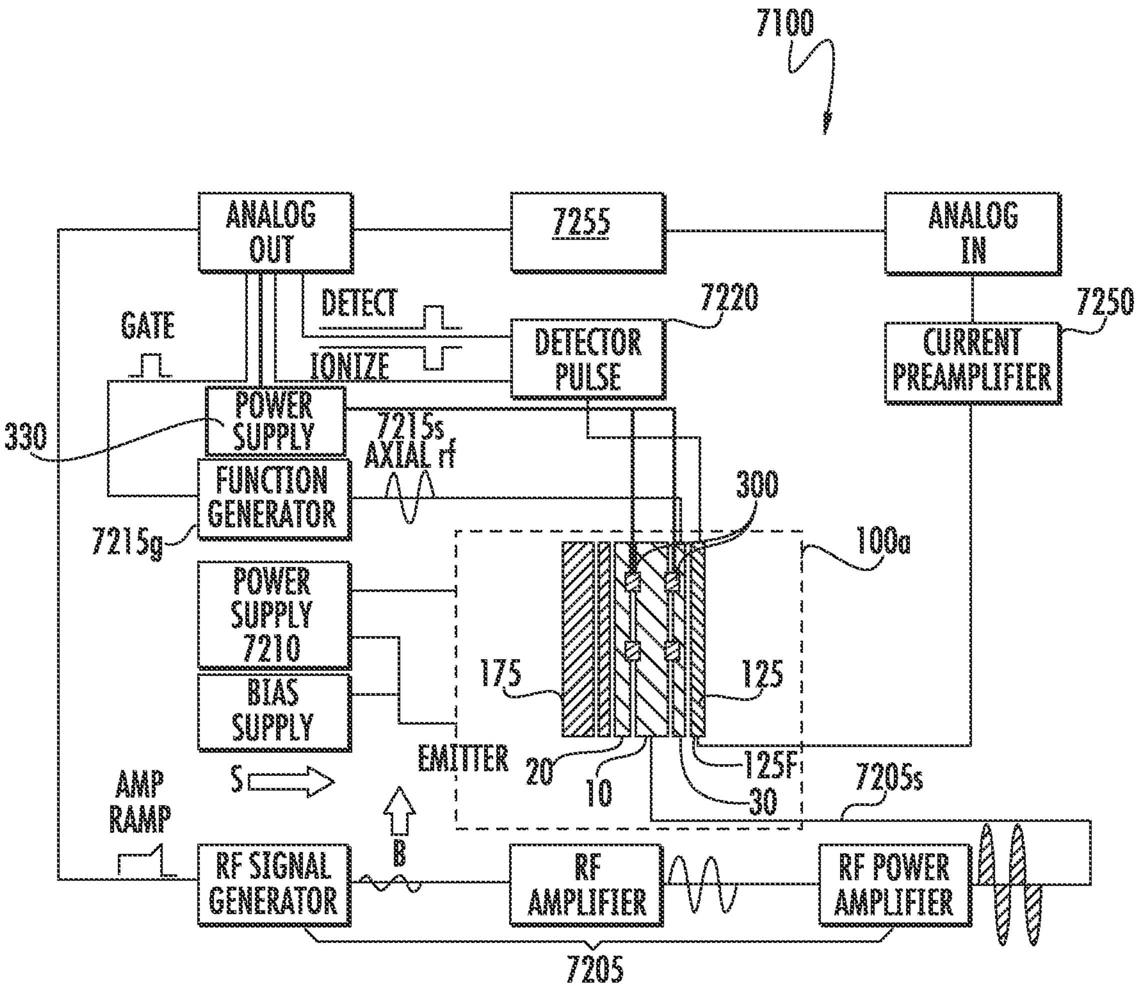
FIG. 19B is another schematic diagram of an example of a mass spectrometry apparatus according to certain embodiments of the present invention.

As shown in FIG. 19A and FIG. 19B, the spectrometer system 7100 can include an arbitrary function generator 7215*g* to provide a low voltage axial RF input 7215*s* to the ion trap 100 during mass scan for resonance ejection. The low voltage axial RF can be between about 100 mVpp to about 8000 mVpp, typically between 200 to 2000 mVpp. The axial RF 7215*s* can be applied to an endcap 30, or between the two endcaps 20 and 30 during a mass scan for facilitating resonance ejection.

As shown in FIGS. 19A and 19B, the device 7100 includes an RF power source 7205 that provides an input signal to the central electrode 10 of the ion trap electrode assembly 100*a*. The RF source 7205 can include an RF signal generator, RF amplifier and RF power amplifier. Each of these components can be held on a circuit board in the housing 7100*h* enclosing the ion trap 100 in the vacuum chamber 7105. In some embodiments, an amplitude ramp waveform can be provided as an input to the RF signal generator to modulate the RF amplitude. The low voltage RF can be amplified by a RF preamplifier then a power amplifier to produce a desired RF signal. The RF signal can be between about 1 MHz to 10 GHz depending on the size of the ring electrode features. As is well known to those trained in the art, the RF frequency may depend on the size of the aperture 10*a* in the central electrode 10. A typical RF frequency for a slit shaped aperture of the type shown in FIG. 4 with a dimension $x_o$=500 μm can be 5-20 MHz. The voltages can be between 100 $V_{0p}$ to about 1500 $V_{0p}$, typically up to about 500 $V_{0p}$.

Generally stated, electrons are generated in a well-known manner by ion source 175 and are directed towards the mass analyzer 100 (e.g., ion trap 10) by an accelerating potential. Electrons ionize sample gas S in the mass analyzer. For ion trap configurations, RF trapping and ejecting circuitry can be coupled to the mass analyzer 100 to create alternating electric fields within ion trap 10 to first trap and then eject ions in a manner proportional to the mass to charge ratio of the ions. The ion detector 125 registers the number of ions emitted at different time intervals that correspond to particular ion masses to perform mass spectrometric chemical analysis. The ion trap dynamically traps ions from a measurement sample using a dynamic electric field generated by an RF drive signal 7205*s*. The ions are selectively ejected corresponding to their mass-charge ratio (mass (m)/charge (z)) by changing the characteristics of the radio frequency (RF) electric field (e.g., amplitude, frequency, etc.) that is trapping them. These ion numbers can be digitized for analysis and can be displayed as spectra on an onboard and/or remote processor 7255.

In the simplest form, a signal of constant RF frequency 7205*s* can be applied to the center electrode 10 relative to the two end cap electrodes 20, 30. The amplitude of the center electrode signal 7205*s* can be ramped up linearly in order to selectively destabilize different m/z held within the ion trap. This amplitude ejection configuration may not result in optimal performance or resolution. However, this amplitude ejection method may optionally be improved upon by applying a second signal 7215*s* differentially across the end caps 20, 30. This axial RF signal 7215*s*, where used, causes a dipole axial excitation that can result in the resonant ejection of ions from the ion trap when the ions' secular frequency of oscillation within the trap matches the end cap excitation frequency.

As shown in FIGS. 19A and 19B, the spectrometer 7100 can include at least one DC power supply 330 that is coupled to one or more supplemental electrodes 300 and to the control circuit 150 or 7200 to allow for time dependent operation of the supplemental electrodes 300 during one or more scans, for example.

The ion trap 100 or mass filter can have an equivalent circuit that appears as a nearly pure capacitance. The amplitude of the voltage 7205*s* to drive the ion trap 100 may be high (e.g., 100 V-1500 Volts) and can employ a transformer coupling to generate the high voltage. The inductance of the transformer secondary and the capacitance of the ion trap can form a parallel tank circuit. Driving this circuit at resonant frequency may be desired to avoid unnecessary losses and/or an increase in circuit size.

The vacuum chamber 7105 can be in fluid communication with at least one pump 202 (FIG. 17) as discussed above. In some embodiments, the vacuum chamber can have a high pressure during operation, e.g., a pressure greater than 100 mTorr up to atmospheric. High pressure operation can allow elimination of high-vacuum pumps such as turbo molecular pumps, diffusion pumps or ion pumps. Operational pressures above approximately 100 mTorr can be achieved by mechanical displacement pumps such as rotary vane pumps, reciprocating piston pumps, or scroll pumps.

Sample S may be introduced into the vacuum chamber 7105 (FIG. 19A) or 209 (FIG. 17) with a buffer gas B through an input port toward the ion trap 10*r*. The S intake from the environment into the housing 7100*h* can be at any suitable location (shown by way of example only from the bottom). One or more Sample intake ports can be used.

The buffer gas B can be provided as a pressurized canister 7110 of buffer gas as the source. However, any suitable buffer gas or buffer gas mixture including air, helium, hydrogen, or other gas can be used. Where air is used, it can be pulled from atmosphere and no pressurized canister or other source is required. Typically, the buffer gas comprises helium, typically above about 90% helium in suitable purity (e.g., 99% or above). A mass flow controller (MFC) can be used to control the flow of pressurized buffer gas B from pressurized buffer gas source 7110 with the sample S into the chamber 7105. When using ambient air as the buffer gas, a controlled leak can be used to inject air buffer gas and environmental sample into the vacuum chamber. The controlled leak design can depend on the performance of the pump utilized and the operating pressure desired.

Figure 20A:
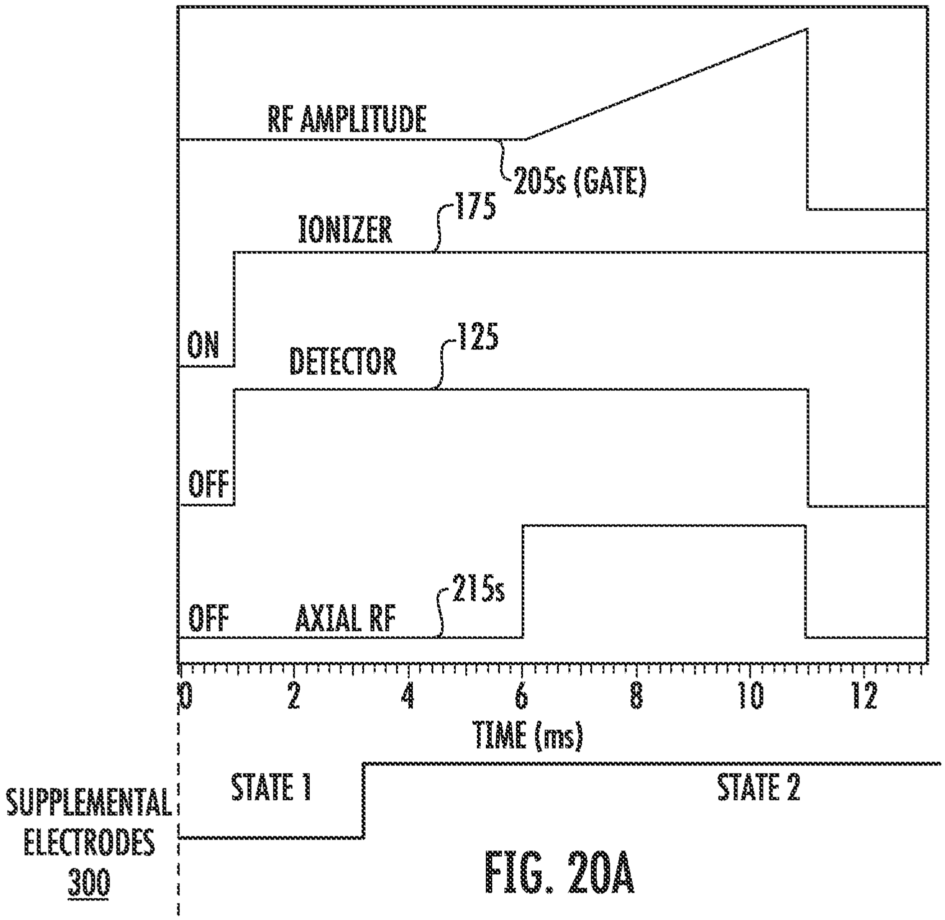
FIGS. 20A and 20B are examples of timing diagrams for components of a mass spectrometer according to certain embodiments of the present invention.
Figure 20B:
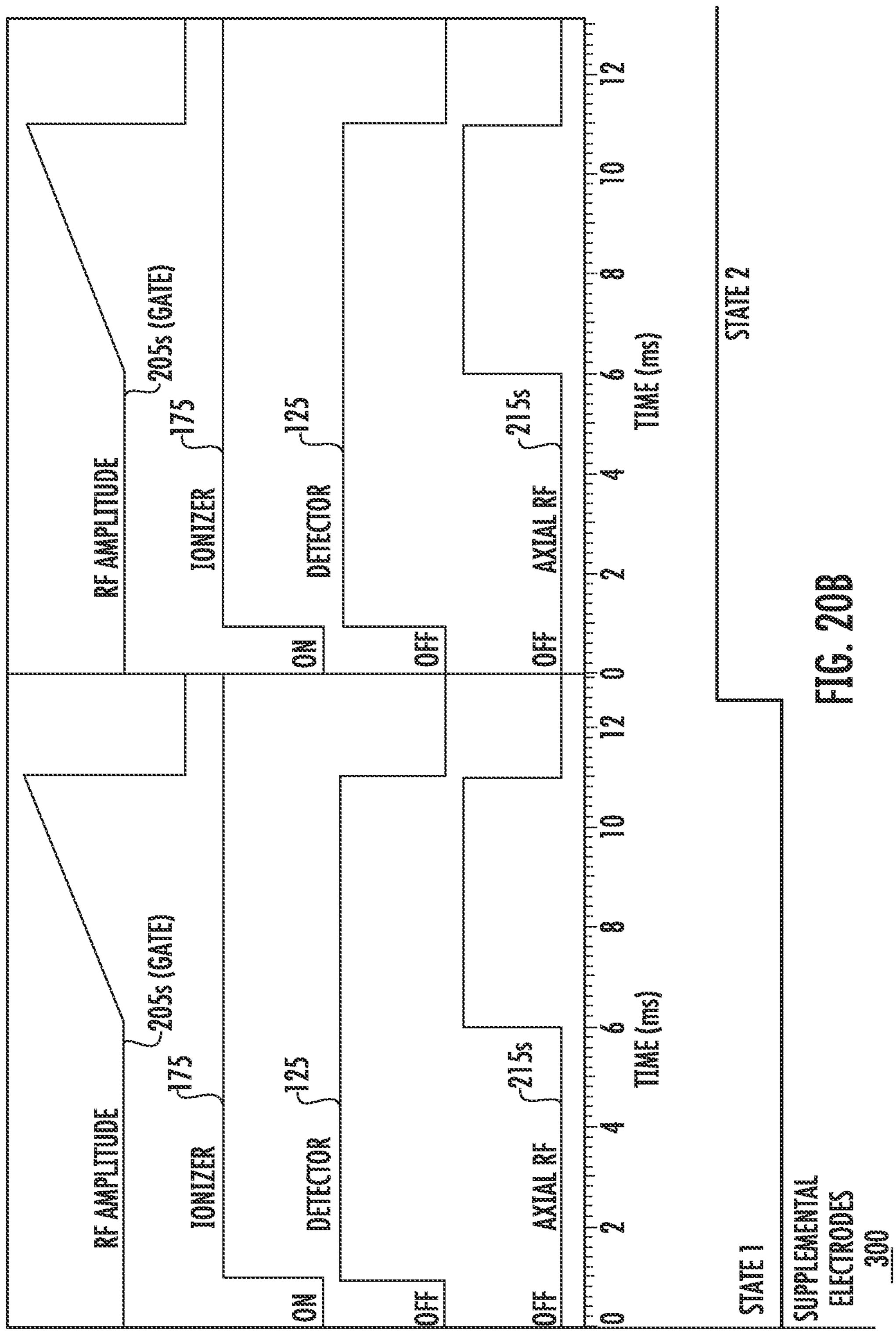

FIG. 20A and FIG. 20B are exemplary timing diagrams of a mass spectrometer according to embodiments of the present invention. As shown, the supplemental electrode(s) 300 can have first and second states (State 1, State 2) associated with ON and OFF or with lesser and greater y-direction electric fields, greater and lesser y-direction electric fields, or positive and negative y-direction electric fields, for example, during a single mass analysis scan (FIG. 20A) or over serially successive scans (FIG. 20B). Other time dependent operational sequences may also or alternatively be used.

Figure 21A:
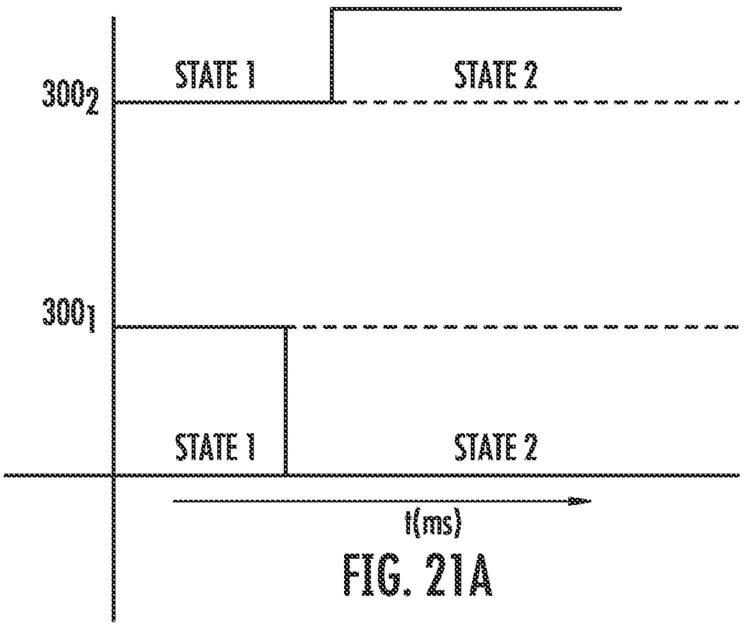
FIGS. 21A and 21B are examples of timing diagrams for different supplemental electrodes according to certain embodiments of the present invention.
Figure 21B:
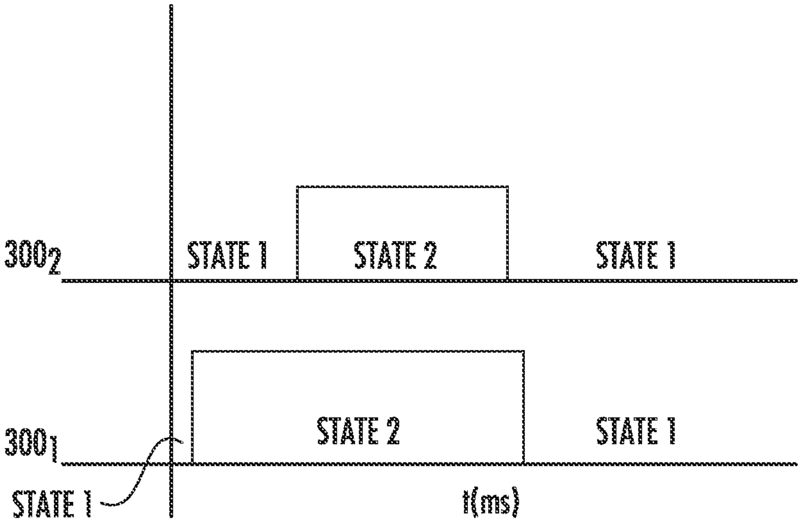

FIG. 21A and FIG. 21B illustrate that where more than one supplemental electrode 300 is used, they can operate independently to have different states (shown as states 1 and 2) over time during a single scan and/or between successive or different scans. Thus, one supplemental electrode 300 (or sets of supplemental electrodes) can have a time-dependent operational sequence or state(s) that is different from another supplemental electrode 300 (or sets of supplemental electrodes). For example, the supplemental electrode 300 (at the injection side 10*f*) can operate with a first timing sequence of a change in states and the one or more supplemental electrode 300 at the ejection side 10*b* of the ring or central electrode 10 can operate with a second timing sequence of a change in states. For one example, the injection side can be held at a first potential (i.e, a low potential that is less than the first potential) during ion accumulation, and at a second potential that is greater than the first potential (i.e., a high potential) for mass analysis, while the ejection side can be at a first potential (i.e., a high potential) for ion accumulation and a second potential (i.e., a low or lower potential) for mass analysis (ejection). Thus, they can each functionally act as gates to improve analyzed ion transmission. Again, the timing functions for electrodes 300 can be either within one MS scan (sub-msec timescale), or varied across MS scans (typically between 10's-1000's msec).

Figure 22A:
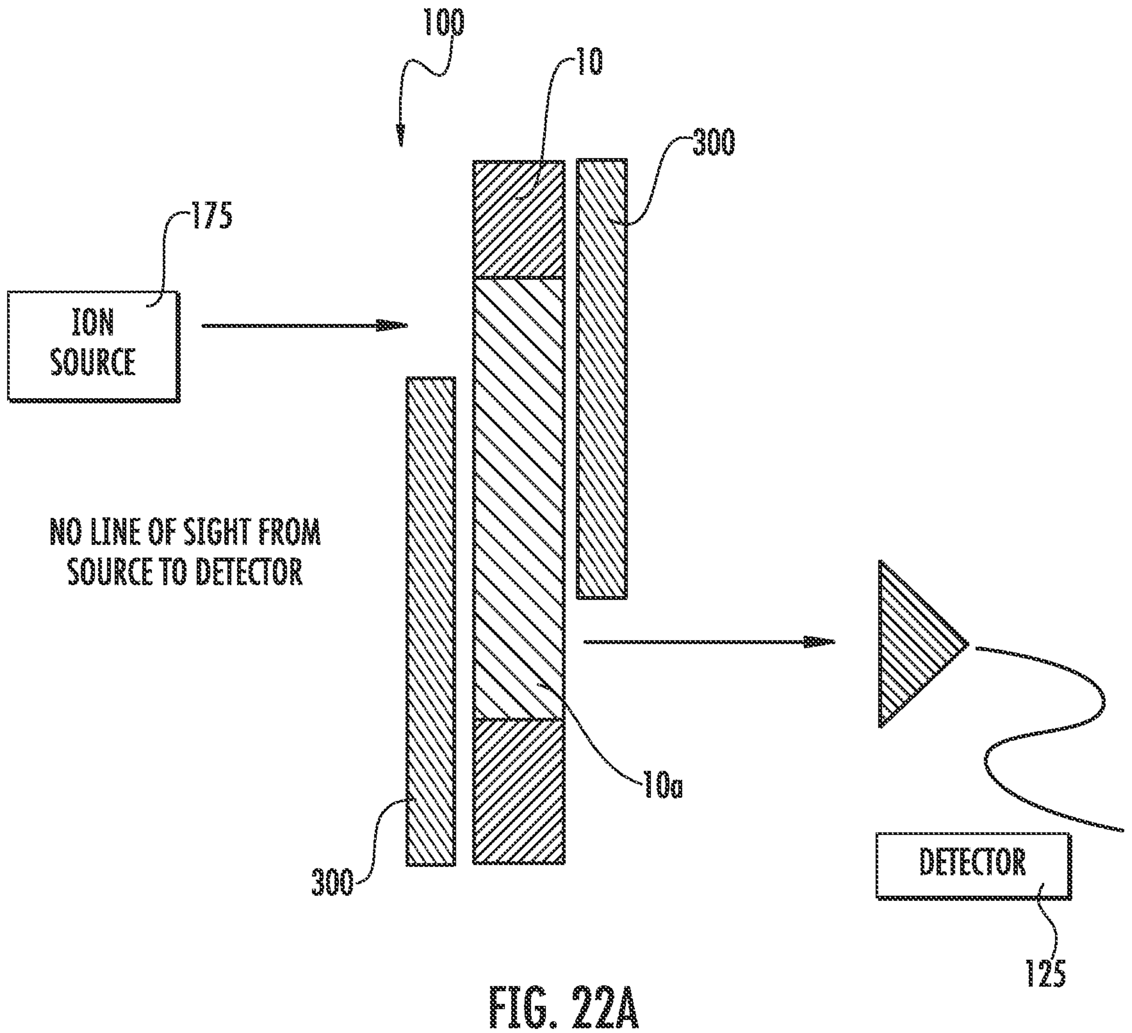
FIGS. 22A and 22B are schematic diagrams showing examples of laterally offset (y direction) ion injection and ion ejection according to certain embodiments of the present invention.
Figure 22B:
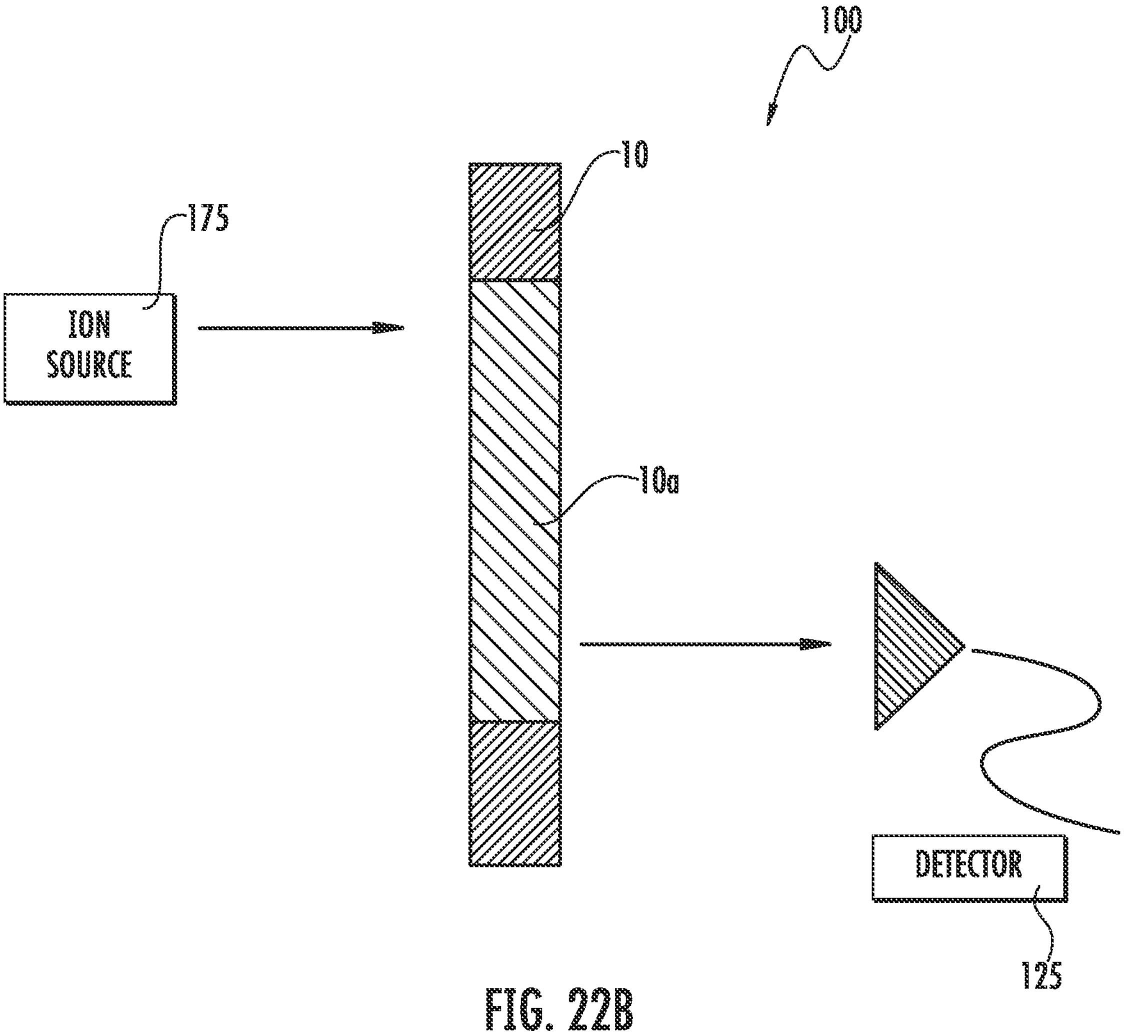

FIG. 22A and FIG. 22B show that the ion injection from the ion source 175 and the ejection to the detector 125 do not have to be coaxial. FIG. 22B illustrates that the no line of sight is required between the source 175 and detector 125 according to embodiments of the present invention.

FIG. 23A is a diagram of a method of transporting ions between an ion source and an ion detector. An ion trap is provided that is positioned between the ion source and the ion detector and comprising a ring electrode defining an ion trap aperture, wherein the ring electrode has a longitudinal length extending in a longitudinal direction between the ion source and the ion detector, and the ion trap aperture has a transverse length extending in a first direction orthogonal to the longitudinal direction and a transverse width extending in a second direction orthogonal to the longitudinal direction and the first direction (block 500). Ions are introduced into the ion trap aperture at a first location along the first direction (block 510). An electric field is generated directed along the first direction within or proximate to the ion trap aperture to transport at least some of the ions to a second location along the first direction within the ion trap aperture (block 515). At least some of the ions are ejected from the ion trap aperture at the second location.

The transverse length can be larger than the longitudinal length and the transverse width (block 505). The transverse width can vary at positions along the first direction (block 507).

Figure 23B:
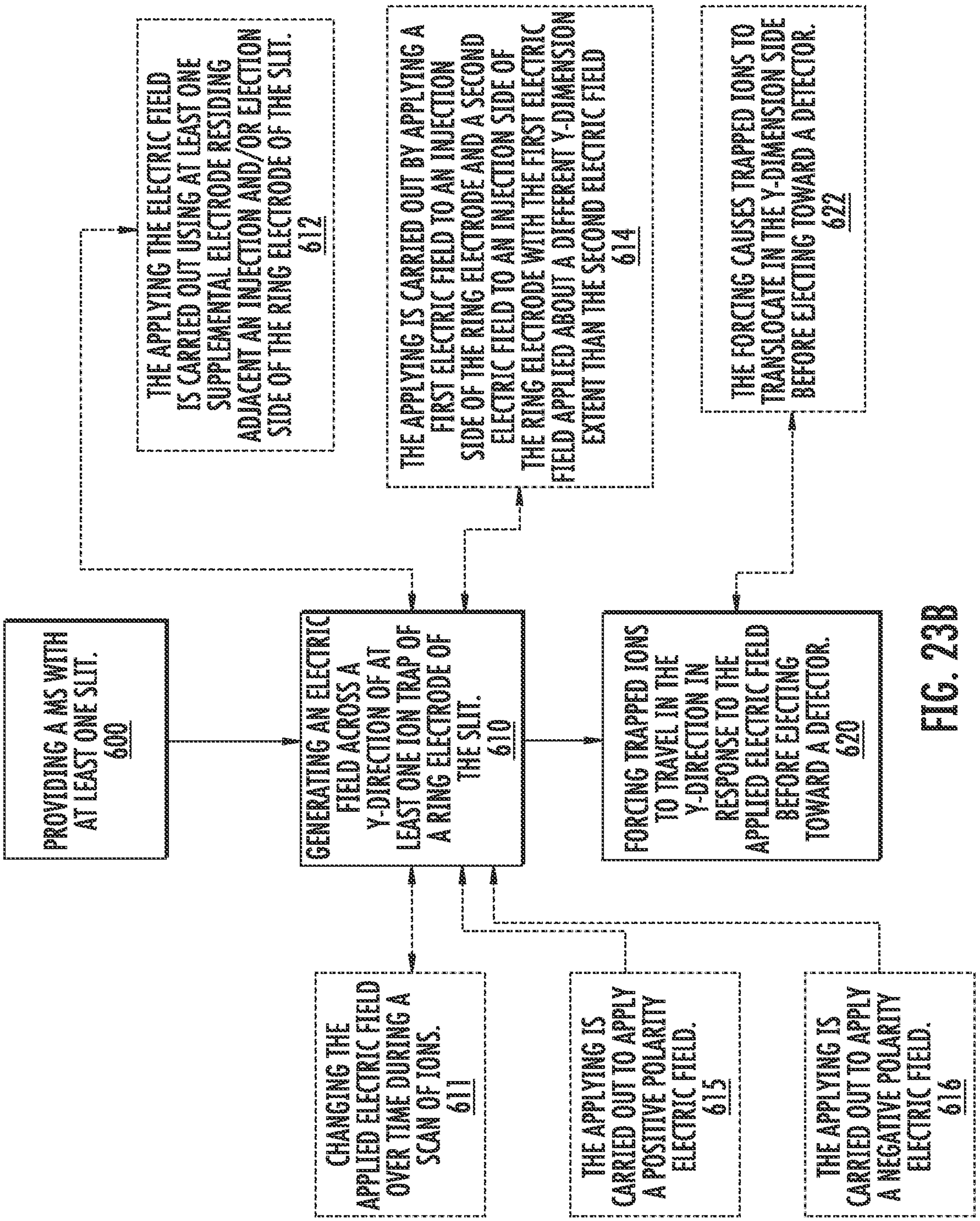
FIG. 23B is a schematic diagram showing examples of actions or steps that can be carried out by a mass spectrometer according to certain embodiments of the present invention.

FIG. 23B is a schematic diagram showing certain example operations that can be carried out according to certain embodiments of the present invention. A mass spectrometer (MS) with at least one SLIT is provided (block 600). An electric field is applied across a y-direction of at least one ion trap of a ring electrode of the SLIT (block 610). Trapped ions are forced to translocate or travel in the y-direction in response to the applied electric field before ejecting toward a detector (block 620).

The electric field can be applied concurrently with a driving electric field to transport the ions toward the detector.

The applied electric field can be changed over time during a single scan or successive scans (block 611).

The applying the electric field can be carried out using at least one supplemental electrode residing adjacent an injection and/or ejection side of the ring electrode of the SLIT (block 612).

The applying can be carried out by applying a first electric field to an injection side of the ring electrode and a second electric field to an ejection side of the ring electrode with the first electric field applied about a different y-dimension extent than the second electric field (block 616).

The applying can be carried out to apply a positive polarity electric field (block 615).

The applying can be carried out to apply a negative polarity electric field (block 616).

The forcing can cause trapped ions to translocate about the y-dimension (i.e., travel from a first end of the ring electrode toward an opposing y-dimension side and optionally converge at a localized region) before ejecting toward a detector (block 622).

In various embodiments, devices described herein may be used to implement any mass spectrometry technique known in the art, including tandem mass spectrometry (e.g., as described in U.S. Pat. No. 7,847,240, the contents of which are hereby incorporated by reference as if recited in full herein. The devices described herein may be used in other applications, e.g., trapping of charged particles for purposes such as quantum computing, precision time or frequency standards, or any other suitable purpose. Embodiments of the invention can be used with ESI (U.S. Pat. Nos. 9,006,648, 9,406,492, and 9,502,225), incorporated using miniaturized stacked layers or plates (U.S. Pat. No. 9,373,492), and/or using SLIT ion trap geometries (U.S. Pat. No. 8,878,127) and the like, the contents of these patents are hereby incorporated by reference as if recited in full herein.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

That which is claimed:

1. A mass spectrometry system, comprising:

an ion source;

an ion detector;

an ion trap comprising:

a trapping electrode comprising an aperture; and first and second end cap electrodes positioned on opposite sides of the trapping electrode to form a trapping cavity that extends in a longitudinal direction between the ion source and the ion detector, and in a transverse plane orthogonal to the longitudinal direction, wherein the first and second end cap electrodes are planar electrodes;

an electrode assembly comprising:

a first set of one or more supplemental electrodes positioned in a first plane within the trapping cavity that is displaced in the longitudinal direction from the trapping electrode; and a second set of one or more supplemental electrodes positioned in a second plane within the trapping cavity that is displaced in the longitudinal direction from the trapping electrode; and a controller connected to the first and second sets of supplemental electrodes, wherein during operation of the system, the controller is configured to apply electrical potentials to the first and second sets of supplemental electrodes; and wherein the first and second sets of supplemental electrodes are arranged to generate electric field gradients within the trapping cavity that displace a population of trapped ions from a first trapping location in the transverse plane to a second trapping location in the transverse plane.

2. The system of claim 1, wherein the first and second planes are on opposite sides of the trapping electrode.

3. The system of claim 1, wherein the first and second planes are on a common side of the trapping electrode.

4. The system of claim 1, wherein at least one of the first and second sets of supplemental electrodes comprises multiple electrodes.

5. The system of claim 1, wherein the aperture has a cross-sectional shape in the transverse plane that narrows in a direction in the transverse plane.

6. The system of claim 5, wherein the direction in the transverse plane along with the aperture narrows is parallel to a direction of at least one of the electric field gradients.

7. The system of claim 1, wherein at least one of the electric field gradients comprises a nonlinear electric field variation in a direction in the transverse plane.

8. The system of claim 1, wherein the ion source and ion detector are positioned so that a direct line-of-sight does not exist along an ion transport path in the system.

9. The system of claim 1, wherein the first end cap electrode comprises an entry aperture through which ions enter the trapping cavity and the second end cap electrode comprises an exit aperture through which ions are ejected from the trapping cavity.

10. The system of claim 9, wherein the entry aperture is aligned with a first end portion of the aperture.

11. The system of claim 10, wherein the exit aperture is aligned with a central portion of the aperture.

12. The system of claim 10, wherein the exit aperture is aligned with a second end portion of the aperture.

13. The system of claim 10, wherein:

the first plane is positioned on a same side of the trapping electrode as the entry aperture and the second plane is positioned on a same side of the trapping electrode as the exit aperture; and during operation of the system, the controller is configured to accumulate ions in the trapping cavity by:

applying a first electrical potential to the first set of supplemental electrodes; and applying a second electrical potential to the second set of supplemental electrodes, wherein the second electrical potential is greater than the first electrical potential.

14. The system of claim 13, wherein during operation of the system, the controller is configured to eject ions from the trapping cavity by:

applying a third electrical potential to the first set of supplemental electrodes; and applying a fourth electrical potential to the second set of supplemental electrodes, wherein the fourth electrical potential is greater than the third electrical potential.

15. The system of claim 14, wherein the trapping electrode is connected to the controller, and wherein the controller is configured so that during operation of the system, the controller further applies an electrical potential to the trapping electrode to eject ions from the trapping cavity.

16. The system of claim 1, wherein during operation of the system, the controller is configured to:

apply a first set of electrical potentials to the first and second sets of supplemental electrodes to displace a population of trapped positively charged ions from the first trapping location to the second trapping location; and apply a second set of electrical potentials to the first and second sets of supplemental electrodes to displace a population of trapped negatively charged ions from the first trapping location to a third trapping location in the transverse plane different from the second trapping location.

17. The system of claim 16, wherein the second and third trapping locations are on opposite sides of the first trapping location in the transverse plane.

18. A mass spectrometry system, comprising:

an ion source;

an ion detector;

an ion trap comprising:

a trapping electrode comprising an aperture; and first and second end cap electrodes positioned on opposite sides of the trapping electrode to form a trapping cavity that extends in a longitudinal direction between the ion source and the ion detector, and in a transverse plane orthogonal to the longitudinal direction;

an electrode assembly comprising:

a first set of one or more supplemental electrodes positioned in a first plane within the trapping cavity that is displaced in the longitudinal direction from the trapping electrode; and a second set of one or more supplemental electrodes positioned in a second plane within the trapping cavity that is displaced in the longitudinal direction from the trapping electrode; and a controller connected to the first and second sets of supplemental electrodes, wherein during operation of the system, the controller is configured to apply electrical potentials to the first and second sets of supplemental electrodes, wherein the first and second sets of supplemental electrodes are arranged to generate electric field gradients within the trapping cavity that displace a population of trapped ions from a first location in the transverse plane to a second location in the transverse plane, and wherein during operation of the system, the controller is configured to apply the electrical potentials so as to:

apply a first set of electrical potentials to the first and second sets of supplemental electrodes to displace a population of trapped positively charged ions from the first location to the second location, and apply a second set of electrical potentials to the first and second sets of supplemental electrodes to displace a population of trapped negatively charged ions from the first location to a third location in the transverse plane different from the second location.

19. The system of claim 18, wherein the first and second planes are on opposite sides of the trapping electrode.

20. The system of claim 18, wherein the first and second planes are on a common side of the trapping electrode.

21. The system of claim 18, wherein at least one of the first and second sets of supplemental electrodes comprises multiple electrodes.

22. The system of claim 18, wherein the aperture has a cross- sectional shape in the transverse plane that narrows in a direction in the transverse plane.

23. The system of claim 22, wherein the direction in the transverse plane along with the aperture narrows is parallel to a direction of at least one of the electric field gradients.

24. The system of claim 18, wherein at least one of the electric field gradients comprises a nonlinear electric field variation in a direction in the transverse plane.

25. The system of claim 18, wherein the ion source and ion detector are positioned so that a direct line-of-sight does not exist along an ion transport path in the system.

26. The system of claim 18, wherein the first end cap electrode comprises an entry aperture through which ions enter the trapping cavity and the second end cap electrode comprises an exit aperture through which ions are ejected from the trapping cavity.

27. The system of claim 26, wherein the entry aperture is aligned with a first end portion of the aperture.

28. The system of claim 27, wherein the exit aperture is aligned with a central portion of the aperture.

29. The system of claim 27, wherein the exit aperture is aligned with a second end portion of the aperture.

30. The system of claim 27, wherein:

the first plane is positioned on a same side of the trapping electrode as the entry aperture and the second plane is positioned on a same side of the trapping electrode as the exit aperture; and during operation of the system, the controller is configured to accumulate ions in the trapping cavity by:

applying a first electrical potential to the first set of supplemental electrodes; and applying a second electrical potential to the second set of supplemental electrodes, wherein the second electrical potential is greater than the first electrical potential.

31. The system of claim 30, wherein during operation of the system, the controller is configured to eject ions from the trapping cavity by:

applying a third electrical potential to the first set of supplemental electrodes; and applying a fourth electrical potential to the second set of supplemental electrodes, wherein the fourth electrical potential is greater than the third electrical potential.

32. The system of claim 31, wherein the trapping electrode is connected to the controller, and wherein the controller is configured so that during operation of the system, the controller further applies an electrical potential to the trapping electrode to eject ions from the trapping cavity.

33. The system of claim 31, wherein the second and third locations are on opposite sides of the first location in the transverse plane.

34. A mass spectrometry system, comprising:

an ion source;

an ion detector;

an ion trap comprising:

a trapping electrode comprising an aperture; and first and second end cap electrodes positioned on opposite sides of the trapping electrode to form a trapping cavity that extends in a longitudinal direction between the ion source and the ion detector, and in a transverse plane orthogonal to the longitudinal direction, wherein the first and second end cap electrodes are planar electrodes;

an electrode assembly comprising:

a first set of one or more supplemental electrodes positioned in a first plane within the trapping cavity that is displaced in the longitudinal direction from the trapping electrode; and a second set of one or more supplemental electrodes positioned in a second plane within the trapping cavity that is displaced in the longitudinal direction from the trapping electrode; and a controller connected to the first and second sets of supplemental electrodes, wherein during operation of the system, the controller is configured to apply electrical potentials to the first and second sets of supplemental electrodes;

wherein the first and second sets of supplemental electrodes are arranged to generate electric field gradients within the trapping cavity that displace a population of trapped ions from a first location in the transverse plane to a second location in the transverse plane; and wherein, the first plane is positioned on a same side of the trapping electrode as an entry aperture and the second plane is positioned on a same side of the trapping electrode as an exit aperture; and during operation of the system, the controller is configured to accumulate ions in the trapping cavity by:

applying a first electrical potential to the first set of supplemental electrodes; and applying a second electrical potential to the second set of supplemental electrodes, wherein the second electrical potential is greater than the first electrical potential, and during operation of the system, the controller is configured to eject ions from the trapping cavity by:

applying a third electrical potential to the first set of supplemental electrodes; and applying a fourth electrical potential to the second set of supplemental electrodes, wherein the fourth electrical potential is greater than the third electrical potential.

* * * * *